US011134427B2

United States Patent
Zeng et al.

(10) Patent No.: US 11,134,427 B2
(45) Date of Patent: Sep. 28, 2021

(54) TERMINAL, BASE STATION, CELL ACCESS METHOD, AND DATA TRANSMISSION METHOD FOR RECONFIGURING A WIRELESS CONNECTION TO COMMUNICATE WITH A SECONDARY CELL

(71) Applicant: Huawei Technologies Co., Ltd., Shenzhen (CN)

(72) Inventors: Qinghai Zeng, Shanghai (CN); Hongping Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/822,543

(22) Filed: Mar. 18, 2020

(65) Prior Publication Data

US 2020/0221364 A1   Jul. 9, 2020

Related U.S. Application Data

(63) Continuation of application No. 15/858,900, filed on Dec. 29, 2017, now Pat. No. 10,616,817, which is a (Continued)

(30) Foreign Application Priority Data

Jun. 30, 2015   (CN) .......................... 201510374668.7

(51) Int. Cl.
*H04W 36/36* (2009.01)
*H04W 48/16* (2009.01)
(Continued)

(52) U.S. Cl.
CPC ........... *H04W 36/36* (2013.01); *H04W 36/08* (2013.01); *H04W 36/30* (2013.01); *H04W 48/16* (2013.01); *H04W 76/25* (2018.02)

(58) Field of Classification Search
CPC ..... H04W 36/08; H04W 36/30; H04W 36/36; H04W 48/16; H04W 76/25; H04W 36/24;
(Continued)

(56) References Cited

U.S. PATENT DOCUMENTS 9,781,651 B2   10/2017   Shi et al.
2009/0323607 A1   12/2009   Park et al.
(Continued)

FOREIGN PATENT DOCUMENTS

CN   1722900 A   1/2006
CN   101009858 A   8/2007
(Continued)

OTHER PUBLICATIONS

Radio Resource Control (RRC); Protocol specification (Release 12), France; RAN WG2, Mar. 27, 2015, pp. 1-445, XP050928130. (Year: 2015).*

(Continued)

*Primary Examiner* — Mewale A Ambaye
(74) *Attorney, Agent, or Firm* — Slater Matsil, LLP

(57) ABSTRACT

A cell access method includes determining, by a terminal in communication with a first cell, to communicate with a second cell, establishing a wireless connection by which the terminal communicates with the second cell in response to the determining to communicate with the second cell, accessing the second cell on the wireless connection by the terminal, and receiving, by the terminal, a reconfiguration message sent by a first base station of the first cell. The reconfiguration message is sent by the first base station to the terminal. The method further includes reconfiguring the wireless connection according to the reconfiguration message, and communicating with the second cell on the reconfigured wireless connection.

20 Claims, 15 Drawing Sheets

Related U.S. Application Data continuation of application No. PCT/CN2016/087764, filed on Jun. 29, 2016.

(51) Int. Cl.
*H04W 76/25* (2018.01)
*H04W 36/08* (2009.01)
*H04W 36/30* (2009.01)

(58) Field of Classification Search
CPC . H04W 36/38; H04W 36/0005; H04W 76/10; H04W 36/10; H04W 36/14; H04L 2/5691; H04L 29/08576; H04B 1/7075
See application file for complete search history.

(56) References Cited

U.S. PATENT DOCUMENTS

| | | | |
|---|---|---|---|
| 2010/0135212 A1 | 6/2010 | Ho et al. | |
| 2011/0305159 A1 | 12/2011 | Hofmann et al. | |
| 2012/0076021 A1* | 3/2012 | Sambhwani | H04W 36/0072 370/252 |
| 2012/0140743 A1 | 6/2012 | Pelletier et al. | |
| 2013/0260745 A1* | 10/2013 | Johansson | H04W 76/19 455/423 |
| 2013/0280069 A1 | 10/2013 | Bohlen et al. | |
| 2014/0056243 A1 | 2/2014 | Pelletier et al. | |
| 2014/0066069 A1 | 3/2014 | Salami et al. | |
| 2014/0146804 A1* | 5/2014 | Seok | H04W 84/12 370/338 |
| 2014/0198734 A1 | 7/2014 | Yamada et al. | |
| 2014/0204771 A1 | 7/2014 | Gao et al. | |
| 2014/0269575 A1 | 9/2014 | Zhang et al. | |
| 2014/0286243 A1 | 9/2014 | Yamada | |
| 2014/0307623 A1 | 10/2014 | Gheorghiu et al. | |
| 2014/0328182 A1 | 11/2014 | Gao et al. | |
| 2015/0031365 A1 | 1/2015 | Tajima et al. | |
| 2015/0223093 A1 | 8/2015 | Zhang et al. | |
| 2015/0223127 A1 | 8/2015 | Godin et al. | |
| 2015/0327324 A1 | 11/2015 | Wei et al. | |
| 2016/0112926 A1 | 4/2016 | Lee | |
| 2017/0195924 A1* | 7/2017 | Dwyer | H04W 48/16 |
| 2018/0020483 A1 | 1/2018 | Lee et al. | |
| 2018/0146409 A1* | 5/2018 | Ku | H04W 48/20 |
| 2019/0028947 A1* | 1/2019 | Adachi | H04W 60/00 |
| 2019/0124659 A1* | 4/2019 | Wang | H04W 76/10 |

FOREIGN PATENT DOCUMENTS

| | | |
|---|---|---|
| CN | 101009907 A | 8/2007 |
| CN | 101047948 A | 10/2007 |
| CN | 101237394 A | 8/2008 |
| CN | 101247647 A | 8/2008 |
| CN | 101365228 A | 2/2009 |
| CN | 101754413 A | 6/2010 |
| CN | 101938415 A | 1/2011 |
| CN | 103139753 A | 6/2013 |
| CN | 103139911 A | 6/2013 |
| CN | 103404072 A | 11/2013 |
| CN | 103931236 A | 7/2014 |
| CN | 104053197 A | 9/2014 |
| CN | 104125607 A | 10/2014 |
| CN | 104272805 A | 1/2015 |
| CN | 104349389 A | 2/2015 |
| CN | 104853389 A | 8/2015 |
| EP | 2169849 B1 | 3/2013 |
| EP | 2908570 A1 | 8/2015 |
| EP | 2941087 A1 | 11/2015 |
| EP | 2947950 A2 | 11/2015 |
| EP | 2129147 B1 | 4/2016 |
| EP | 3203805 A1 | 8/2017 |
| WO | 2009006848 A1 | 1/2009 |
| WO | 2012134182 A2 | 10/2012 |
| WO | 2012148166 A2 | 11/2012 |
| WO | 2014075210 A1 | 5/2014 |
| WO | 2014163632 A1 | 10/2014 |
| WO | 2015015293 A2 | 2/2015 |
| WO | 2016061789 A1 | 4/2016 |

OTHER PUBLICATIONS

"3rd Generation Partnership Project; Technical Specification Group Services and System Aspects; Vocabulary for 3GPP Specifications (Release 12)," 3GPP TR 21.905 V12.0.0, Jun. 2013, 64 pages.

"3rd Generation Partnership Project; Technical Specification Group Radio Access Network; Evolved Universal Terrestrial Radio Access Network (E-UTRAN); Extension of Dual Connectivity in EUTRAN (Release 13)," 3GPP TR 36.875, V2.0.0, Jun. 2015, 38 pages.

"3rd Generation Partnership Project; Technical Specification Group Radio Access Network; Evolved Universal Terrestrial Radio Access (E-UTRA); Radio Resource Control (RRC); Protocol Specification (Release 12)," 3GPP TS 36.331 V12.5.0, Mar. 2013, 445 pages.

"Completeness of Control Plane Architectures for Small Cells," Agenda Item: 7.2.2.2, Source: Qualcomm Incorporated, Document for: Discussion and Decision, 3GPP TSG-RAN WG2 Meeting #82, R2-132039, Fukoka, Japan, May 20-24, 2013, 4 pages.

"Mobility Anchor to Reduce Signalling Load to CN without Dual Connectivity," Agenda Item: 7.2.2, Source: Intel Corporation, Document for: Discussion and Decision, 3GPP TSG RAN WG2 Meeting #83bis, R2-133500, Ljubljana, Slovenia, Oct. 7-11, 2013, 4 pages.

"Initial Data Transmission after SCG Addition and intra-MeNB HO," Agenda Item: 7.1.1, Source: Huawei, HiSilicon, Document for: Discussion and Decision, 3GPP TSG-RAN WG2 Meeting #88, R2-145276, San Francisco, USA, Nov. 17-21, 2014, 8 pages.

Wang, B., "Research on the Key Technologies of Self-Optimization in the LTE Network,"Beijing University of Posts and Telecommunications, 2012, 138 pages.

* cited by examiner

TERMINAL, BASE STATION, CELL ACCESS METHOD, AND DATA TRANSMISSION METHOD FOR RECONFIGURING A WIRELESS CONNECTION TO COMMUNICATE WITH A SECONDARY CELL

CROSS-REFERENCE TO RELATED APPLICATIONS

This application is a continuation of U.S. patent application Ser. No. 15/858,900, filed on Dec. 29, 2017, which is a continuation of International Application No. PCT/CN2016/087764, filed on Jun. 29, 2016, which claims priority to Chinese Patent Application No. 201510374668.7, filed on Jun. 30, 2015. All of the afore-mentioned patent applications are hereby incorporated by reference in their entireties.

TECHNICAL FIELD

The present invention relates to wireless communications technologies, and in particular, to a terminal, a base station, a cell access method, and a data transmission method.

BACKGROUND

In a wireless communications system such as a Long Term Evolution (LTE) system, a terminal is usually in two states: a radio resource control (RRC) connected mode and an idle mode. Mobility of the terminal in both the two states is controlled by a network device such as a base station in the LTE system.

When the terminal is in the RRC connected mode and moves between cells, the network device determines whether the terminal needs to be handed over to a new cell, makes preparations for performing cell handover between a source cell from which the terminal is handed over and a target cell to which the terminal is handed over, and then instructs the terminal to access the target cell.

As shown in FIG. 1, a source base station sends a measurement configuration message to a terminal, and controls the terminal to perform wireless measurement on a source cell and a neighboring cell. In a process in which the terminal moves from the source cell to a target cell, when a condition indicated by the measurement configuration message is met, the terminal sends a measurement report to the source base station. The source base station performs handover decision, sends a handover request to a target base station of the target cell; and after receiving a handover request acknowledgement from the target base station, sends a handover command to the terminal, so as to instruct the terminal to be handed over from the source cell to the target cell.

In the RRC connected mode, the terminal cannot initiate a new RRC connection establishment process to access a new cell. Instead, the network device such as a base station or a core network device such as a mobility management entity (MME) needs to determine whether a new cell needs to be added for the terminal, so as to improve a maximum peak rate of the terminal.

In the idle mode, if the terminal needs to enter the RRC connected mode to perform data transmission, the terminal can access only a cell on which the terminal currently camps, and cannot access another cell.

When the terminal is in the idle mode and moves between cells, the terminal determines, according to a cell reselection rule in the cell on which the terminal currently camps and a cell reselection rule provided by the last cell after the terminal enters the RRC connected mode, whether to perform cell reselection, and which cell is to be reselected. These cell reselection rules are also specified by the network device. The terminal strictly performs cell reselection according to the cell reselection rule specified by the network device.

In conclusion, in a current wireless communications system such as the LTE system, both RRC state transition and mobility management of the terminal, for example, a cell handover process, a cell reselection process, and a cell access process, need to be performed under the control of the network device. The terminal strictly performs an operation according to an instruction of the network device.

In the foregoing manner in which the network device strictly controls the terminal, although it is convenient to centrally manage the terminal by the network device, network implementation is complex, and deployment and maintenance are not easy to perform.

SUMMARY

In view of this, embodiments of the present invention provide a terminal, a base station, and a cell access method, so as to enable the terminal to autonomously access a cell, and resolve the foregoing problem where, because a network device strictly controls the terminal, network implementation is complex, and deployment and maintenance are not easy to perform.

According to a first aspect, an embodiment of the present invention provides a terminal, where the terminal communicates with a first cell. The terminal includes a transceiver module, configured to when the terminal needs to communicate with a second cell, send a first cell addition request message to a first base station of the first cell, where the first cell addition request message is used to request the first base station to add the second cell as a cell communicating with the terminal and a processing module, configured to, after receiving, by using the transceiver module, a configuration message that is sent by the first base station and is used to configure a wireless connection by which the terminal communicates with the second cell, configure, according to the configuration message, the wireless connection by which the terminal communicates with the second cell, and control the terminal to access the second cell by using the configured wireless connection by which the terminal communicates with the second cell.

With reference to the first aspect, in a first possible implementation, the processing module is specifically configured to obtain, from the configuration message, a wireless connection parameter that is used to configure the wireless connection by which the terminal communicates with the second cell, and configure, according to the obtained wireless connection parameter, the wireless connection by which the terminal communicates with the second cell.

With reference to the first aspect or the first possible implementation of the first aspect, in a second possible implementation, the transceiver module is further configured to after the processing module configures, according to the configuration message, the wireless connection by which the terminal communicates with the second cell, and before the processing module controls the terminal to access the second cell, send a first configuration complete message to the first base station, so as to indicate to the first base station that the terminal has completed, according to the configuration message, configuration of the wireless connection by which the terminal communicates with the second cell.

With reference to the first aspect, or the first or the second possible implementation of the first aspect, in a third possible implementation, the processing module is further configured to before the transceiver module sends the first cell addition request message, measure a wireless signal transmitted in the second cell, and determine, according to a measurement result of the measuring, that the second cell is available.

With reference to the third possible implementation of the first aspect, in a fourth possible implementation, the transceiver module is further configured to before the processing module measures the wireless signal transmitted in the second cell, receive a measurement configuration message sent by the first base station, where the measurement configuration message includes cell identity information of the second cell, and information about a decision condition used to determine whether the second cell is available. The processing module is specifically configured to measure, according to the cell identity information of the second cell that is included in the measurement configuration message, the wireless signal transmitted in the second cell, and when the measurement result of the measuring meets the decision condition, determine that the second cell is available.

With reference to the third possible implementation of the first aspect, in a fifth possible implementation, the transceiver module is further configured to, before the processing module measures the wireless signal transmitted in the second cell, receive a measurement configuration message sent by the first base station, where the measurement configuration message includes frequency information of the second cell, and information about a decision condition used to determine whether the second cell is available. The processing module is specifically configured to measure, according to the frequency information of the second cell that is included in the measurement configuration message, the wireless signal transmitted in the second cell, and when the measurement result of the measuring meets the decision condition, determine that the second cell is available.

With reference to any one of the third to the fifth possible implementations of the first aspect, in a sixth possible implementation, the transceiver module is further configured to, before the processing module measures the wireless signal transmitted in the second cell, receive a first indication message sent by the first base station or a second base station of the second cell. The processing module is further configured to determine, according to the first indication message, that the second cell may be added as a cell communicating with the terminal, where the first indication message is used to indicate that the second cell may provide communication for a same terminal together with the first cell.

With reference to any one of the first aspect, or the first to the sixth possible implementations of the first aspect, in a seventh possible implementation, the first base station is a macro base station or a small node, or the first base station includes an access node of the first cell and a control plane anchor corresponding to the access node, where the access node keeps a wireless connection to the terminal, the control plane anchor is configured to control the terminal to establish a wireless connection to the access node, and enable, by exchanging information with a second server, the second server to perform user information management on the terminal, and the second server is configured to perform user information management on the terminal, and the second base station of the second cell is a small node, a macro base station, or a Wireless Fidelity WiFi access point AP.

According to a second aspect, an embodiment of the present invention provides a first base station, including a transceiver module, configured to receive a first cell addition request message sent by a terminal communicating with a first cell of the first base station, where the first cell addition request message is used to request the first base station to add a second cell as a cell communicating with the terminal, and a processing module, configured to control the transceiver module to send, to the terminal, a configuration message that is used to configure a wireless connection by which the terminal communicates with the second cell, so as to instruct the terminal to configure, according to the configuration message, the wireless connection by which the terminal communicates with the second cell, and access the second cell.

With reference to the second aspect, in a first possible implementation, the transceiver module is further configured to, after receiving the first cell addition request message, and before sending, to the terminal, the configuration message that is used to configure the wireless connection by which the terminal communicates with the second cell, send a second cell addition request message to a second base station of the second cell, so as to request to add the second cell as a cell communicating with the terminal, and the processing module is specifically configured to control the transceiver module to receive a cell addition request acknowledgement message sent by the second base station in response to the second cell addition request message, obtain, from the cell addition request acknowledgement message, a wireless connection parameter that is used to configure the wireless connection by which the terminal communicates with the second cell, and control the transceiver module to send the configuration message to the terminal, where the configuration message carries the obtained wireless connection parameter, so as to instruct the terminal to configure, according to the wireless connection parameter, the wireless connection by which the terminal communicates with the second cell, and access the second cell.

With reference to the first possible implementation of the second aspect, in a second possible implementation, the processing module is further configured to after controlling the transceiver module to send the configuration message to the terminal, and after the transceiver module receives a first configuration complete message sent by the terminal in response to the configuration message, control the transceiver module to send a second configuration complete message to the second base station, so as to indicate the second base station that the terminal has completed configuration of the wireless connection by which the terminal communicates with the second cell, where the first configuration complete message is used to indicate the first base station that the terminal has completed, according to the configuration message, configuration of the wireless connection by which the terminal communicates with the second cell.

With reference to the second aspect, or the first or the second possible implementation of the second aspect, in a third possible implementation, the processing module is further configured to, before the transceiver module receives the first cell addition request message sent by the terminal, control the transceiver module to send a measurement configuration message to the terminal, where the measurement configuration message includes cell identity information of the second cell, and information about a decision condition used to determine whether the second cell is available, where the first cell addition request message is sent by the terminal to the first base station after the terminal measures the second cell according to the cell identity information of the second cell in the measurement configuration message, and a measurement result obtained by measuring the second cell meets the decision condition.

With reference to the second aspect, or the first or the second possible implementation of the second aspect, in a fourth possible implementation, the processing module is further configured to before the transceiver module receives the first cell addition request message sent by the terminal, control the transceiver module to send a measurement configuration message to the terminal, where the measurement configuration message includes frequency information of the second cell, and information about a decision condition used to determine whether the second cell is available, where the first cell addition request message is sent by the terminal to the first base station after the terminal measures the second cell according to the frequency information of the second cell in the measurement configuration message, and a measurement result obtained by measuring the second cell meets the decision condition.

With reference to the third or the fourth possible implementation of the second aspect, in a fifth possible implementation, the processing module is further configured to before controlling the transceiver module to send the measurement configuration message to the terminal, control the transceiver module to send a first indication message to the terminal, so as to indicate the terminal, the second cell may provide communication for a same terminal together with the first cell.

With reference to any one of the second aspect, or the first to the fifth possible implementations of the second aspect, in a sixth possible implementation, the first base station is a macro base station or a small node, or the first base station includes a first node of the first cell and a first control node configured to control the first node, where the first node is configured to process transmission between the terminal and the first control node, and the base station of the second cell is a small node, a macro base station, or a Wireless Fidelity WiFi access point AP.

According to a third aspect, an embodiment of the present invention provides a cell access method, including when a terminal communicating with a first cell needs to communicate with a second cell, sending, by the terminal, a first cell addition request message to a first base station of the first cell, where the first cell addition request message is used to request the first base station to add the second cell as a cell communicating with the terminal, after receiving a configuration message that is sent by the first base station and is used to configure a wireless connection by which the terminal communicates with the second cell, configuring, by the terminal according to the configuration message, the wireless connection by which the terminal communicates with the second cell, and accessing, by the terminal, the second cell by using the configured wireless connection by which the terminal communicates with the second cell.

With reference to the third aspect, in a first possible implementation, the configuring, by the terminal according to the configuration message, the wireless connection by which the terminal communicates with the second cell includes obtaining, by the terminal from the configuration message, a wireless connection parameter that is used to configure the wireless connection by which the terminal communicates with the second cell, and configuring, by the terminal according to the obtained wireless connection parameter, the wireless connection by which the terminal communicates with the second cell.

With reference to the third aspect or the first possible implementation of the third aspect, in a second possible implementation, after the terminal configures, according to the configuration message, the wireless connection by which the terminal communicates with the second cell, and before the terminal accesses the second cell, the method further includes sending, by the terminal, a first configuration complete message to the first base station, so as to indicate to the first base station that the terminal has completed, according to the configuration message, configuration of the wireless connection by which the terminal communicates with the second cell.

With reference to the third aspect, or the first or the second possible implementation of the third aspect, in a third possible implementation, before the terminal sends the first cell addition request message, the method further includes measuring, by the terminal, a wireless signal transmitted in the second cell, and determining, according to a measurement result of the measuring, that the second cell is available.

With reference to the third possible implementation of the third aspect, in a fourth possible implementation, before the measuring, by the terminal, a wireless signal transmitted in the second cell, the method further includes receiving, by the terminal, a measurement configuration message sent by the first base station, where the measurement configuration message includes cell identity information of the second cell, and information about a decision condition used to determine whether the second cell is available, and the measuring, by the terminal, a wireless signal transmitted in the second cell, and determining, according to a measurement result of the measuring, that the second cell is available includes measuring, by the terminal according to the cell identity information of the second cell that is included in the measurement configuration message, the wireless signal transmitted in the second cell, and when the measurement result of the measuring meets the decision condition, determining that the second cell is available.

With reference to the third possible implementation of the third aspect, in a fifth possible implementation, before the measuring, by the terminal, a wireless signal transmitted in the second cell, the method further includes receiving, by the terminal, a measurement configuration message sent by the first base station, where the measurement configuration message includes frequency information of the second cell, and information about a decision condition used to determine whether the second cell is available, and the measuring, by the terminal, a wireless signal transmitted in the second cell, and determining, according to a measurement result of the measuring, that the second cell is available includes measuring, by the terminal according to the frequency information of the second cell that is included in the measurement configuration message, the wireless signal transmitted in the second cell, and when the measurement result of the measuring meets the decision condition, determining that the second cell is available.

With reference to any one of the third to the fifth possible implementations of the third aspect, in a sixth possible implementation, before the measuring, by the terminal, a wireless signal transmitted in the second cell, the method further includes receiving, by the terminal, a first indication message sent by the first base station or a second base station of the second cell, and determining, by the terminal according to the first indication message, that the second cell may be added as a cell communicating with the terminal, where the first indication message is used to indicate that the second cell may provide communication for a same terminal together with the first cell.

With reference to any one of the third aspect, or the first to the sixth possible implementations of the third aspect, in a seventh possible implementation, the first base station is a macro base station or a small node, or the first base station includes an access node of the first cell and a control plane anchor corresponding to the access node, where the access node keeps a wireless connection to the terminal, the control plane anchor is configured to control the terminal to establish a wireless connection to the access node, and enable, by exchanging information with a second server, the second server to perform user information management on the terminal, and the second server is configured to perform user information management on the terminal, and the second base station of the second cell is a small node, a macro base station, or a Wireless Fidelity WiFi access point AP.

According to a fourth aspect, an embodiment of the present invention provides a cell access method, including receiving, by a first base station of a first cell, a first cell addition request message sent by a terminal communicating with the first cell, where the first cell addition request message is used to request the first base station to add a second cell as a cell communicating with the terminal, and sending, by the first base station to the terminal, a configuration message that is used to configure a wireless connection by which the terminal communicates with the second cell, so as to instruct the terminal to configure, according to the configuration message, the wireless connection by which the terminal communicates with the second cell, and access the second cell.

With reference to the fourth aspect, in a first possible implementation, after the first base station receives the first cell addition request message, and before the first base station sends, to the terminal, the configuration message that is used to configure the wireless connection by which the terminal communicates with the second cell, the method further includes sending, by the first base station, a second cell addition request message to a second base station of the second cell, so as to request to add the second cell as a cell communicating with the terminal, and the sending, by the first base station to the terminal, a configuration message that is used to configure a wireless connection by which the terminal communicates with the second cell, so as to instruct the terminal to configure, according to the configuration message, the wireless connection by which the terminal communicates with the second cell, and access the second cell includes receiving, by the first base station, a cell addition request acknowledgement message sent by the second base station in response to the second cell addition request message, obtaining, by the first base station from the cell addition request acknowledgement message, a wireless connection parameter that is used to configure the wireless connection by which the terminal communicates with the second cell, and sending, by the first base station, the configuration message to the terminal, where the configuration message carries the obtained wireless connection parameter, so as to instruct the terminal to configure, according to the wireless connection parameter, the wireless connection by which the terminal communicates with the second cell, and access the second cell.

With reference to the first possible implementation of the fourth aspect, in a second possible implementation, after the first base station sends the configuration message to the terminal, the method further includes receiving, by the first base station, a first configuration complete message sent by the terminal in response to the configuration message, where the first configuration complete message is used to indicate the first base station that the terminal has completed, according to the configuration message, configuration of the wireless connection by which the terminal communicates with the second cell, and after receiving the first configuration complete message, sending, by the first base station, a second configuration complete message to the second base station, so as to indicate the second base station that the terminal has completed configuration of the wireless connection by which the terminal communicates with the second cell.

With reference to the fourth aspect, or the first or the second possible implementation of the fourth aspect, in a third possible implementation, before the first base station receives the first cell addition request message sent by the terminal, the method further includes sending, by the first base station, a measurement configuration message to the terminal, where the measurement configuration message includes cell identity information of the second cell, and information about a decision condition used to determine whether the second cell is available, where the first cell addition request message is sent by the terminal to the first base station after the terminal measures the second cell according to the cell identity information of the second cell in the measurement configuration message, and a measurement result obtained by measuring the second cell meets the decision condition.

With reference to the fourth aspect, or the first or the second possible implementation of the fourth aspect, in a fourth possible implementation, before the first base station receives the first cell addition request message sent by the terminal, the method further includes sending, by the first base station, a measurement configuration message to the terminal, where the measurement configuration message includes frequency information of the second cell, and information about a decision condition used to determine whether the second cell is available, where the first cell addition request message is sent by the terminal to the first base station after the terminal measures the second cell according to the frequency information of the second cell in the measurement configuration message, and a measurement result obtained by measuring the second cell meets the decision condition.

With reference to the third or the fourth possible implementation of the fourth aspect, in a fifth possible implementation, before the first base station sends the measurement configuration message to the terminal, the method further includes sending, by the first base station, a first indication message to the terminal, so as to indicate the terminal that the second cell may provide communication for a same terminal together with the first cell.

With reference to any one of the fourth aspect, or the first to the fifth possible implementations of the fourth aspect, in a sixth possible implementation, the first base station is a macro base station or a small node, or the first base station includes a first node of the first cell and a first control node configured to control the first node, where the first node is configured to process transmission between the terminal and the first control node, and the base station of the second cell is a small node, a macro base station, or a Wireless Fidelity WiFi access point AP.

According to a fifth aspect, an embodiment of the present invention provides a terminal, where the terminal communicates with a first cell, and the terminal includes a processing module, configured to when the terminal needs to communicate with a second cell, initiate a connection establishment process, establish, by using the connection establishment process, a wireless connection by which the terminal communicates with the second cell, and control the terminal to access the second cell by using the established wireless connection, and a transceiver module, configured to receive a reconfiguration message sent by a first base station of the first cell, where the processing module is further configured to after the transceiver module receives the reconfiguration message, reconfigure the wireless connection according to the reconfiguration message, and control the terminal to communicate with the second cell by using the reconfigured wireless connection, where the reconfiguration message is sent by the first base station to the terminal after the first base station determines, according to a terminal access indication message that is received from a second base station of the second cell and is used to indicate that the terminal accesses the second cell, that the terminal accesses the second cell, and after the first base station determines that the second base station allows addition of the second cell as a cell communicating with the terminal.

With reference to the fifth aspect, in a first possible implementation, the processing module is further configured to after reconfiguring the wireless connection according to the reconfiguration message, and before controlling the terminal to communicate with the second cell by using the reconfigured wireless connection, control the transceiver module to send a reconfiguration complete message to the first base station, so as to indicate to the first base station that the terminal has completed reconfiguration of the wireless connection according to the reconfiguration message.

With reference to the fifth aspect or the first possible implementation of the fifth aspect, in a second possible implementation, the processing module is further configured to before controlling the terminal to establish the wireless connection to the second cell, measure a wireless signal transmitted in the second cell, and determine, according to a measurement result of the measuring, that the second cell is available.

With reference to the second possible implementation of the fifth aspect, in a third possible implementation, the transceiver module is further configured to before the processing module measures the wireless signal transmitted in the second cell, receive a measurement configuration message sent by the first base station, where the measurement configuration message includes cell identity information of the second cell, and information about a decision condition used to determine whether the second cell is available, and the processing module is specifically configured to measure, according to the cell identity information of the second cell that is included in the measurement configuration message, the wireless signal transmitted in the second cell, and when the measurement result of the measuring meets the decision condition, determine that the second cell is available.

With reference to the second possible implementation of the fifth aspect, in a fourth possible implementation, the transceiver module is further configured to before the processing module measures the wireless signal transmitted in the second cell, receive a measurement configuration message sent by the first base station, where the measurement configuration message includes frequency information of the second cell, and information about a decision condition used to determine whether the second cell is available, and the processing module is specifically configured to measure, according to the frequency information of the second cell that is included in the measurement configuration message, the wireless signal transmitted in the second cell, and when the measurement result of the measuring meets the decision condition, determine that the second cell is available.

With reference to any one of the second to the fourth possible implementations of the fifth aspect, in a fifth possible implementation, the transceiver module is further configured to before the processing module measures the wireless signal transmitted in the second cell, receive a first indication message sent by the second base station or the first base station, and the processing module is further configured to determine, according to the first indication message, that the second cell may be added as a cell communicating with the terminal, where the first indication message is used to indicate that the second cell may provide communication for a same terminal together with the first cell.

With reference to any one of the fifth aspect, or the first to the fifth possible implementations of the fifth aspect, in a sixth possible implementation, the first base station is a macro base station or a small node, or the first base station includes a first node of the first cell and a first control node configured to control the first node, where the first node is configured to process transmission between the terminal and the first control node, and the second base station is a small node, a macro base station, or a Wireless Fidelity WiFi access point AP.

According to a sixth aspect, an embodiment of the present invention provides a first base station, including a transceiver module, configured to receive a terminal access indication message that is sent by a second base station of a second cell and is used to indicate that a terminal communicating with a first cell of the first base station accesses the second cell, and a processing module, configured to after the transceiver module receives the terminal access indication message, and if determining that the second base station allows addition of the second cell as a cell communicating with the terminal, control the transceiver module to send a reconfiguration message to the terminal, so as to instruct the terminal to reconfigure, according to the reconfiguration message, a wireless connection established when the terminal accesses the second cell, and communicate with the second cell by using the configured wireless connection.

With reference to the sixth aspect, in a first possible implementation, the terminal access indication message is further used to indicate that the second base station allows addition of the second cell as a cell communicating with the terminal, and the processing module is specifically configured to after the transceiver module receives the terminal access indication message, determine that the second base station allows addition of the second cell as a cell communicating with the terminal.

With reference to the first possible implementation of the sixth aspect, in a second possible implementation, the terminal access indication message carries a wireless connection parameter that is used to reconfigure the wireless connection, and the processing module is specifically configured to add, to the reconfiguration message, the wireless connection parameter obtained from the terminal access indication message, and send the reconfiguration message to the terminal by using the transceiver module, where the reconfiguration message is specifically used to instruct the terminal to reconfigure the wireless connection according to the wireless connection parameter, and communicate with the second cell by using the configured wireless connection.

With reference to the sixth aspect, in a third possible implementation, the processing module is further configured to after the transceiver module receives the terminal access indication message, control the transceiver module to send a cell addition request message to the second base station, so as to request the second base station to add the second cell as a cell communicating with the terminal, and the processing module is specifically configured to after the transceiver module receives a cell addition request acknowledgement message sent by the second base station in response to the cell addition request message, determine that the second base station allows addition of the second cell as a cell communicating with the terminal.

With reference to the third possible implementation of the sixth aspect, in a fourth possible implementation, the cell addition request acknowledgement message carries a wireless connection parameter that is used to reconfigure the wireless connection, and the processing module is specifically configured to add, to the reconfiguration message, the wireless connection parameter obtained from the cell addition request acknowledgement message, and send the reconfiguration message to the terminal by using the transceiver module, where the reconfiguration message is specifically used to instruct the terminal to reconfigure the wireless connection according to the wireless connection parameter, and communicate with the second cell by using the configured wireless connection.

With reference to any one of the sixth aspect, or the first to the fourth possible implementations of the sixth aspect, in a fifth possible implementation, the transceiver module is further configured to after sending the reconfiguration message to the terminal, receive a reconfiguration complete message sent by the terminal in response to the reconfiguration message, and the processing module is further configured to determine, according to the reconfiguration complete message, that the terminal has completed reconfiguration of the wireless connection according to the reconfiguration message, and control the transceiver module to send a cell addition complete message to the second base station, so as to indicate the second base station that the terminal has completed reconfiguration of the wireless connection.

With reference to any one of the sixth aspect, or the first to the fifth possible implementations of the sixth aspect, in a sixth possible implementation, the processing module is further configured to before the transceiver module receives the terminal access indication message, control the transceiver module to send a measurement configuration message to the terminal, where the measurement configuration message includes cell identity information of the second cell, and information about a decision condition used to determine whether the second cell is available, so as to instruct the terminal to measure, according to the cell identity information of the second cell that is included in the measurement configuration message, a wireless signal transmitted in the second cell, and when a measurement result of the measuring meets the decision condition, determine that the second cell is available.

With reference to any one of the sixth aspect, or the first to the fifth possible implementations of the sixth aspect, in a seventh possible implementation, the processing module is further configured to before the transceiver module receives the terminal access indication message, control the transceiver module to send a measurement configuration message to the terminal, where the measurement configuration message includes frequency information of the second cell, and information about a decision condition used to determine whether the second cell is available, so as to instruct the terminal to measure, according to the frequency information of the second cell that is included in the measurement configuration message, a wireless signal transmitted in the second cell, and when a measurement result of the measuring meets the decision condition, determine that the second cell is available.

With reference to the sixth or the seventh possible implementation of the sixth aspect, in an eighth possible implementation, the processing module is further configured to before controlling the transceiver module to send the measurement configuration message, control the transceiver module to send a first indication message to the terminal, where the first indication message is used to indicate that the second cell may provide communication for a same terminal together with the first cell.

With reference to any one of the sixth aspect, or the first to the eighth possible implementations of the sixth aspect, in a ninth possible implementation, the first base station is a macro base station or a small node, or the first base station includes a first node of the first cell and a first control node configured to control the first node, where the first node is configured to process transmission between the terminal and the first control node, and the second base station is a small node, a macro base station, or a Wireless Fidelity WiFi access point AP.

According to a seventh aspect, an embodiment of the present invention provides a second base station, including a processing module and a transceiver module, where the processing module is configured to establish a wireless connection between a terminal and the second cell of the second base station in a connection establishment process initiated by the terminal, and allow the terminal to access the second cell by using the wireless connection, and the processing module is further configured to after the terminal accesses the second cell, control the transceiver module to send a terminal access indication message to a first base station of a first cell communicating with the terminal, so as to indicate that the second cell needs to be added, for the terminal, as a cell communicating with the terminal.

With reference to the seventh aspect, in a first possible implementation, the terminal access indication message is further used to indicate that the second base station allows addition of the second cell as a cell communicating with the terminal, and the processing module is specifically configured to add, to the terminal access indication message, a wireless connection parameter that is used to reconfigure the wireless connection, so as to instruct the first base station to instruct the terminal to reconfigure the wireless connection according to the wireless connection parameter.

With reference to the first possible implementation of the seventh aspect, in a second possible implementation, the transceiver module is further configured to after sending the terminal access indication message to the first base station, receive a cell addition complete message sent by the first base station, and the processing module is further configured to after the transceiver module receives the cell addition complete message, control the transceiver module to communicate with the terminal by using the reconfigured wireless connection.

With reference to the seventh aspect, in a third possible implementation, the transceiver module is further configured to after sending the terminal access indication message to the first base station, receive a cell addition request message sent by the first base station, where the cell addition request message is used to request the second base station to add the second cell as a cell communicating with the terminal, and the processing module is further configured to control the transceiver module to send a cell addition request acknowledgement message to the first base station in response to the cell addition request message, so as to indicate that the second base station allows addition of the second cell as a cell communicating with the terminal, where the cell addition request acknowledgement message carries a wireless connection parameter that is used to reconfigure the wireless connection, so as to instruct the first base station to instruct the terminal to reconfigure the wireless connection according to the wireless connection parameter.

With reference to the third possible implementation of the seventh aspect, in a fourth possible implementation, the transceiver module is further configured to after sending the cell addition request acknowledgement message to the first base station, receive a cell addition complete message sent by the first base station, and the processing module is further configured to after the transceiver module receives the cell addition complete message, control the transceiver module to communicate with the terminal by using the reconfigured wireless connection.

With reference to any one of the seventh aspect, or the first to the fourth possible implementations of the seventh aspect, in a fifth possible implementation, the processing module is further configured to before establishing the wireless connection between the terminal and the second cell, control the transceiver module to send a first indication message to the terminal, so as to indicate that the second cell may provide communication for a same terminal together with the first cell, where the connection establishment process initiated by the terminal is initiated by the terminal after the terminal receives the first indication message and determines, according to the first indication message, that the first cell may provide communication for the terminal together with the first cell.

With reference to any one of the seventh aspect, or the first to the fifth possible implementations of the seventh aspect, in a sixth possible implementation, the first base station is a macro base station or a small node, or the first base station includes a first node of the first cell and a first control node configured to control the first node, where the first node is configured to process transmission between the terminal and the first control node, and the second base station is a small node, a macro base station, or a Wireless Fidelity WiFi access point AP.

According to an eighth aspect, an embodiment of the present invention provides a cell access method, including when a terminal communicating with a first cell needs to communicate with a second cell, initiating, by the terminal, a connection establishment process, establishing, by using the connection establishment process, a wireless connection by which the terminal communicates with the second cell, and accessing the second cell by using the established wireless connection, and after receiving a reconfiguration message sent by a first base station of the first cell, reconfiguring, by the terminal, the wireless connection according to the reconfiguration message, and communicating with the second cell by using the reconfigured wireless connection, where the reconfiguration message is sent by the first base station to the terminal after the first base station determines, according to a terminal access indication message that is received from a second base station of the second cell and is used to indicate that the terminal accesses the second cell, that the terminal accesses the second cell, and after the first base station determines that the second base station allows addition of the second cell as a cell communicating with the terminal.

With reference to the eighth aspect, in a first possible implementation, after the terminal reconfigures the wireless connection according to the reconfiguration message, and before the terminal communicates with the second cell by using the reconfigured wireless connection, the method further includes sending, by the terminal, a reconfiguration complete message to the first base station, so as to indicate to the first base station that the terminal has completed reconfiguration of the wireless connection according to the reconfiguration message.

With reference to the eighth aspect or the first possible implementation of the eighth aspect, in a second possible implementation, before the terminal establishes the wireless connection to the second cell, the method further includes measuring, by the terminal, a wireless signal transmitted in the second cell, and determining, according to a measurement result of the measuring, that the second cell is available.

With reference to the second possible implementation of the eighth aspect, in a third possible implementation, before the measuring, by the terminal, a wireless signal transmitted in the second cell, the method further includes receiving, by the terminal, a measurement configuration message sent by the first base station, where the measurement configuration message includes cell identity information of the second cell, and information about a decision condition used to determine whether the second cell is available, and the measuring, by the terminal, a wireless signal sent in the second cell, and determining, according to a measurement result of the measuring, that the second cell is available includes measuring, by the terminal according to the cell identity information of the second cell that is included in the measurement configuration message, the wireless signal transmitted in the second cell, and when the measurement result of the measuring meets the decision condition, determining that the second cell is available.

With reference to the second possible implementation of the eighth aspect, in a fourth possible implementation, before the measuring, by the terminal, a wireless signal transmitted in the second cell, the method further includes receiving, by the terminal, a measurement configuration message sent by the first base station, where the measurement configuration message includes frequency information of the second cell, and information about a decision condition used to determine whether the second cell is available, and the measuring, by the terminal, a wireless signal transmitted in the second cell, and determining, according to a measurement result of the measuring, that the second cell is available includes measuring, by the terminal according to the frequency information of the second cell that is included in the measurement configuration message, the wireless signal transmitted in the second cell, and when the measurement result of the measuring meets the decision condition, determining that the second cell is available.

With reference to any one of the second to the fourth possible implementations of the eighth aspect, in a fifth possible implementation, before the measuring, by the terminal, a wireless signal transmitted in the second cell, the method further includes receiving, by the terminal, a first indication message sent by the second base station or the first base station, and determining, by the terminal according to the first indication message, that the second cell may be added as a cell communicating with the terminal, where the first indication message is used to indicate that the second cell may provide communication for a same terminal together with the first cell.

With reference to any one of the eighth aspect, or the first to the fifth possible implementations of the eighth aspect, in a sixth possible implementation, the first base station is a macro base station or a small node, or the first base station includes a first node of the first cell and a first control node configured to control the first node, where the first node is configured to process transmission between the terminal and the first control node, and the second base station is a small node, a macro base station, or a Wireless Fidelity WiFi access point AP.

According to a ninth aspect, an embodiment of the present invention provides a cell access method, including receiving, by a first base station of a first cell, a terminal access indication message that is sent by a second base station of a second cell and is used to indicate that a terminal communicating with the first cell accesses the second cell, and after receiving the terminal access indication message, and if determining that the second base station allows addition of the second cell as a cell communicating with the terminal, sending, by the first base station, a reconfiguration message to the terminal, so as to instruct the terminal to reconfigure, according to the reconfiguration message, a wireless connection established when the terminal accesses the second cell, and communicate with the second cell by using the configured wireless connection.

With reference to the ninth aspect, in a first possible implementation, the terminal access indication message is further used to indicate that the second base station allows addition of the second cell as a cell communicating with the terminal, and the determining, by the first base station, that the second base station allows addition of the second cell as a cell communicating with the terminal includes after receiving the terminal access indication message, determining, by the first base station, that the second base station allows addition of the second cell as a cell communicating with the terminal.

With reference to the first possible implementation of the ninth aspect, in a second possible implementation, the terminal access indication message carries a wireless connection parameter that is used to reconfigure the wireless connection, and the sending, by the first base station, a reconfiguration message to the terminal includes adding, by the first base station to the reconfiguration message, the wireless connection parameter obtained from the terminal access indication message, and sending the reconfiguration message to the terminal, where the reconfiguration message is specifically used to instruct the terminal to reconfigure the wireless connection according to the wireless connection parameter, and communicate with the second cell by using the configured wireless connection.

With reference to the ninth aspect, in a third possible implementation, after the first base station receives the terminal access indication message, the method further includes sending, by the first base station, a cell addition request message to the second base station, so as to request the second base station to add the second cell as a cell communicating with the terminal, and the determining, by the first base station, that the second base station allows addition of the second cell as a cell communicating with the terminal includes after receiving a cell addition request acknowledgement message sent by the second base station in response to the cell addition request message, determining, by the first base station, that the second base station allows addition of the second cell as a cell communicating with the terminal.

With reference to the third possible implementation of the ninth aspect, in a fourth possible implementation, the cell addition request acknowledgement message carries a wireless connection parameter that is used to reconfigure the wireless connection, and the sending, by the first base station, a reconfiguration message to the terminal includes adding, by the first base station to the reconfiguration message, the wireless connection parameter obtained from the cell addition request acknowledgement message, and sending the reconfiguration message to the terminal, where the reconfiguration message is specifically used to instruct the terminal to reconfigure the wireless connection according to the wireless connection parameter, and communicate with the second cell by using the configured wireless connection.

With reference to any one of the ninth aspect, or the first to the fourth possible implementations of the ninth aspect, in a fifth possible implementation, after the first base station sends the reconfiguration message to the terminal, the method further includes receiving, by the first base station, a reconfiguration complete message sent by the terminal in response to the reconfiguration message, determining, by the first base station according to the reconfiguration complete message, that the terminal has completed reconfiguration of the wireless connection according to the reconfiguration message, and sending, by the first base station, a cell addition complete message to the second base station, so as to indicate the second base station that the terminal has completed reconfiguration of the wireless connection.

With reference to any one of the ninth aspect, or the first to the fifth possible implementations of the ninth aspect, in a sixth possible implementation, before the first base station receives the terminal access indication message, the method further includes sending, by the first base station, a measurement configuration message to the terminal, where the measurement configuration message includes cell identity information of the second cell, and information about a decision condition used to determine whether the second cell is available, so as to instruct the terminal to measure, according to the cell identity information of the second cell that is included in the measurement configuration message, a wireless signal transmitted in the second cell, and when a measurement result of the measuring meets the decision condition, determine that the second cell is available.

With reference to any one of the ninth aspect, or the first to the fifth possible implementations of the ninth aspect, in a seventh possible implementation, before the first base station receives the terminal access indication message, the method further includes sending, by the first base station, a measurement configuration message to the terminal, where the measurement configuration message includes frequency information of the second cell, and information about a decision condition used to determine whether the second cell is available, so as to instruct the terminal to measure, according to the frequency information of the second cell that is included in the measurement configuration message, a wireless signal transmitted in the second cell, and when a measurement result of the measuring meets the decision condition, determine that the second cell is available.

With reference to the sixth or the seventh possible implementation of the ninth aspect, in an eighth possible implementation, before the first base station sends the measurement configuration message, the method further includes sending, by the first base station, a first indication message to the terminal, where the first indication message is used to indicate that the second cell may provide communication for a same terminal together with the first cell.

With reference to any one of the ninth aspect, or the first to the eighth possible implementations of the ninth aspect, in a ninth possible implementation, the first base station is a macro base station or a small node, or the first base station includes a first node of the first cell and a first control node configured to control the first node, where the first node is configured to process transmission between the terminal and the first control node, and the second base station is a small node, a macro base station, or a Wireless Fidelity WiFi access point AP.

According to a tenth aspect, an embodiment of the present invention provides a cell access method, including establishing, by a second base station of a second cell, a wireless connection between a terminal and the second cell in a connection establishment process initiated by the terminal, and allowing the terminal to access the second cell by using the wireless connection, and after the terminal accesses the second cell, sending, by the second base station, a terminal access indication message to a first base station of a first cell communicating with the terminal, so as to indicate that the second cell needs to be added, for the terminal, as a cell communicating with the terminal.

With reference to the tenth aspect, in a first possible implementation, the terminal access indication message is further used to indicate that the second base station allows addition of the second cell as a cell communicating with the terminal, and the sending, by the second base station, the terminal access indication message to the first base station includes adding, by the second base station to the terminal access indication message, a wireless connection parameter that is used to reconfigure the wireless connection, so as to instruct the first base station to instruct the terminal to reconfigure the wireless connection according to the wireless connection parameter.

With reference to the first possible implementation of the tenth aspect, in a second possible implementation, after the second base station sends the terminal access indication message to the first base station, the method further includes receiving, by the second base station, a cell addition complete message sent by the first base station, and after receiving the cell addition complete message, communicating, by the second base station, with the terminal by using the reconfigured wireless connection.

With reference to the tenth aspect, in a third possible implementation, after the second base station sends the terminal access indication message to the first base station, the method further includes receiving, by the second base station, a cell addition request message sent by the first base station, where the cell addition request message is used to request the second base station to add the second cell as a cell communicating with the terminal, and sending, by the second base station, a cell addition request acknowledgement message to the first base station in response to the cell addition request message, so as to indicate that the second base station allows addition of the second cell as a cell communicating with the terminal, where the cell addition request acknowledgement message carries a wireless connection parameter that is used to reconfigure the wireless connection, so as to instruct the first base station to instruct the terminal to reconfigure the wireless connection according to the wireless connection parameter.

With reference to the third possible implementation of the tenth aspect, in a fourth possible implementation, after the second base station sends the cell addition request acknowledgement message to the first base station, the method further includes receiving, by the second base station, a cell addition complete message sent by the first base station, and after receiving the cell addition complete message, communicating, by the second base station, with the terminal by using the reconfigured wireless connection.

With reference to any one of the tenth aspect, or the first to the fourth possible implementations of the tenth aspect, in a fifth possible implementation, before the second base station establishes the wireless connection between the terminal and the second cell, the method further includes sending, by the second base station, a first indication message to the terminal, so as to indicate that the second cell may provide communication for a same terminal together with the first cell, where the connection establishment process initiated by the terminal is initiated by the terminal after the terminal receives the first indication message and determines, according to the first indication message, that the first cell may provide communication for the terminal together with the first cell.

With reference to any one of the tenth aspect, or the first to the fifth possible implementations of the tenth aspect, in a sixth possible implementation, the first base station is a macro base station or a small node, or the first base station includes a first node of the first cell and a first control node configured to control the first node, where the first node is configured to process transmission between the terminal and the first control node, and the second base station is a small node, a macro base station, or a Wireless Fidelity WiFi access point AP.

According to an eleventh aspect, an embodiment of the present invention provides a terminal, including a processing module and a transceiver module, where the processing module is configured to control the transceiver module to report an address of the terminal to a location server, and the transceiver module is configured to receive an Internet Protocol IP packet sent by an application server in an Internet according to the address of the terminal, where the application server obtains the address of the terminal from the location server, and the location server is configured to store the address of the terminal, and provide the address of the terminal for the application server.

With reference to the eleventh aspect, in a first possible implementation, the processing module is specifically configured to control the transceiver module to report the address of the terminal by using control plane signaling.

With reference to the first possible implementation of the eleventh aspect, in a second possible implementation, if multiple data transmission paths exist between the terminal and the application server, the processing module is specifically configured to for each of the data transmission paths, control the transceiver module to report an address of the terminal on the path by using the control plane signaling.

With reference to the eleventh aspect, or the first or the second possible implementation of the eleventh aspect, in a third possible implementation, the address of the terminal includes at least one of the following addresses a public Internet Protocol IP address of the terminal, an IP address of an access gateway to which the terminal is connected, or an identity of an access gateway to which the terminal is connected, where the terminal accesses the Internet by using the access gateway to which the terminal is connected, and performs packet transmission with the application server in the Internet.

With reference to the eleventh aspect, in a fourth possible implementation, the processing module is specifically configured to control the transceiver module to send an Internet Protocol IP packet to the location server, use a source IP address in the sent IP packet as the address of the terminal, and report the address of the terminal to the location server.

With reference to the fourth possible implementation of the eleventh aspect, in a fifth possible implementation, if multiple data transmission paths exist between the terminal and the application server, the processing module is specifically configured to for each of the multiple data transmission paths, control the transceiver module to send an Internet Protocol IP packet to the location server by using the data transmission path, use a source IP address in the sent IP packet as an address of the terminal on the data transmission path, and report the address of the terminal to the location server.

With reference to any one of the eleventh aspect, or the first to the fifth possible implementations of the eleventh aspect, in a sixth possible implementation, the location server is a server that is in the Internet and that is independent of the application server, or the location server is located in the application server.

With reference to any one of the eleventh aspect, or the first to the sixth possible implementations of the eleventh aspect, in a seventh possible implementation, the processing module is specifically configured to control the transceiver module to periodically report the address of the terminal to the location server, and/or control the transceiver module to report the address of the terminal to the location server when a path from the terminal to the application server or the location server changes.

With reference to any one of the eleventh aspect, or the first to the seventh possible implementations of the eleventh aspect, in an eighth possible implementation, the processing module is further configured to before controlling the transceiver module to report the address of the terminal to the location server, select a to-be-accessed network according to at least one of the following factors a service type of a service to be established by the terminal, a quality of service QoS requirement of a service to be established by the terminal, or a preset network to be preferably accessed by the terminal, and the processing module is specifically configured to control the transceiver module to report, to the location server, an address of the terminal in each to-be-accessed network selected by the terminal.

According to a twelfth aspect, an embodiment of the present invention provides a location server, including a transceiver module, configured to receive an address of a terminal that is reported by the terminal, and a processing module, configured to notify, an application server performing data transmission with the terminal, of the address of the terminal that is received by the transceiver module, so that the application server sends an Internet Protocol IP packet to the terminal according to the address of the terminal.

With reference to the twelfth aspect, in a first possible implementation, the processing module is specifically configured to after receiving, by using the transceiver module, a request message that is sent by the application server and is for requesting the address of the terminal, notify, the application server performing data transmission with the terminal, of the address of the terminal that is received by the transceiver module.

With reference to the twelfth aspect or the first possible implementation of the twelfth aspect, in a second possible implementation, the transceiver module is specifically configured to receive the address of the terminal that is reported by the terminal by using control plane signaling.

With reference to the second possible implementation of the twelfth aspect, in a third possible implementation, the transceiver module is specifically configured to receive an address that is of the terminal on each of multiple data transmission paths existing between the terminal and the application server and that is reported by the terminal for the path by using the control plane signaling.

With reference to any one of the twelfth aspect, or the first to the third possible implementations of the twelfth aspect, in a fourth possible implementation, the address of the terminal includes at least one of the following addresses: a public Internet Protocol IP address of the terminal, an IP address of an access gateway to which the terminal is connected, or an identity of an access gateway to which the terminal is connected, where the terminal accesses an Internet by using the access gateway to which the terminal is connected, and performs packet transmission with the application server in the Internet.

With reference to the twelfth aspect or the first possible implementation of the twelfth aspect, in a fifth possible implementation, the transceiver module is specifically configured to receive an IP packet sent by the terminal, and use a source IP address in the received IP packet as the address of the terminal.

With reference to the fifth possible implementation of the twelfth aspect, in a sixth possible implementation, the transceiver module is specifically configured to receive an IP packet sent by the terminal by using each of multiple data transmission paths existing between the terminal and the application server, and use a source IP address in the received IP packet as an address of the terminal on the data transmission path.

With reference to any one of the twelfth aspect, or the first to the sixth possible implementations of the twelfth aspect, in a seventh possible implementation, the location server is a server that is in the Internet and that is independent of the application server, or the location server is located in the application server.

With reference to any one of the twelfth aspect, or the first to the seventh possible implementations of the twelfth aspect, in an eighth possible implementation, the transceiver module is specifically configured to receive the address of the terminal that is periodically reported by the terminal, and/or receive the address of the terminal that is reported by the terminal when a path from the terminal to the application server or the location server changes.

According to a thirteenth aspect, an embodiment of the present invention provides a data transmission method, including reporting, by a terminal, an address of the terminal to a location server, and receiving, by the terminal, an Internet Protocol IP packet sent by an application server in an Internet according to the address of the terminal, where the application server obtains the address of the terminal from the location server, and the location server is configured to store the address of the terminal, and provide the address of the terminal for the application server.

With reference to the thirteenth aspect, in a first possible implementation, the reporting, by a terminal, an address of the terminal to a location server includes reporting, by the terminal, the address of the terminal by using control plane signaling.

With reference to the first possible implementation of the thirteenth aspect, in a second possible implementation, if multiple data transmission paths exist between the terminal and the application server, the reporting, by the terminal, the address of the terminal by using control plane signaling includes for each of the data transmission paths, reporting, by the terminal, an address of the terminal on the path by using the control plane signaling.

With reference to the thirteenth aspect, or the first or the second possible implementation of the thirteenth aspect, in a third possible implementation, the address of the terminal includes at least one of the following addresses: a public Internet Protocol IP address of the terminal, an IP address of an access gateway to which the terminal is connected, or an identity of an access gateway to which the terminal is connected, where the terminal accesses the Internet by using the access gateway to which the terminal is connected, and performs packet transmission with the application server in the Internet.

With reference to the thirteenth aspect, in a fourth possible implementation, the reporting, by a terminal, an address of the terminal to a location server includes sending, by the terminal, an Internet Protocol IP packet to the location server, using a source IP address in the sent IP packet as the address of the terminal, and reporting the address of the terminal to the location server.

With reference to the fourth possible implementation of the thirteenth aspect, in a fifth possible implementation, if multiple data transmission paths exist between the terminal and the application server, the reporting, by a terminal, an address of the terminal to a location server includes for each of the multiple data transmission paths, sending, by the terminal, an Internet Protocol IP packet to the location server by using the data transmission path, using a source IP address in the sent IP packet as an address of the terminal on the data transmission path, and reporting the address of the terminal to the location server.

With reference to any one of the thirteenth aspect, or the first to the fifth possible implementations of the thirteenth aspect, in a sixth possible implementation, the location server is a server that is in the Internet and that is independent of the application server, or the location server is located in the application server.

With reference to any one of the thirteenth aspect, or the first to the sixth possible implementations of the thirteenth aspect, in a seventh possible implementation, the reporting, by a terminal, an address of the terminal to a location server includes periodically reporting, by the terminal, the address of the terminal to the location server, and/or reporting, by the terminal, the address of the terminal to the location server when a path from the terminal to the application server or the location server changes.

With reference to any one of the thirteenth aspect, or the first to the seventh possible implementations of the thirteenth aspect, in an eighth possible implementation, before the reporting, by a terminal, an address of the terminal to a location server, the method further includes: selecting, by the terminal, a to-be-accessed network according to at least one of the following factors: a service type of a service to be established by the terminal, a quality of service QoS requirement of a service to be established by the terminal, or a preset network to be preferably accessed by the terminal, and the reporting, by a terminal, an address of the terminal to a location server includes reporting, by the terminal to the location server, an address of the terminal in each to-be-accessed network selected by the terminal.

According to a fourteenth aspect, an embodiment of the present invention provides a data transmission method, including receiving, by a location server, an address of a terminal that is reported by the terminal, and notifying, by the location server, an application server performing data transmission with the terminal, of the received address of the terminal, so that the application server sends an Internet Protocol IP packet to the terminal according to the address of the terminal.

With reference to the fourteenth aspect, in a first possible implementation, the notifying, by the location server, an application server performing data transmission with the terminal, of the received address of the terminal includes after receiving a request message that is sent by the application server and is for requesting the address of the terminal, notifying, by the location server, the application server performing data transmission with the terminal, of the received address of the terminal.

With reference to the fourteenth aspect or the first possible implementation of the fourteenth aspect, in a second possible implementation, the receiving, by a location server, an address of a terminal that is reported by the terminal includes receiving, by the location server, the address of the terminal that is reported by the terminal by using control plane signaling.

With reference to the second possible implementation of the fourteenth aspect, in a third possible implementation, the receiving, by the location server, the address of the terminal that is reported by the terminal by using control plane signaling includes receiving, by the location server, an address that is of the terminal on each of multiple data transmission paths existing between the terminal and the application server and that is reported by the terminal for the path by using the control plane signaling.

With reference to any one of the fourteenth aspect, or the first to the third possible implementations of the fourteenth aspect, in a fourth possible implementation, the address of the terminal includes at least one of the following addresses: a public Internet Protocol IP address of the terminal, an IP address of an access gateway to which the terminal is connected, or an identity of an access gateway to which the terminal is connected, where the terminal accesses an Internet by using the access gateway to which the terminal is connected, and performs packet transmission with the application server in the Internet.

With reference to the fourteenth aspect or the first possible implementation of the fourteenth aspect, in a fifth possible implementation, the receiving, by a location server, an address of a terminal that is reported by the terminal includes receiving, by the location server, an IP packet sent by the terminal, and using a source IP address in the received IP packet as the address of the terminal.

With reference to the fifth possible implementation of the fourteenth aspect, in a sixth possible implementation, the receiving, by the location server, an IP packet sent by the terminal, and using a source IP address in the received IP packet as the address of the terminal includes receiving, by the location server, an IP packet sent by the terminal by using each of multiple data transmission paths existing between the terminal and the application server, and using a source IP address in the received IP packet as an address of the terminal on the data transmission path.

With reference to any one of the fourteenth aspect, or the first to the sixth possible implementations of the fourteenth aspect, in a seventh possible implementation, the location server is a server that is in the Internet and that is independent of the application server, or the location server is located in the application server.

With reference to any one of the fourteenth aspect, or the first to the seventh possible implementations of the fourteenth aspect, in an eighth possible implementation, the receiving, by a location server, an address of a terminal that is reported by the terminal includes receiving, by the location server, the address of the terminal that is periodically reported by the terminal, and/or receiving, by the location server, the address of the terminal that is reported by the terminal when a path from the terminal to the application server or the location server changes.

In any one of solutions provided in the first to the fourth aspects, a terminal autonomously selects a to-be-accessed second cell, and actively requests a first base station to add a second cell. Compared with a solution that is in a current cell handover procedure and in which a terminal sends a measurement report and a base station performs handover decision, partial processing is performed by the terminal, so that processing of a network device such as a base station can be reduced, and implementation complexity of the network device can be reduced.

In any one of solutions provided in the fifth to the tenth aspects, a terminal first accesses a second cell, and a second base station of the second cell notifies a first base station of the access of the terminal. In this optional solution, the terminal can also autonomously select a to-be-accessed second cell.

In any one of solutions provided in the eleventh to the fourteenth aspects, a terminal reports an address of the terminal to a location server. The location server sends the received address of the terminal to an application server performing data transmission with the terminal, or an application server obtains the address of the terminal from the location server. The application server sends an IP packet to the terminal according to the obtained address of the terminal. The application server obtains the address of the terminal from the location server, so that the application server can send an IP packet to the terminal according to the obtained address of the terminal.

DETAILED DESCRIPTION OF ILLUSTRATIVE EMBODIMENTS

Figure 1:
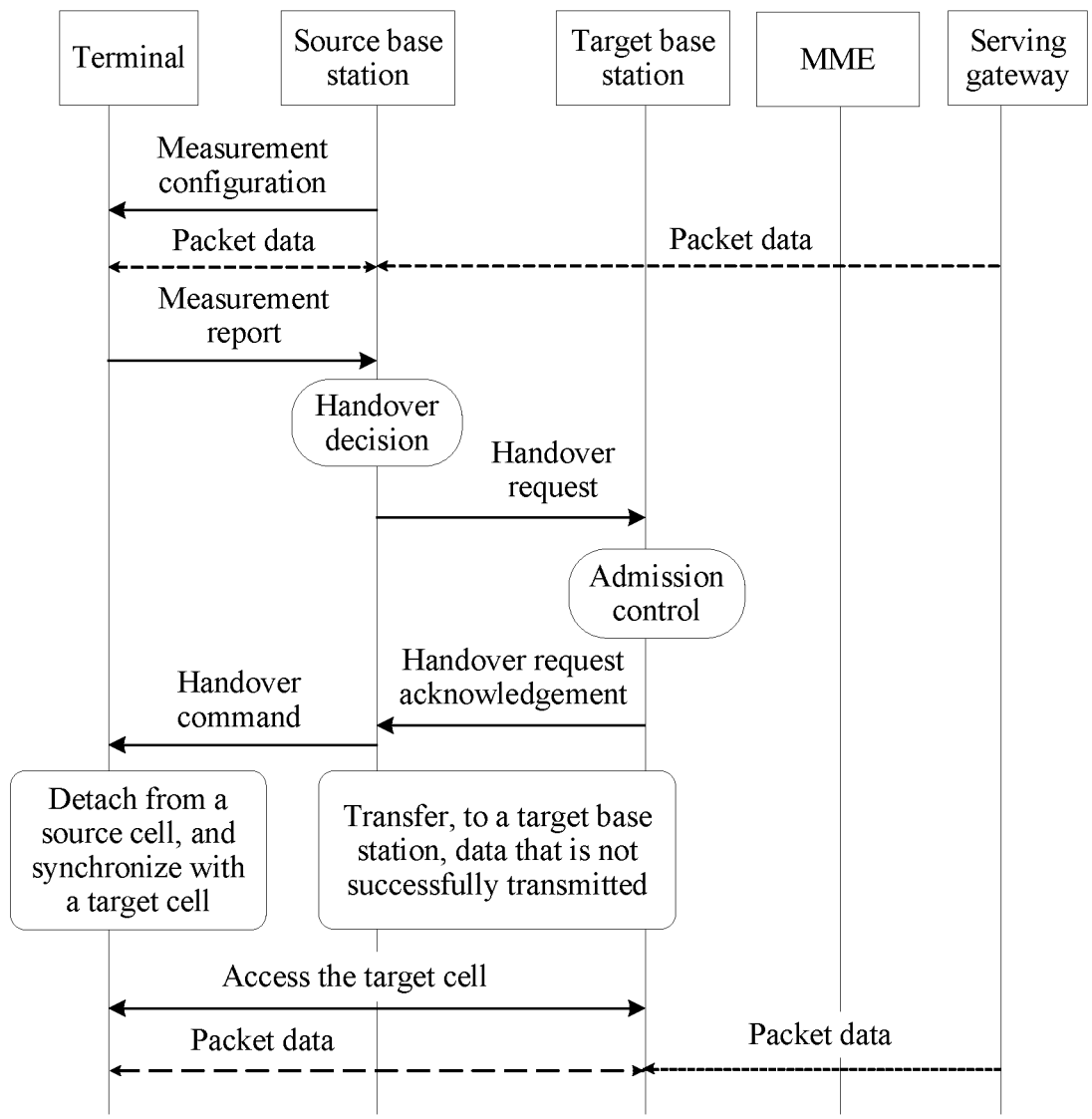
FIG. 1 is a schematic diagram of a cell handover procedure.

Embodiments of the present invention provide a terminal, a base station, and a cell access method, so as to enable the terminal to autonomously access a cell, and resolve the foregoing problem: Because a network device strictly controls the terminal, network implementation is complex, and deployment and maintenance are not easy to perform.

One optional solution includes the following content:

When a terminal communicating with a first cell needs to communicate with a second cell, the terminal sends a first cell addition request message to a first base station of the first cell, after receiving the first cell addition request message, the first base station sends a second cell addition request message to a second base station of the second cell, so as to request to add the second cell as a cell communicating with the terminal, and after receiving a cell addition request acknowledgement message sent by the second base station in response to the second cell addition request message, the first base station sends, to the terminal, a configuration message that is used to configure a wireless connection by which the terminal communicates with the second cell, so as to instruct the terminal to configure, according to the configuration message, the wireless connection by which the terminal communicates with the second cell, and access the second cell.

As is described above, in a current cell handover procedure, a terminal sends a measurement report, and a base station performs handover decision. However, in this optional solution, the terminal autonomously selects a to-be-accessed second cell, and actively requests the first base station to add a second cell. Partial processing is performed by the terminal, so that processing of a network device such as a base station can be reduced, and implementation complexity of the network device can be reduced.

Another optional solution includes the following content:

When a terminal communicating with a first cell needs to communicate with a second cell, the terminal accesses the second cell, after the terminal accesses the second cell, a second base station of the second cell sends a terminal access indication message to a first base station of the first cell, so as to indicate that the terminal accesses the second cell, and after receiving the terminal access indication message, and if determining that the second base station allows addition of the second cell as a cell communicating with the terminal, the first base station sends a reconfiguration message to the terminal, so as to instruct the terminal to reconfigure, according to the reconfiguration message, a wireless connection established when the terminal accesses the second cell, and communicate with the second cell by using the configured wireless connection.

Similarly, in this optional solution, the terminal can also autonomously select a to-be-accessed second cell. A difference between this optional solution and the former optional solution is: In the former optional solution, the terminal sends a message to the first base station, so as to request to access the second cell, in this solution, the terminal first accesses the second cell, and the second base station of the second cell notifies the first base station of the access of the terminal.

In either of the two optional solutions, the terminal can autonomously access the second cell.

Further, the embodiments of the present invention provide a terminal, a location server, and a data transmission method, so as to enable an application server to send an IP packet to the terminal.

A terminal reports an address of the terminal to a location server. The location server sends the received address of the terminal to an application server performing data transmission with the terminal, or an application server obtains the address of the terminal from the location server. The application server sends an IP packet to the terminal according to the obtained address of the terminal.

The application server obtains the address of the terminal from the location server, so that the application server can send an IP packet to the terminal according to the obtained address of the terminal.

Basic concepts used in the embodiments of the present invention are described in the following.

These basic concepts include a wireless communications system, a wireless communications standard, a base station, a terminal, a first server, a second server, an access node, a control plane anchor, a user plane anchor, radio resource control (RRC) signaling, and quality of service (QoS) management. These concepts are described one by one in the following.

1. Wireless Communications System

Generally, the wireless communications system is a system in which transmission is performed in some or all communications links wirelessly. A common type of wireless communications system generally includes:

at least one terminal, a radio access network, and a core network.

The core network is connected to an external application server or another communications system, implements communication between the terminal and the application server and/or the another communications system, and manages user information, quality of service, and the like of the terminal.

The radio access network is wirelessly connected to the terminal by using an air interface such as a Uu interface, so that the terminal can access the network.

A wireless connection may also be referred to as an air interface connection. The terminal keeps a wireless connection to a base station or an access node in the radio access network, and may communicate with the base station by using the wireless connection.

2. Wireless Communications Standard.

Different wireless communications standards may be used in different wireless communications systems. A wireless communications standard applicable to the embodiments of the present invention includes but is not limited to the following standards: a Global System for Mobile Communications (GSM), Code Division Multiple Access (CDMA) IS-95, Code Division Multiple Access (CDMA) 2000, Time Division-Synchronous Code Division Multiple Access (TD-SCDMA), Wideband Code Division Multiple Access (WCDMA), Time Division Duplex-Long Term Evolution (TDD LTE), Frequency Division Duplex-Long Term Evolution (FDD LTE), Long Term Evolution Advanced (LTE-advanced), a personal handy-phone system (PHS), Wireless Fidelity (WiFi) specified by the 802.11 family of protocols, Worldwide Interoperability for Microwave Access (WiMAX), and a short-range wireless communications system such as Bluetooth.

The embodiments of the present invention intend to provide a flattened network architecture. Persons skilled in the art may learn that the network architecture is applicable to not only various current possible wireless communications standards, but also various communications standards in a future wireless communications system.

3. Base Station

The base station is located in a radio access network in a wireless communications system. The base station communicates with a terminal by using an air interface, so that the terminal can access the network.

4. Terminal

The terminal may be user equipment, and includes but is not limited to a mobile phone, a tablet computer, a personal digital assistant (PDA), a point of sale (POS), and an in-vehicle computer.

For example, for an LTE system such as a TDD LTE system, an FDD LTE system, or an LTE-A system, the base station may be an evolved NodeB (eNodeB), and the terminal may be UE. For a TD-SCDMA system or a WCDMA system, the base station may include a NodeB (NodeB) or include a NodeB and a radio network controller (RNC), and the terminal may be UE. For a GSM system, the base station may include a base transceiver station (BTS) or include a BTS and a base station controller (BSC), and the terminal is a mobile station (MS). For a WiFi system, the base station may include an access point (AP) and/or an access controller (AC), and the terminal may be a station (STA).

5. First Server

The first server is configured to provide an application service for a terminal covered by the radio access network. For example, an application server provides a service for a user corresponding to the terminal, and the terminal receives service data from the application server or sends service data to the application server.

6. Second Server

The second server is configured to perform user information management on the terminal covered by the radio access network, for example, maintain subscription information and implement a function of an HSS in a current EPC.

Optionally, the second server may further perform user authentication, location update, and the like according to user information, to meet a requirement of a control plane anchor. The second server may be considered as a part in the core network. For example, the second server may be the following mobile network operator server 204 shown in FIG. 2.

User information managed by the second server may include the subscription information, user location information, and the like, and the second server stores the user information. Optionally, the second server may further perform user authentication, location update, and the like according to the user information, to meet the requirement of the control plane anchor.

The first server and the second server are collectively referred to as business support systems (Business Support System).

7. Access Node

The access node keeps a wireless connection to the at least one terminal in the radio access network, and implements communication between the terminal and the first server by using the wireless connection between the access node and the terminal.

The access node may be a base station in a cellular wireless communications system (different from a WiFi system), and may include a macro base station, a small node, or even a light node that implements only some air interface functions, or may be another node such as a WiFi AP in the WiFi system.

The small node may be a base station that has a relatively small communication coverage area and a relatively low maximum transmit power, for example, a small cell, a pico cell, a home eNodeB, a home NodeB, or a femto cell. Compared with the macro base station, the small node has low-power, small-volume, and easy-to-deploy advantages, and may be flexibly deployed at a lamp pole, on a billboard, or indoors. The small node may be configured to fill coverage holes of wireless coverage, and may also be configured to expand a capacity of the radio access network. A communication coverage radius of the small node is usually less than a preset threshold such as 100 m, and a maximum transmit power of the micro base station is usually less than a preset power threshold such as 10 w.

The light node may be a base station that does not implement a complete air interface protocol stack. For example, in an LTE system, a base station that implements only a PHY layer, a MAC layer, and an RLC layer in an LTE air interface protocol stack but does not implement a PDCP layer and an RRC layer may be referred to as the light node.

8. Control Plane Anchor

The control plane anchor may control the terminal covered by the radio access network to establish a wireless connection to one or more access nodes, and enable, by exchanging information with the second server, the second server to perform user information management on the terminal.

The control plane anchor may be a base station in the cellular wireless communications system, for example, a macro base station, or may be another control-plane centralized control point, for example, a controller in an access network implemented based on software-defined networking (SDN).

9. User Plane Anchor

The user plane anchor may send, to the first server, user plane data that is forwarded by one or more access nodes and that is from a terminal keeping a wireless connection to the one or more access nodes, and may send, to the terminal by using the access node connected to the terminal, user plane data that is received from the first server and that is to be sent to the terminal keeping a wireless connection to the one or more access nodes.

The user plane anchor may be a user-plane convergence node such as a universal gateway (UGW). For example, the UGW may be a local gateway (LGW). The LGW may be located in the base station, or the LGW and the base station may be deployed together.

The user plane anchor and the control plane anchor may be collectively referred to as access anchors. An access anchor may be both a user plane anchor and a control plane anchor, or may be only a user plane anchor, or may be only a control plane anchor.

10. Network Architecture of a Radio Access Network including an Access Node and a Control Plane Anchor and/or a User Plane Anchor When this network architecture is used, a terminal keeps a wireless connection to the access node, for example, an RRC connection. If the control plane anchor exists, the access node is connected to the control plane anchor. If the user plane anchor exists, the access node is connected to the user plane anchor.

11. RRC Signaling

In a current LTE system, an RRC layer is the topmost control-plane layer in a radio access network protocol stack, and is a control plane protocol. The RRC layer may provide services such as connection management and message transfer for a non-access stratum, provide a parameter configuration function for each lower-layer protocol entity in the radio access network, and take responsibility for measurement, control, and the like related to mobility management of UE.

The embodiments of the present invention are described in detail in the following with reference to the accompanying drawings. First, a first cell access solution and a second cell access solution that are provided in the embodiments of the present invention are described. Next, a data transmission solution provided in the embodiments of the present invention is described.

First Cell Access Solution

Figure 2:
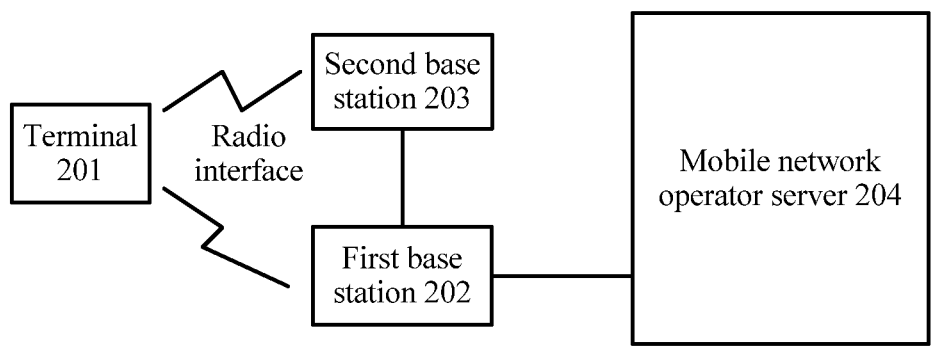
FIG. 2 is a schematic structural diagram of a wireless communications system according to an embodiment of the present invention.

The first cell access solution may be applied to a wireless communications system shown in FIG. 2. The wireless communications system includes a terminal 201, a first base station 202, and a second base station 203. The terminal 201 communicates with a first cell of the first base station 202.

Figure 3:
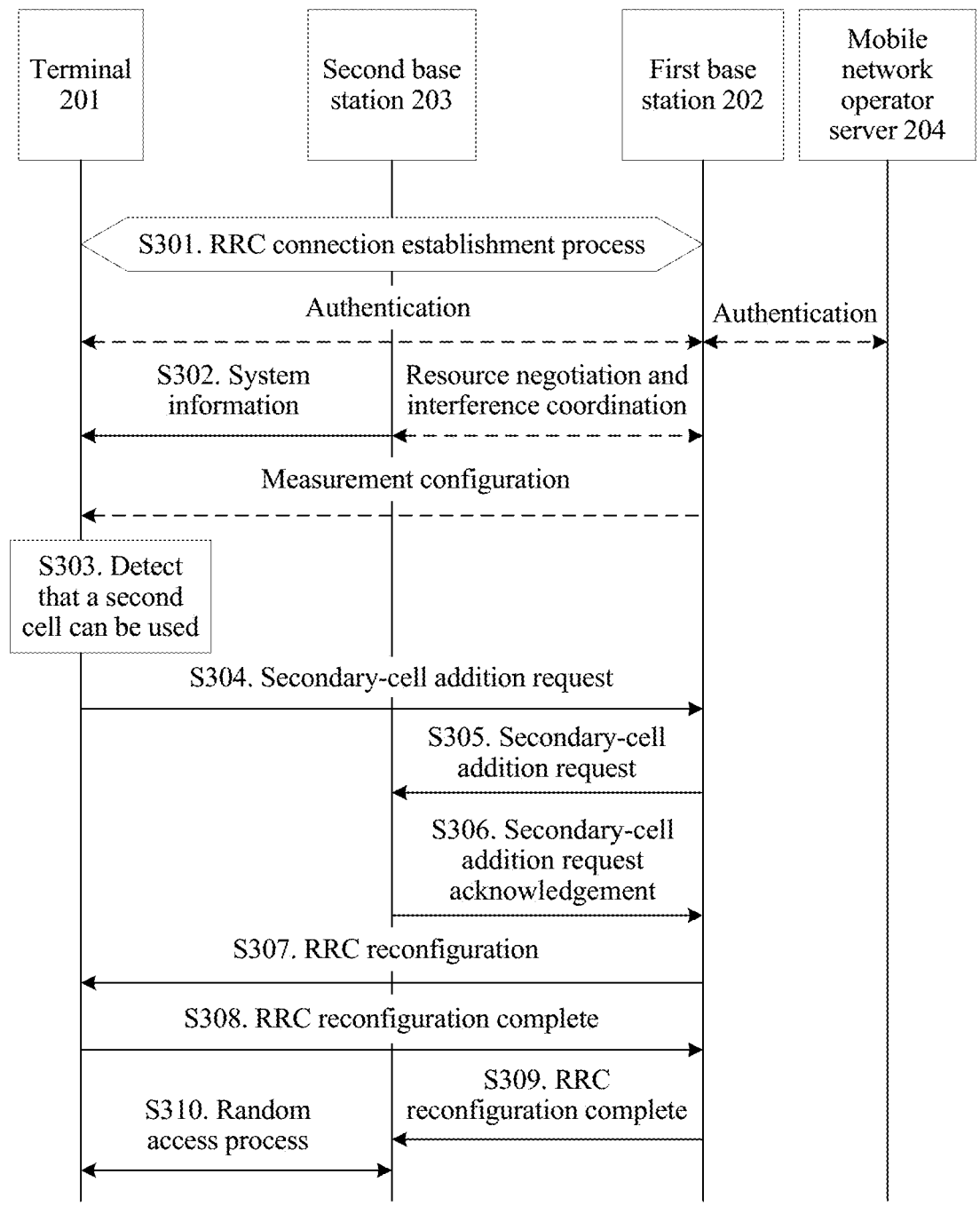
FIG. 3 is a flowchart of an optional implementation of a first cell access solution according to an embodiment of the present invention.

The terminal 201 is configured to when the terminal 201 needs to communicate with a second cell of the second base station 203, send a first cell addition request message to the first base station 202, for example, a secondary-cell addition request message sent by the terminal 201 in step S304 in FIG. 3.

The first base station 202 is configured to after receiving the first cell addition request message, send a second cell addition request message to the second base station 203, for example, a secondary-cell addition request message sent by the first base station 202 in step S305 in FIG. 3, so as to request to add the second cell as a cell communicating with the terminal.

The second base station 203 is configured to after receiving the second cell addition request message, if it is determined that the second cell may be added as a cell communicating with the terminal 201, send a cell addition request acknowledgement message to the first base station 202 in response to the second cell addition request message.

The first base station 202 is further configured to after receiving the cell addition request acknowledgement message sent by the second base station 203, send, to the terminal 201, a configuration message that is used to configure a wireless connection by which the terminal 201 communicates with the second cell, for example, an RRC reconfiguration message sent by the first base station 202 in step S307 in FIG. 3.

The terminal 201 is further configured to configure, according to the configuration message sent by the first base station 202, the wireless connection by which the terminal 201 communicates with the second cell, and access the second cell.

Optionally, the wireless communications system may further include a mobile network operator server 204, configured to perform authentication on the terminal 201.

With reference to a procedure shown in FIG. 3, a first cell access solution provided in an embodiment of the present invention is described in detail in the following.

The procedure shown in FIG. 3 includes the following steps.

S301. A terminal 201 accesses a first cell of a first base station 202.

After the terminal 201 is powered on, the terminal 201 may access the first base station 202 by using an RRC connection establishment process. In an access process, the terminal 201 may report an autonomous access capability of the terminal 201 or a user preference. The first base station 202 and/or a mobile network operator server 204 does not perform mobility management and/or service continuity management for a user according to the capability or the user preference.

After the access, the terminal initiates a user authentication process between the terminal and the mobile network operator server 204. The mobile network operator server 204 may send subscription information to the first base station 202. The first base station 202 may perform data transmission QoS management according to the subscription information, so as to preferably ensure a high-priority user and/or a high-priority service.

S302. The terminal 201 reads system information of a second cell of a second base station 203.

The system information includes information about a base station or a cell that may perform carrier aggregation (CA) or dual connectivity (DC) with the second cell, for example, a base station identity that is of the first base station 202 and is used to indicate that the second cell may perform dual connectivity with any cell of the first base station 202.

The terminal 201 determines, according to the obtained system information, that the second cell may be added as a cell communicating with the terminal 201. Therefore, the system information may also be considered as an indication message indicating the terminal 201 that the second cell may provide communication for a same terminal together with the first cell.

Alternatively, an indication message may be sent by the first base station 202, and the indication message includes information about a base station or a cell that may perform carrier aggregation or dual connectivity with the first base station 202 or the first cell. In this case, the terminal 201 may also determine, according to the indication message sent by the first base station 202, that the second cell may be added as a cell communicating with the terminal 201.

Before step S302, a resource negotiation and interference coordination process may exist between the first base station 202 and the second base station 203. By coordinating radio resources used between base stations, inter-station interference is reduced, and radio resource utilization is improved.

S303. The terminal 201 detects that the second cell of the second base station 203 can be used.

The terminal 201 discovers the second cell by means of network search and/or measurement, and determines whether the second cell is available. Before this step, the first base station 202 may send a measurement configuration message to the terminal 201, so as to indicate, to the terminal 201, a to-be-measured cell, a decision threshold that is for each to-be-measured cell and is for determining whether the cell is available, and the like. The terminal 201 may determine, according to a pre-defined decision criterion used to determine whether a cell is available, whether a cell is available, for example, a wireless network type and/or a pre-defined cell signal strength threshold.

For example, the measurement configuration message may include cell identity information of the second cell, and information about a decision condition used to determine whether the second cell is available. The terminal 201 measures, according to the cell identity information of the second cell that is included in the measurement configuration message, a wireless signal transmitted in the second cell, and when a measurement result meets the decision condition, determines that the second cell is available.

For another example, the measurement configuration message may include frequency information of the second cell, and information about a decision condition used to determine whether the second cell is available. The terminal measures, according to the frequency information of the second cell that is included in the measurement configuration message, a wireless signal transmitted in the second cell, and when a measurement result meets the decision condition, determines that the second cell is available.

S304. The terminal 201 sends a secondary-cell addition request message to the first base station 202.

After the terminal 201 detects that the second cell is available, and determines, according to the information obtained in step S302, that the second cell may provide communication for the terminal 201 together with the first cell, for example, the second cell may perform dual connectivity with the first cell, the terminal 201 initiates a process of adding a secondary cell for dual connectivity. The secondary-cell addition request message includes indication information of a to-be-added secondary cell, that is, the second cell, for example, a physical cell identifier (PCI) of the second cell.

Herein, it should be noted that both the process of adding a secondary cell and the secondary-cell addition request message are examples, and any message that can implement addition of the second cell as a cell communicating with the terminal 201 may be applied to the first cell access solution provided in this embodiment of the present invention. In addition, names of other messages in this solution are also examples only, and any message that can implement a corresponding function may be considered as an optional implementation in this solution.

S305. The first base station 202 sends a "secondary-cell addition request" message to the second base station 203.

The message is used to request to add the second cell as a cell communicating with the terminal 201. Optionally, the message may include information about the to-be-added second cell, for example, the identity information or the frequency information of the second cell. In addition, the message may include parameter information for performing, between the first base station 202 and the second base station 203, uplink power control and negotiation of a maximum bit rate and the like for the terminal 201, and bearer configuration information.

S306. The second base station 203 sends a "secondary-cell addition request acknowledgement" message to the first base station 202.

The second base station 203 indicates, by using the message, the first base station 202 that the second cell may be added as a cell communicating with the terminal 201. The message may further include configuration information for the terminal 201 on the second base station 203.

S307. The first base station 202 sends an "RRC reconfiguration" message to the terminal 201.

The message is used to notify the terminal 201 that the second cell is to be added as a cell communicating with the terminal 201, for example, as a secondary cell for dual connectivity. The message may carry the configuration information obtained in step S306. The terminal 201 may configure, according to the information, a wireless connection by which the terminal 201 communicates with the second cell.

S308. The terminal 201 sends an RRC reconfiguration complete message to the first base station 202.

The message is used to indicate that the terminal 201 has completed configuration of the wireless connection according to the configuration information in step S307, for example, indicate that the terminal 201 has configured the second cell as a secondary cell for dual connectivity.

S309. The first base station 202 sends an RRC reconfiguration complete message to the second base station 203.

After receiving the RRC reconfiguration complete message sent by the terminal, the first base station 202 sends an RRC reconfiguration complete message to the second base station 203, so as to indicate the second base station 203 that the terminal 201 has configured the second cell as a secondary cell for dual connectivity.

S310. The terminal initiates a random access process to the second cell, and accesses the second cell.

There is no strict sequence between step S310 and step S308.

After accessing the second cell, the terminal 201 can perform data transmission by using both the first cell and the second cell, and implement dual connectivity.

Second Cell Access Solution

A difference between the second cell solution and the first cell access solution is: In the first cell access solution, a terminal 201 sends a message to a first base station 202, so as to request to access a second cell, in the second cell access solution, the terminal 201 first accesses the second cell, and a second base station 203 of the second cell notifies the first base station 202 of the access of the terminal.

The second cell access solution may also be applied to the wireless communications system shown in FIG. 2.

A terminal 201 is configured to when the terminal 201 needs to communicate with a second cell of a second base station 203, initiate a connection establishment process, establish, by using the connection establishment process, a wireless connection by which the terminal 201 communicates with the second cell, and access the second cell by using the established wireless connection.

Figure 4:
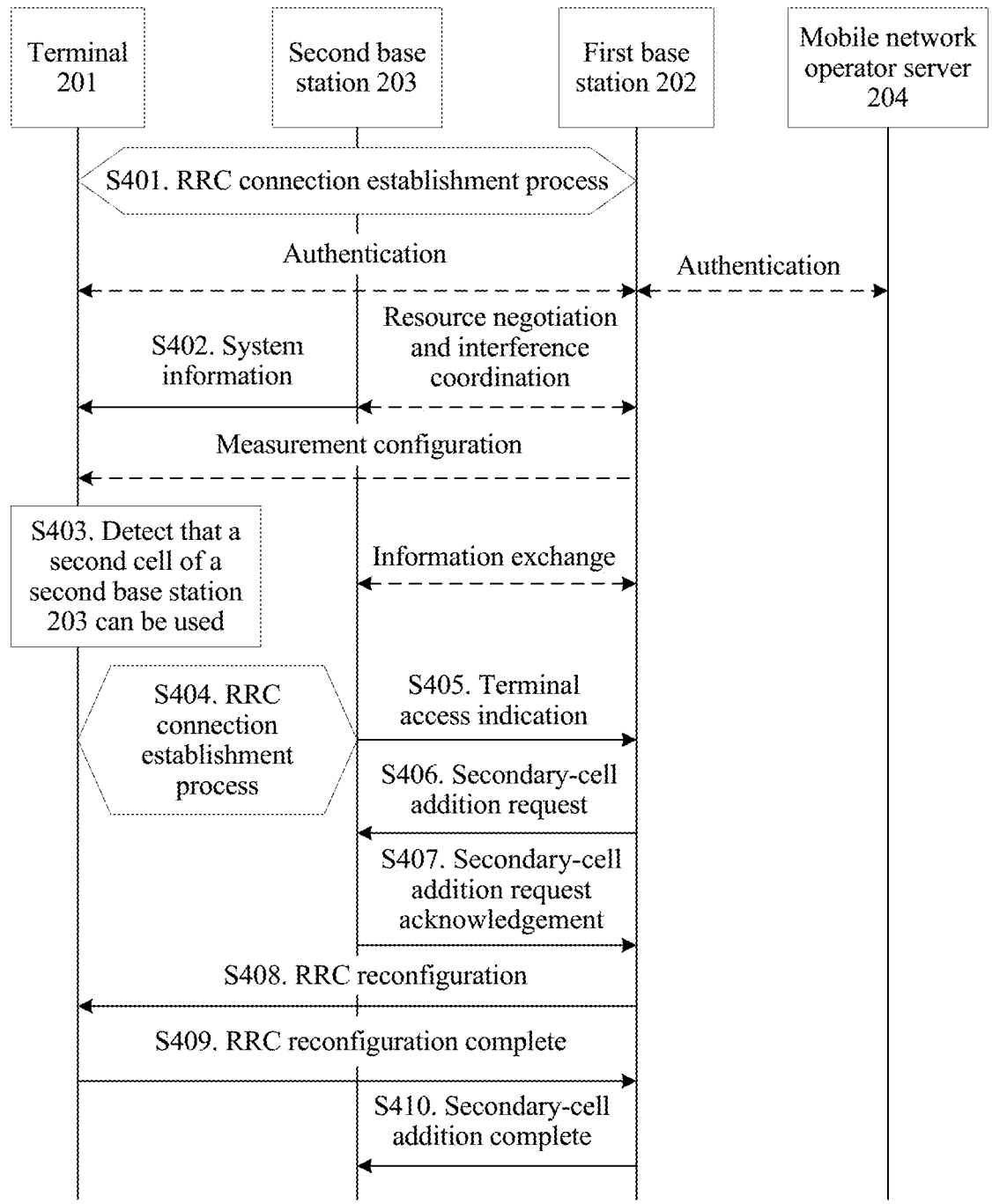
FIG. 4 is a flowchart of a second cell access solution in a first optional implementation according to an embodiment of the present invention.

The second base station 203 is configured to after the terminal 201 accesses the second cell, send a terminal access indication message to a first base station 202 of a first cell, for example, a terminal access indication message in step S405 in FIG. 4, so as to indicate that the second cell needs to be added, for the terminal 201, as a cell communicating with the terminal 201.

The first base station 202 is configured to after receiving the terminal access indication message sent by the second base station 203, and if determining that the second base station 203 allows addition of the second cell as a cell communicating with the terminal 201, send a reconfiguration message to the terminal 201, for example, an RRC reconfiguration message in step S408 in FIG. 4.

The terminal 201 is further configured to reconfigure, according to the reconfiguration message, the wireless connection established when the terminal 201 accesses the second cell, and communicate with the second cell by using the configured wireless connection.

Optionally, the wireless communications system may further include a mobile network operator server 204, configured to perform authentication on the terminal 201.

With reference to a procedure shown in FIG. 4, a second cell access solution provided in an embodiment of the present invention is described in detail in the following.

An example that a configuration message sent by a first base station 202 to a terminal 201 is an RRC reconfiguration message is used in the procedure shown in FIG. 4.

The procedure shown in FIG. 4 includes the following steps.

S401. A terminal 201 accesses a first cell of a first base station 202.

This step is the same as step S301.

S402. The terminal 201 reads system information of a second cell of a second base station 203.

This step is the same as that in step S302.

S403. The terminal 201 detects that the second cell of the second base station 203 can be used.

This step is the same as that in step S303.

S404. The terminal 201 initiates an RRC connection establishment process to the second cell of the second base station 203.

The terminal 201 establishes, by using the initiated RRC connection establishment process, a wireless connection by which the terminal 201 communicates with the second cell, and accesses the second cell by using the established wireless connection.

S405. The second base station 203 sends a terminal access indication message to the first base station 202.

In a process in which the terminal 201 accesses the second cell or after the terminal 201 accesses second cell, the second base station 203 may send, to the first base station 202, the terminal access indication message that includes a terminal identity of the terminal 201.

The terminal identity of the terminal 201 may include at one of the following identifiers, including a Medium Access Control (MAC) address of the terminal 201, an IP address allocated by the first base station 202 to the terminal 201, a cell radio network temporary identifier (C-RNTI) allocated by the first base station 202 to the terminal 201, a temporary mobile subscriber identity (TMSI) allocated by the first base station 202 to the terminal 201, or an international mobile subscriber identity (IMSI).

The second base station 203 may obtain, from the first base station 202, indication information used to indicate whether the terminal access indication message needs to be sent to the first base station 202 when the terminal 201 accesses the second cell.

S406. The first base station 202 sends a "secondary-cell addition request" message to the second base station 203.

The secondary-cell addition request message may also be referred to as a cell addition request message. The message may include identity information of the second cell, and is used to request the second base station 203 to add the second cell as a cell communicating with the terminal 201.

S407. The second base station 203 sends a secondary-cell addition request acknowledgement message to the first base station 202.

The message may also be referred to as a cell addition request acknowledgement message, and is used to indicate that the second base station 203 allows addition of the second cell as a cell communicating with the terminal 201. The message may include information for performing flow control between the second base station 203 and the first base station 202, configuration information for the terminal 201, and the like, for example, a wireless connection parameter that is used to reconfigure the wireless connection between the terminal 201 and the second cell.

Alternatively, the terminal access indication message sent by the second base station 203 in step S405 includes indication information used to indicate that the second base station 203 allows addition of the second cell as a cell communicating with the terminal 201. After receiving the terminal access indication message, the first base station 202 may determine, according to the indication information in the message, that the second base station 203 allows addition of the second cell as a cell communicating with the terminal 201. In addition, optionally, the terminal access indication message may include a wireless connection parameter that is used to reconfigure the wireless connection between the terminal 201 and the second cell. After obtaining the wireless connection parameter from the terminal access indication message, the first base station 202 performs step S408.

S408. The first base station 202 sends an RRC reconfiguration message to the terminal 201.

The first base station 202 notifies, by using the message, the terminal 201 that the second cell is to be added as a cell communicating with the terminal 201, for example, as a secondary cell for dual connectivity.

The message may include the wireless connection parameter obtained by the first base station 202 in step S407. The terminal 201 reconfigures the wireless connection between the terminal 201 and the second cell according to the wireless connection parameter, and communicates with the second cell by using the configured wireless connection.

S409. The terminal 201 sends an RRC reconfiguration complete message to the first base station 202.

The terminal 201 obtains the wireless connection parameter from the RRC reconfiguration message sent by the first base station 202, and after reconfiguring the wireless connection between the terminal 201 and the second cell according to the obtained wireless connection parameter, sends the RRC reconfiguration complete message to the first base station 202. For example, after configuring the second cell as a secondary cell for dual connectivity according to the obtained wireless connection parameter, the terminal 201 sends the RRC reconfiguration complete message to the first base station 202.

S410. The first base station 202 sends a secondary-cell addition complete message to the second base station 203.

The message may also be referred to as a cell addition complete message. After receiving the secondary-cell addition complete message sent by the first base station 202, the second base station 203 may determine that the terminal 201 has completed reconfiguration of the wireless connection between the terminal 201 and the second cell. The second base station 203 may use the first base station 202 as a user plane anchor of the terminal 201. Data that is from the first base station 202 and is to be sent to the terminal 201 is sent to the terminal 201 by using the second base station 203, or data that is from the terminal 201 is forwarded to the first base station 202.

In the first cell access solution and the second cell access solution that are provided in the embodiments of the present invention, the first base station 202 may be a macro base station or a small node, or the first base station 202 may include an access node of the first cell and a control plane anchor corresponding to the access node.

The second base station 203 may be a small node, a macro base station, or a Wireless Fidelity (WiFi) access point (AP).

Figure 5:
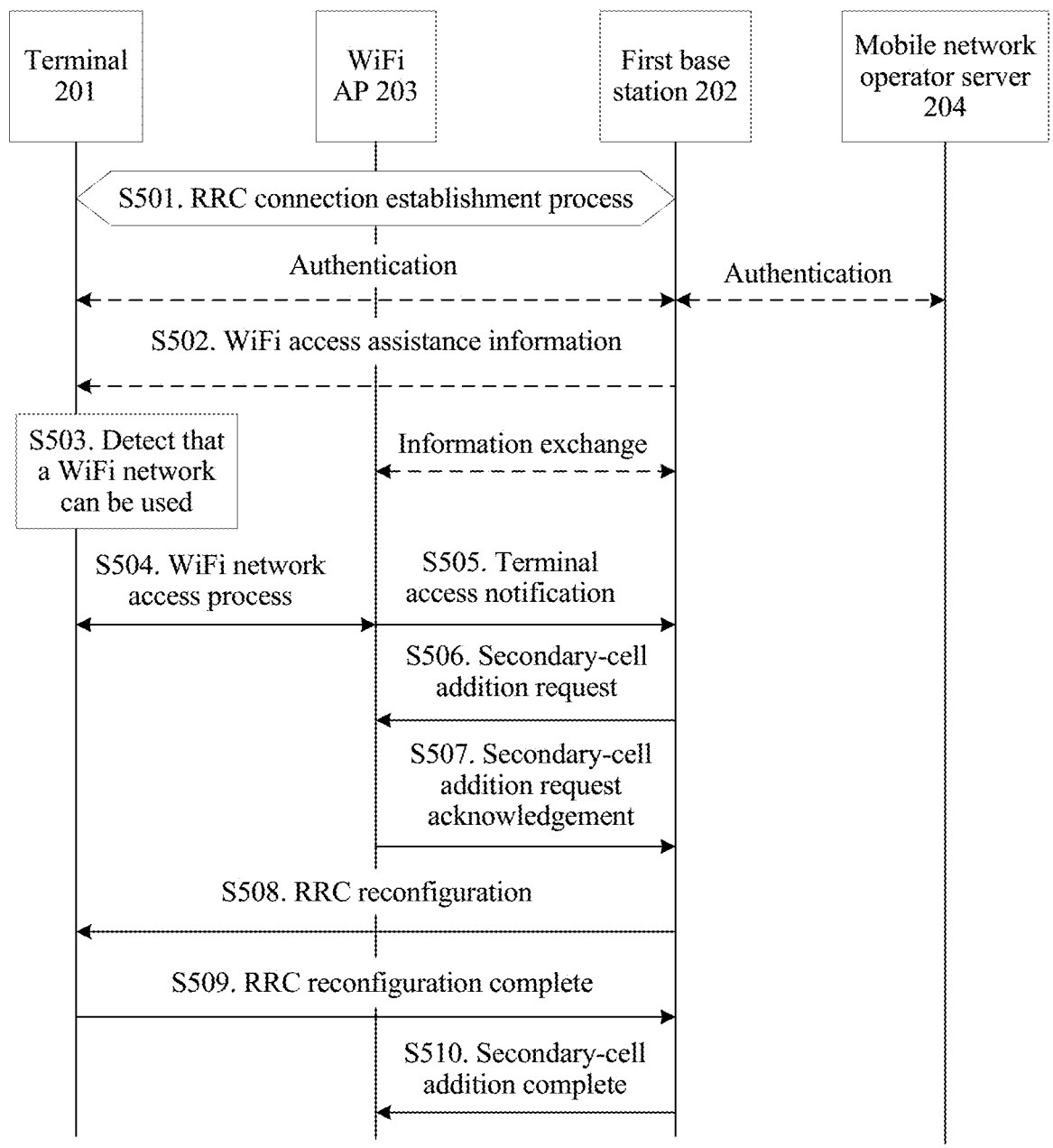
FIG. 5 is a flowchart of a second cell access solution in a second optional implementation according to an embodiment of the present invention.

In the second cell access solution provided in this embodiment of the present invention, when the second cell is a WiFi AP, a cell access procedure may be shown in FIG. 5, and includes the following steps.

S501. A terminal 201 accesses, by using an RRC connection establishment process, a first cell of a first base station 202.

This step is the same as step S401.

S502. The first base station 202 sends WiFi access assistance information to the terminal 201.

The WiFi access assistance information may include a WiFi network rule and/or an assistance parameter, for example, a received signal strength indicator (RSSI) threshold, a list of WiFi APs that can be selected, and a preferred selection indication.

S503. The terminal 201 detects that a WiFi AP 203 can be used.

The terminal 201 may perform WiFi network access decision according to the assistance parameter or the WiFi network rule or both that is obtained in advance in step S502, for example, an access network discovery and selection function (Access Network Discovery and Selection Function, ANDSF) policy, and the decision includes decision about WiFi AP selection and/or which service is to be offloaded to a WiFi network. In this case, the WiFi AP 203 may be considered as the second base station 203.

S504: The terminal 201 accesses a WiFi network by using a WiFi network access process.

The access process may include a WiFi association process, and in addition, may include a WiFi authentication process and an IP address allocation process.

Step S505 to step S510 may be respectively the same as step S405 to step S410. Details are not described herein again.

A WiFi AP may also be replaced with a WiFi access controller (AC), or may be replaced with an intermediate node connected between a cellular network and a wireless local area network (WLAN).

By using the first cell access solution and the second cell access solution that are provided in the embodiments of the present invention, a terminal 201 autonomously triggers a cell addition process, so as to implement self-management on network access of the terminal 201. Therefore, network implementation is simplified, network costs are reduced, and a peak rate of a user is improved by using a carrier aggregation or dual connectivity technology.

Two cell access solutions provided in the embodiments of the present invention are described above. A data transmission solution provided in the embodiments of the present invention is described in the following.

Data Transmission Solution

The data transmission solution provided in an embodiment of the present invention may be used, so that an application server can send an IP packet to a terminal.

A terminal reports an address of the terminal to a location server. The location server sends the received address of the terminal to an application server performing data transmission with the terminal, or an application server obtains the address of the terminal from the location server. The application server sends an IP packet to the terminal according to the obtained address of the terminal.

Figure 6:
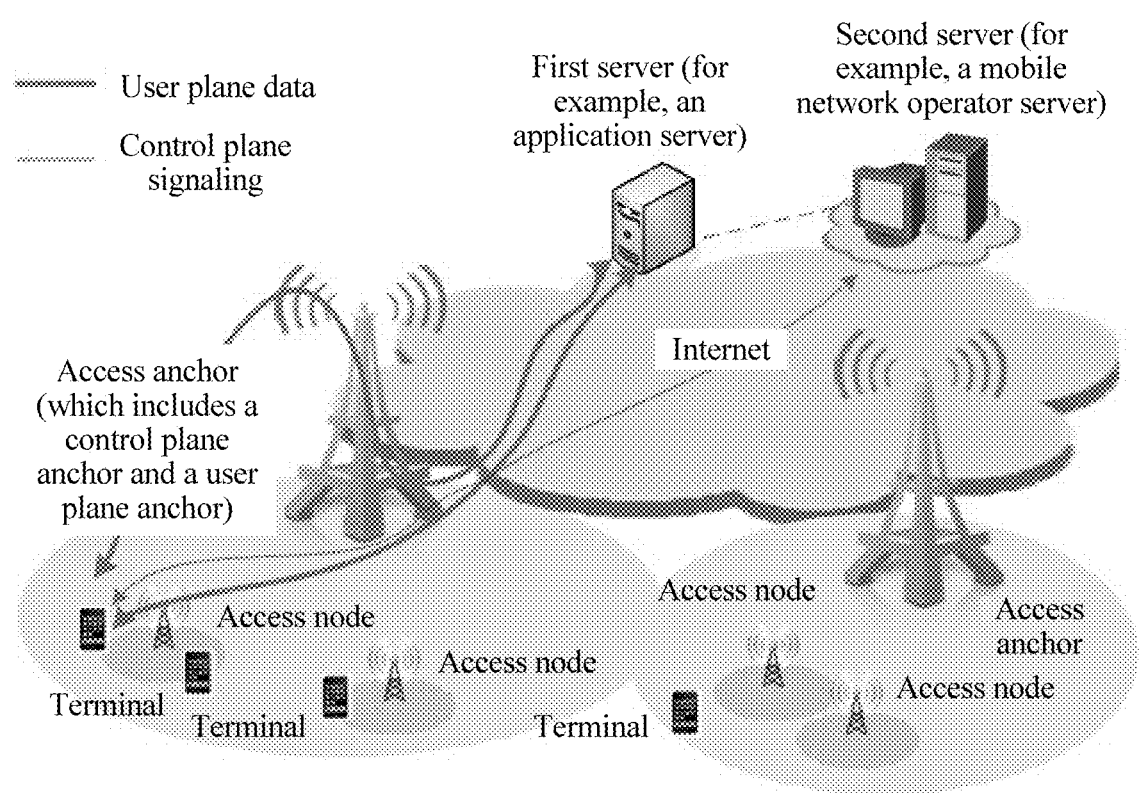
FIG. 6 is a diagram of a network architecture that is of a network and to which a data transmission solution may be applied according to an embodiment of the present invention.

The data transmission solution provided in this embodiment of the present invention may be applied to a network architecture shown in FIG. 6. The location server is located in a first server or a second server, or is an independent server, and is connected to an access anchor by using an Internet. The access anchor may include a control plane anchor and/or a user plane anchor. The terminal may communicate with the location server by using an access node and the access anchor. Alternatively, when an access node and the access anchor are implemented in a base station, the terminal may directly communicate with the location server by using the base station. In this case, the base station is connected to the location server by using the Internet.

The data transmission solution provided in this embodiment of the present invention is applicable to network architectures of various radio access networks, provided that the terminal can report the address of the terminal to the location server.

In a current LTE system, if an MME changes, or an MME does not include a valid context of UE, or an identity of an MME changes, the MME sends an update request message to an HSS, and the message includes a terminal identity IMSI of the UE, the identity of the MME, and an update type. The HSS sends a location cancellation message to an old MME, and the message includes the IMSI of the UE and a cancellation type. The old MME deletes a context of the terminal, and replies with an acknowledgement message. The HSS sends a location update message to a new MME, and the message includes the IMSI of the UE and subscription data. It can be learned that in the current LTE system, because terminal location information registered with the HSS is an identity of an MME in which the terminal is currently located, a location is not precise. In addition, because the terminal location information is reported by the MME, the UE cannot autonomously report the terminal location information.

In this embodiment of the present invention, when an IP address of a terminal changes, the terminal can autonomously report the address to a location server, so that a location is more precise. In addition, because control of another core network device such as an MME is not required, implementation is simpler.

Figure 7:
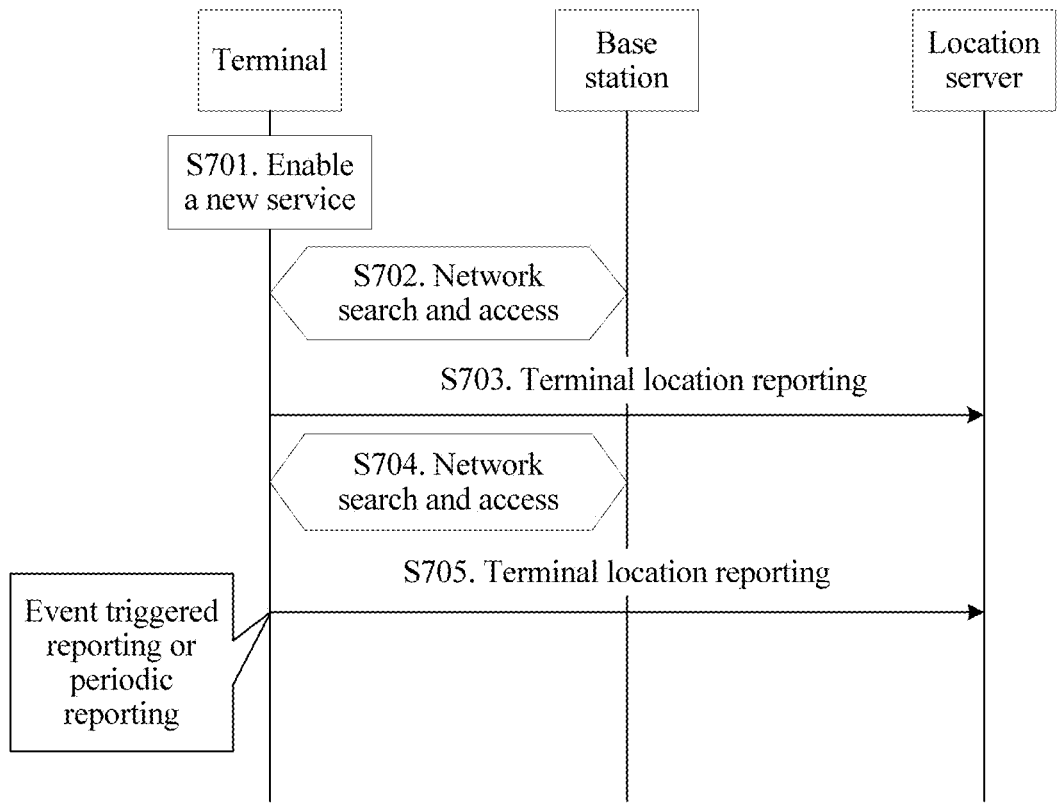
FIG. 7 is a flowchart of an optional implementation of a data transmission solution according to an embodiment of the present invention.

A procedure of the data transmission solution provided in this embodiment of the present invention may be shown in FIG. 7, and includes the following steps.

S701. A terminal enables a new service.

S702. The terminal performs network search and network access.

The terminal may determine, according to at least one of a type of the new service enabled in step S701, a QoS requirement of the new service, or a user network selection preference factor of a user corresponding to the terminal, a network search sequence and a to-be-accessed network that is finally selected. For example, the terminal preferably accesses a WiFi network, and preferably searches for a WiFi network that can be used. After accessing a new network, the terminal usually obtains a new address such as an IP address.

S703. The terminal reports a current address to a location server, for example, a new address obtained in step S702.

A scenario in which a third party wants to communicate with a designated terminal by using an application server may exist. For example, a terminal B sends a WeChat call request to a terminal A by using a WeChat server (which is a type of application server), and the WeChat server needs to find the terminal A. If there is cooperation and subscription between the WeChat server and an MNO server, the WeChat server can find an IP address of the terminal A by means of query by using a location server corresponding to the MNO server, and then communicate with the terminal A by using the IP address of the terminal A that is obtained by means of query.

Because there are various applications, there are also various corresponding application servers. For many applications in which data exchange is only occasionally performed between the terminal and the application server, for example, various instant messaging (IM) applications such as QQ, if the terminal reports, each time the IP address is updated, the IP address to application servers corresponding to these applications, message overheads are relatively large. However, when the location server is used, the terminal may report the IP address of the terminal only to the location server, and then notify the application server of the IP address by using the location server, so that processing overheads of the terminal are reduced, and occupation of air interface resources is reduced.

Particularly, for an application server that uses an MPTCP, because a large amount of data is usually transmitted continuously, it is beneficial to report the IP address of the terminal to the application server in a timely manner, so that the application server can know a usable path (IP address) in a timely manner, offload data to the usable path in a timely manner for transmission, and no longer offloads data to a non-usable path in a timely manner. Therefore, data transmission efficiency is improved.

A manner in which the terminal reports the current address includes but is not limited to the following two manners.

Manner 1:

The terminal reports the current address by using control plane signaling.

If multiple data transmission paths exist between the terminal and the application server, for each of the data transmission paths, the terminal may report an address of the terminal on the path by using the control plane signaling.

Manner 2:

The terminal sends an IP packet to the location server, uses a source IP address in the sent IP packet as the address of the terminal, and reports the address of the terminal to the location server.

If multiple data transmission paths exist between the terminal and the application server, for each of the multiple data transmission paths, the terminal sends an IP packet to the location server by using the data transmission path, uses a source IP address in the sent IP packet as an address of the terminal on the data transmission path, and reports the address of the terminal to the location server.

For manner 1, the address reported by the terminal may include at least one of the following addresses:

a public Internet Protocol IP address of the terminal, an IP address of an access gateway to which the terminal is connected, or an identity of an access gateway to which the terminal is connected.

The terminal accesses an Internet by using the access gateway to which the terminal is connected, and performs packet transmission with the application server in the Internet. The access gateway may be considered as an entrance by which the terminal accesses the Internet.

Optionally, for a terminal that uses a dual connectivity or carrier aggregation technology, because a user plane anchor exists in a radio access network, and multiple connections or multiple carriers share a same IP address, the multiple connections or the multiple carriers may be considered as one path instead of multiple paths between the terminal and the application server or the location server.

In addition, the application server may also be a multipath aggregation server to which the application server is connected, for example, a server that implements a Multipath Transmission Control Protocol (MPTCP) function.

S704. The terminal searches for a new network, and accesses the network.

When some or all current paths cannot be used or cannot meet a service requirement, for example, channel quality or a data rate is lower than a threshold, the terminal triggers a network search and network access process. Similarly, the terminal determines, according to at least one of a type of a current service, a QoS requirement of a service, or a user network selection preference factor of a user corresponding to the terminal, a network search sequence and a to-be-accessed network that is finally selected.

S705. The terminal reports a current address to the location server.

When a path to the application server or the location server is added or deleted, the terminal may trigger a process of reporting the current address. In addition, the terminal may periodically report the current address of the terminal. For example, the terminal periodically sends a heartbeat packet.

Same as step S703, a manner in which the terminal reports the current address also includes but is not limited to the manner 1 and the manner 2.

Optionally, the location server receives the address of the terminal that is reported by the terminal. The location server may actively notify, the application server performing data transmission with the terminal, of the received address of the terminal. The application server sends an IP packet to the terminal according to the received address of the terminal.

Alternatively, after receiving a request message that is sent by the application server and is for requesting the address of the terminal, the location server may notify, the application server performing data transmission with the terminal, of the received address of the terminal.

Optionally, the terminal in the data transmission solution provided in this embodiment of the present invention may be the terminal 201 in the wireless communications system shown in FIG. 2. A base station in FIG. 7 may be the first base station 202 or the second base station 203, or may be another base station in the wireless communications system.

By using the data transmission solution provided in this embodiment of the present invention, a terminal can periodically report an address of the terminal, or report an address of the terminal when a communications path between the terminal and an application server or a location server changes, so that the application server can send an IP packet to the terminal according to the obtained address of the terminal.

When the solution is applied to the network architecture shown in FIG. 6, a mobility management function of the terminal in the network architecture can be implemented. The terminal reports the address of the terminal to the location server, and then the location server notifies the application server of the received address of the terminal. Therefore, implementation is relatively simple, network design can be simplified, and network costs can be reduced.

The wireless communications system, the first cell access solution, the second cell access solution, and the data transmission solution that are provided in the embodiments of the present invention are described above.

Based on a same invention concept, the embodiments of the present invention further provide a terminal, a first base station, a second base station, a location server, a cell access method, and a data transmission method. Principles thereof for resolving technical problems are similar to those of the foregoing solutions provided in the embodiments of the present invention. Therefore, for implementation thereof, refer to implementation of the foregoing solutions, and details are not repeated.

For example, based on a same invention concept as that of the first cell access solution provided in the embodiments of the present invention, the embodiments of the present invention further provide two terminals, two types of first base stations, and two cell access methods. Descriptions are separately provided in the following.

Figure 8:
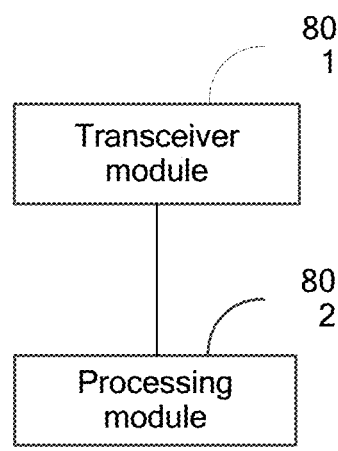
FIG. 8 is a schematic structural diagram of a first terminal according to an embodiment of the present invention.

FIG. 8 is a schematic structural diagram of a first terminal according to an embodiment of the present invention. As shown in FIG. 8, the terminal includes: a transceiver module 801, configured to when the terminal needs to communicate with a second cell, send a first cell addition request message to a first base station of the first cell, where the first cell addition request message is used to request the first base station to add the second cell as a cell communicating with the terminal, and a processing module 802, configured to after receiving, by using the transceiver module 804 a configuration message that is sent by the first base station and is used to configure a wireless connection by which the terminal communicates with the second cell, configure, according to the configuration message, the wireless connection by which the terminal communicates with the second cell, and control the terminal to access the second cell by using the configured wireless connection by which the terminal communicates with the second cell.

Optionally, the processing module 802 is specifically configured to obtain, from the configuration message, a wireless connection parameter that is used to configure the wireless connection by which the terminal communicates with the second cell, and configure, according to the obtained wireless connection parameter, the wireless connection by which the terminal communicates with the second cell.

Optionally, the transceiver module 801 is further configured to after the processing module 802 configures, according to the configuration message, the wireless connection by which the terminal communicates with the second cell, and before the processing module 802 controls the terminal to access the second cell, send a first configuration complete message to the first base station, so as to indicate to the first base station that the terminal has completed, according to the configuration message, configuration of the wireless connection by which the terminal communicates with the second cell.

Optionally, the processing module 802 is further configured to before the transceiver module 801 sends the first cell addition request message, measure a wireless signal transmitted in the second cell, and determine, according to a measurement result of the measuring, that the second cell is available.

Optionally, the transceiver module 801 is further configured to before the processing module 802 measures the wireless signal transmitted in the second cell, receive a measurement configuration message sent by the first base station, where the measurement configuration message includes cell identity information of the second cell, and information about a decision condition used to determine whether the second cell is available.

The processing module 802 is specifically configured to measure, according to the cell identity information of the second cell that is included in the measurement configuration message, the wireless signal transmitted in the second cell, and when the measurement result of the measuring meets the decision condition, determine that the second cell is available.

Optionally, the transceiver module 801 is further configured to before the processing module 802 measures the wireless signal transmitted in the second cell, receive a measurement configuration message sent by the first base station, where the measurement configuration message includes frequency information of the second cell, and information about a decision condition used to determine whether the second cell is available.

The processing module 802 is specifically configured to measure, according to the frequency information of the second cell that is included in the measurement configuration message, the wireless signal transmitted in the second cell, and when the measurement result of the measuring meets the decision condition, determine that the second cell is available.

Optionally, the transceiver module 801 is further configured to before the processing module 802 measures the wireless signal transmitted in the second cell, receive a first indication message sent by the first base station or a second base station of the second cell.

The processing module 802 is further configured to determine, according to the first indication message, that the second cell may be added as a cell communicating with the terminal, where the first indication message is used to indicate that the second cell may provide communication for a same terminal together with the first cell.

Optionally, the first base station is a macro base station or a small node, or the first base station includes an access node of the first cell and a control plane anchor corresponding to the access node. The access node keeps a wireless connection to the terminal. The control plane anchor is configured to control the terminal to establish a wireless connection to the access node, and enable, by exchanging information with a second server, the second server to perform user information management on the terminal. The second server is configured to perform user information management on the terminal.

The second base station of the second cell is a small node, a macro base station, or a Wireless Fidelity WiFi access point AP.

For another optional implementation of the terminal, refer to implementation of the terminal 201 in the first cell access method, and details are not repeated.

Figure 9:
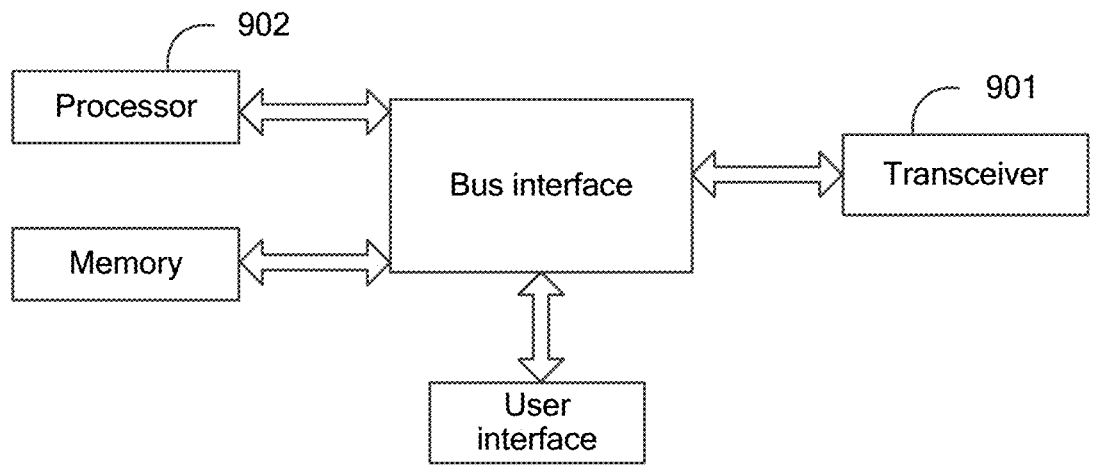
FIG. 9 is a schematic structural diagram of a second terminal according to an embodiment of the present invention.

FIG. 9 is a schematic structural diagram of a second terminal according to an embodiment of the present invention. As shown in FIG. 9, the terminal includes a transceiver 901, configured to when the terminal needs to communicate with a second cell, send a first cell addition request message to a first base station of the first cell, where the first cell addition request message is used to request the first base station to add the second cell as a cell communicating with the terminal, and a processor 902, configured to after receiving, by using the transceiver 901, a configuration message that is sent by the first base station and is used to configure a wireless connection by which the terminal communicates with the second cell, configure, according to the configuration message, the wireless connection by which the terminal communicates with the second cell, and control the terminal to access the second cell by using the configured wireless connection by which the terminal communicates with the second cell.

Optionally, the terminal may be implemented by using a bus architecture shown in FIG. 9. In FIG. 9, the bus architecture may include any quantity of interconnected buses and bridges, and specifically link various circuits of one or more processors represented by the processor 902 and a memory. The bus architecture may further link various other circuits such as a peripheral device, a voltage regulator, and a power management circuit. This is well known in the art, and therefore, is not further described in this specification. A bus interface provides an interface. The transceiver 901 may be multiple elements, that is, may include a transmitter and a receiver, and provide units for communicating with various other apparatuses on a transmission medium. For different user equipments, a user interface may be an interface that can be externally or internally connected to a required device. The connected device includes but is not limited to a keypad, a display, a loudspeaker, a microphone, and a joystick.

Optionally, the terminal may be implemented without using a bus architecture. For example, the processor 902 and the transceiver 901 are directly connected to each other, and do not communicate with each other by using a bus.

For implementation of the transceiver 901, refer to the transceiver module 801. For implementation of the processor 902, refer to the processing module 802. For another optional implementation of the terminal, refer to implementation of the terminal 201 in the first cell access solution provided in the embodiments of the present invention, and details are not repeated.

Figure 10:
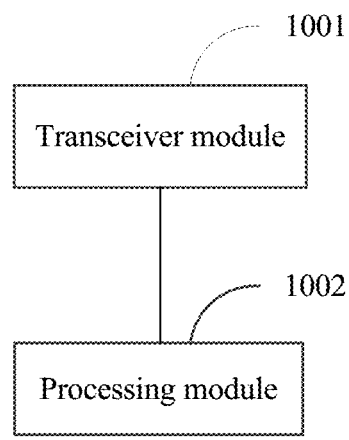
FIG. 10 is a schematic structural diagram of a first type of first base station according to an embodiment of the present invention.

FIG. 10 is a schematic structural diagram of a first type of first base station according to an embodiment of the present invention. As shown in FIG. 10, the first base station includes: a transceiver module 1001, configured to receive a first cell addition request message sent by a terminal communicating with a first cell of the first base station, where the first cell addition request message is used to request the first base station to add a second cell as a cell communicating with the terminal, and a processing module 1002, configured to control the transceiver module 1001 to send, to the terminal, a configuration message that is used to configure a wireless connection by which the terminal communicates with the second cell, so as to instruct the terminal to configure, according to the configuration message, the wireless connection by which the terminal communicates with the second cell, and access the second cell.

Optionally, the transceiver module 1001 is further configured to after receiving the first cell addition request message, and before sending, to the terminal, the configuration message that is used to configure the wireless connection by which the terminal communicates with the second cell, send a second cell addition request message to a second base station of the second cell, so as to request to add the second cell as a cell communicating with the terminal.

The processing module 1002 is specifically configured to control the transceiver module 1001 to receive a cell addition request acknowledgement message sent by the second base station in response to the second cell addition request message, obtain, from the cell addition request acknowledgement message, a wireless connection parameter that is used to configure the wireless connection by which the terminal communicates with the second cell, and control the transceiver module 1001 to send the configuration message to the terminal, where the configuration message carries the obtained wireless connection parameter, so as to instruct the terminal to configure, according to the wireless connection parameter, the wireless connection by which the terminal communicates with the second cell, and access the second cell.

Optionally, the processing module 1002 is further configured to after controlling the transceiver module 1001 to send the configuration message to the terminal, and after the transceiver module 1001 receives a first configuration complete message sent by the terminal in response to the configuration message, control the transceiver module 1001 to send a second configuration complete message to the second base station, so as to indicate the second base station that the terminal has completed configuration of the wireless connection by which the terminal communicates with the second cell.

The first configuration complete message is used to indicate the first base station that the terminal has completed, according to the configuration message, configuration of the wireless connection by which the terminal communicates with the second cell.

Optionally, the processing module 1002 is further configured to before the transceiver module 1001 receives the first cell addition request message sent by the terminal, control the transceiver module 1001 to send a measurement configuration message to the terminal, where the measurement configuration message includes cell identity information of the second cell, and information about a decision condition used to determine whether the second cell is available.

The first cell addition request message is sent by the terminal to the first base station after the terminal measures the second cell according to the cell identity information of the second cell in the measurement configuration message, and a measurement result obtained by measuring the second cell meets the decision condition.

Optionally, the processing module 1002 is further configured to before the transceiver module 1001 receives the first cell addition request message sent by the terminal, control the transceiver module 1001 to send a measurement configuration message to the terminal, where the measurement configuration message includes frequency information of the second cell, and information about a decision condition used to determine whether the second cell is available.

The first cell addition request message is sent by the terminal to the first base station after the terminal measures the second cell according to the frequency information of the second cell in the measurement configuration message, and a measurement result obtained by measuring the second cell meets the decision condition.

Optionally, the processing module 1002 is further configured to before controlling the transceiver module 1001 to send the measurement configuration message to the terminal, control the transceiver module 1001 to send a first indication message to the terminal, so as to indicate the terminal, and the second cell may provide communication for a same terminal together with the first cell.

Optionally, the first base station is a macro base station or a small node, or the first base station includes a first node of the first cell and a first control node configured to control the first node. The first node is configured to process transmission between the terminal and the first control node.

The base station of the second cell is a small node, a macro base station, or a Wireless Fidelity WiFi access point AP.

For another optional implementation of the first base station, refer to implementation of the first base station 202 in the first cell access solution provided in the embodiments of the present invention, and details are not repeated.

Figure 11:
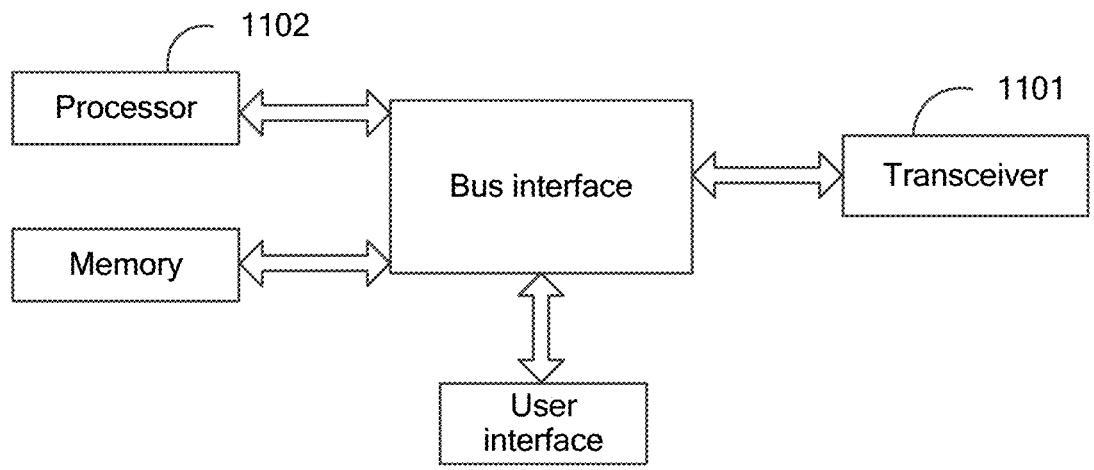
FIG. 11 is a schematic structural diagram of a second type of first base station according to an embodiment of the present invention.

FIG. 11 is a schematic structural diagram of a second type of first base station according to an embodiment of the present invention. As shown in FIG. 11, the first base station includes: a transceiver 1101, configured to receive a first cell addition request message sent by a terminal communicating with a first cell of the first base station, where the first cell addition request message is used to request the first base station to add a second cell as a cell communicating with the terminal, and a processor 1102, configured to control the transceiver 1101 to send, to the terminal, a configuration message that is used to configure a wireless connection by which the terminal communicates with the second cell, so as to instruct the terminal to configure, according to the configuration message, the wireless connection by which the terminal communicates with the second cell, and access the second cell.

Optionally, the terminal may be implemented by using a bus architecture shown in FIG. 11. In FIG. 11, the bus architecture may include any quantity of interconnected buses and bridges, and specifically link various circuits of one or more processors represented by the processor 1102 and a memory. The bus architecture may further link various other circuits such as a peripheral device, a voltage regulator, and a power management circuit. This is well known in the art, and therefore, is not further described in this specification. A bus interface provides an interface. The transceiver 1101 may be multiple elements, that is, may include a transmitter and a receiver, and provide units for communicating with various other apparatuses on a transmission medium. For different user equipments, a user interface may be an interface that can be externally or internally connected to a required device. The connected device includes but is not limited to a keypad, a display, a loudspeaker, a microphone, and a joystick.

Optionally, the terminal may be implemented without using a bus architecture. For example, the processor 1102 and the transceiver 1101 are directly connected to each other, and do not communicate with each other by using a bus.

For another optional implementation of the transceiver 1101, refer to the transceiver module 1001. For another optional implementation of the processor 1102, refer to the processing module 1002. For another optional implementation of the terminal, refer to implementation of the first base station 202 in the first cell access solution provided in the embodiments of the present invention, and details are not repeated.

Figure 12:
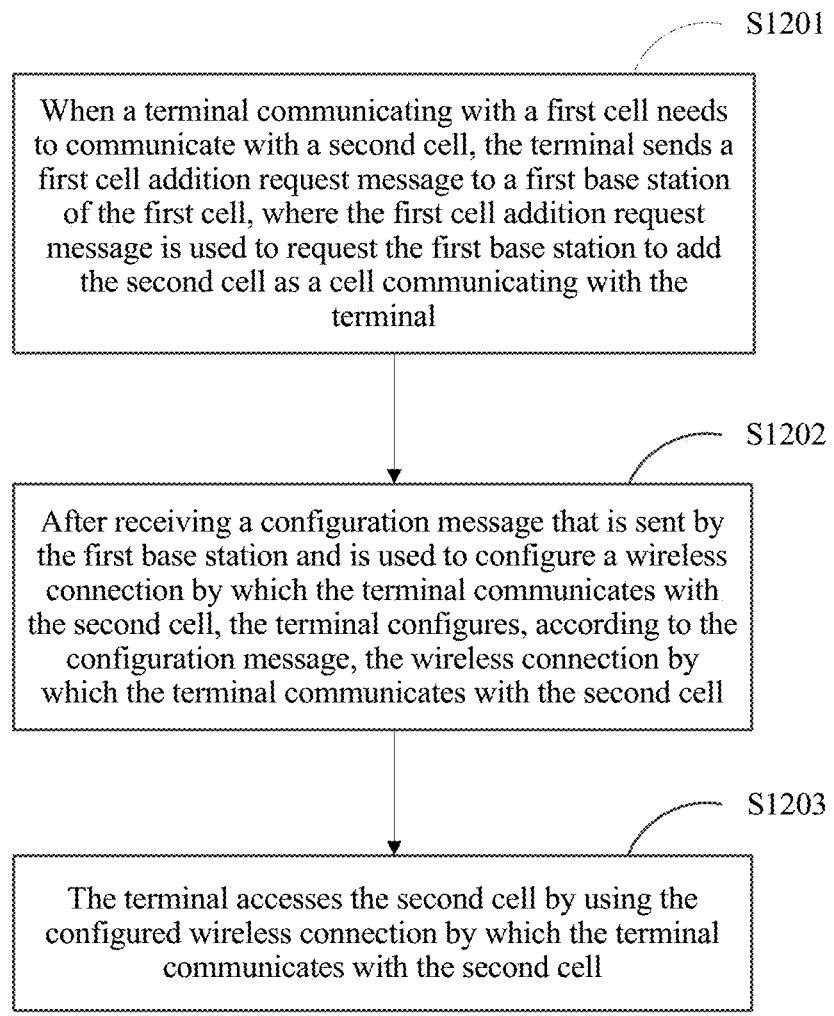
FIG. 12 is a flowchart of a first cell access method according to an embodiment of the present invention.

FIG. 12 is a flowchart of a first cell access method according to an embodiment of the present invention. As shown in FIG. 12, the method includes the following steps.

S1201. When a terminal communicating with a first cell needs to communicate with a second cell, the terminal sends a first cell addition request message to a first base station of the first cell, where the first cell addition request message is used to request the first base station to add the second cell as a cell communicating with the terminal.

S1202. After receiving a configuration message that is sent by the first base station and is used to configure a wireless connection by which the terminal communicates with the second cell, the terminal configures, according to the configuration message, the wireless connection by which the terminal communicates with the second cell.

S1203. The terminal accesses the second cell by using the configured wireless connection by which the terminal communicates with the second cell.

Optionally, the configuring, by the terminal according to the configuration message, the wireless connection by which the terminal communicates with the second cell includes: obtaining, by the terminal from the configuration message, a wireless connection parameter that is used to configure the wireless connection by which the terminal communicates with the second cell, and configuring, by the terminal according to the obtained wireless connection parameter, the wireless connection by which the terminal communicates with the second cell.

Optionally, after the terminal configures, according to the configuration message, the wireless connection by which the terminal communicates with the second cell, and before the terminal accesses the second cell, the method further includes: sending, by the terminal, a first configuration complete message to the first base station, so as to indicate to the first base station that the terminal has completed, according to the configuration message, configuration of the wireless connection by which the terminal communicates with the second cell.

Optionally, before the terminal sends the first cell addition request message, the method further includes measuring, by the terminal, a wireless signal transmitted in the second cell, and determining, according to a measurement result of the measuring, that the second cell is available.

Optionally, before the measuring, by the terminal, a wireless signal transmitted in the second cell, the method further includes receiving, by the terminal, a measurement configuration message sent by the first base station, where the measurement configuration message includes cell identity information of the second cell, and information about a decision condition used to determine whether the second cell is available.

The measuring, by the terminal, a wireless signal transmitted in the second cell, and determining, according to a measurement result of the measuring, that the second cell is available includes measuring, by the terminal according to the cell identity information of the second cell that is included in the measurement configuration message, the wireless signal transmitted in the second cell, and when the measurement result of the measuring meets the decision condition, determining that the second cell is available.

Optionally, before the measuring, by the terminal, a wireless signal transmitted in the second cell, the method further includes receiving, by the terminal, a measurement configuration message sent by the first base station, where the measurement configuration message includes frequency information of the second cell, and information about a decision condition used to determine whether the second cell is available.

The measuring, by the terminal, a wireless signal transmitted in the second cell, and determining, according to a measurement result of the measuring, that the second cell is available includes measuring, by the terminal according to the frequency information of the second cell that is included in the measurement configuration message, the wireless signal transmitted in the second cell, and when the measurement result of the measuring meets the decision condition, determining that the second cell is available.

Optionally, before the measuring, by the terminal, a wireless signal transmitted in the second cell, the method further includes receiving, by the terminal, a first indication message sent by the first base station or a second base station of the second cell, and determining, by the terminal according to the first indication message, that the second cell may be added as a cell communicating with the terminal, where the first indication message is used to indicate that the second cell may provide communication for a same terminal together with the first cell.

Optionally, the first base station is a macro base station or a small node, or the first base station includes an access node of the first cell and a control plane anchor corresponding to the access node. The access node keeps a wireless connection to the terminal. The control plane anchor is configured to control the terminal to establish a wireless connection to the access node, and enable, by exchanging information with a second server, the second server to perform user information management on the terminal. The second server is configured to perform user information management on the terminal.

The second base station of the second cell is a small node, a macro base station, or a Wireless Fidelity WiFi access point AP.

For another optional implementation of the cell access method, refer to implementation of the terminal 201 in the first cell access solution, and details are not repeated.

Figure 13:
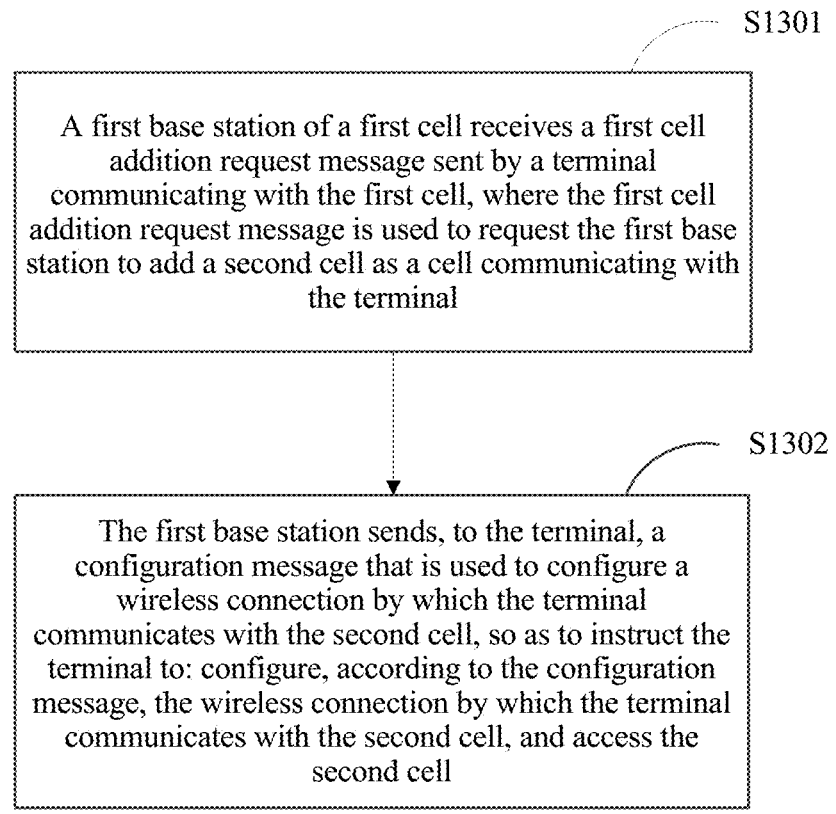
FIG. 13 is a flowchart of a second cell access method according to an embodiment of the present invention.

FIG. 13 is a flowchart of a second cell access method according to an embodiment of the present invention. As shown in FIG. 13, the method includes the following steps.

S1301. A first base station of a first cell receives a first cell addition request message sent by a terminal communicating with the first cell, where the first cell addition request message is used to request the first base station to add a second cell as a cell communicating with the terminal.

S1302. The first base station sends, to the terminal, a configuration message that is used to configure a wireless connection by which the terminal communicates with the second cell, so as to instruct the terminal to configure, according to the configuration message, the wireless connection by which the terminal communicates with the second cell, and access the second cell.

Optionally, after the first base station receives the first cell addition request message, and before the first base station sends, to the terminal, the configuration message that is used to configure the wireless connection by which the terminal communicates with the second cell, the method further includes: sending, by the first base station, a second cell addition request message to a second base station of the second cell, so as to request to add the second cell as a cell communicating with the terminal.

The sending, by the first base station to the terminal, a configuration message that is used to configure a wireless connection by which the terminal communicates with the second cell, so as to instruct the terminal to configure, according to the configuration message, the wireless connection by which the terminal communicates with the second cell, and access the second cell includes receiving, by the first base station, a cell addition request acknowledgement message sent by the second base station in response to the second cell addition request message, obtaining, by the first base station from the cell addition request acknowledgement message, a wireless connection parameter that is used to configure the wireless connection by which the terminal communicates with the second cell, and sending, by the first base station, the configuration message to the terminal, where the configuration message carries the obtained wireless connection parameter, so as to instruct the terminal to configure, according to the wireless connection parameter, the wireless connection by which the terminal communicates with the second cell, and access the second cell.

Optionally, after the first base station sends the configuration message to the terminal, the method further includes receiving, by the first base station, a first configuration complete message sent by the terminal in response to the configuration message, where the first configuration complete message is used to indicate the first base station that the terminal has completed, according to the configuration message, configuration of the wireless connection by which the terminal communicates with the second cell, and after receiving the configuration complete message, sending, by the first base station, a second configuration complete message to the second base station, so as to indicate the second base station that the terminal has completed configuration of the wireless connection by which the terminal communicates with the second cell.

Optionally, before the first base station receives the first cell addition request message sent by the terminal, the method further includes sending, by the first base station, a measurement configuration message to the terminal, where the measurement configuration message includes cell identity information of the second cell, and information about a decision condition used to determine whether the second cell is available.

The first cell addition request message is sent by the terminal to the first base station after the terminal measures the second cell according to the cell identity information of the second cell in the measurement configuration message, and a measurement result obtained by measuring the second cell meets the decision condition.

Optionally, before the first base station receives the first cell addition request message sent by the terminal, the method further includes sending, by the first base station, a measurement configuration message to the terminal, where the measurement configuration message includes frequency information of the second cell, and information about a decision condition used to determine whether the second cell is available.

The first cell addition request message is sent by the terminal to the first base station after the terminal measures the second cell according to the frequency information of the second cell in the measurement configuration message, and a measurement result obtained by measuring the second cell meets the decision condition.

Optionally, before the first base station sends the measurement configuration message to the terminal, the method further includes sending, by the first base station, a first indication message to the terminal, so as to indicate the terminal that the second cell may provide communication for a same terminal together with the first cell.

Optionally, the first base station is a macro base station or a small node, or the first base station includes a first node of the first cell and a first control node configured to control the first node. The first node is configured to process transmission between the terminal and the first control node.

The base station of the second cell is a small node, a macro base station, or a Wireless Fidelity WiFi access point AP.

For another optional implementation of the method, refer to processing of the first base station 202 in the first cell access solution, and details are not repeated.

Figure 14:
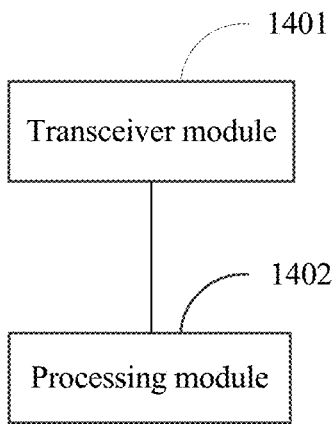
FIG. 14 is a schematic structural diagram of a third terminal according to an embodiment of the present invention.

FIG. 14 is a schematic structural diagram of a third terminal according to an embodiment of the present invention. The terminal communicates with a first cell. As shown in FIG. 14, the terminal includes: a processing module 1402, configured to when the terminal needs to communicate with a second cell, initiate a connection establishment process, establish, by using the connection establishment process, a wireless connection by which the terminal communicates with the second cell, and control the terminal to access the second cell by using the established wireless connection, and a transceiver module 1401, configured to receive a reconfiguration message sent by a first base station of the first cell.

The processing module 1402 is further configured to after the transceiver module 1401 receives the reconfiguration message, reconfigure the wireless connection according to the reconfiguration message, and control the terminal to communicate with the second cell by using the reconfigured wireless connection.

The reconfiguration message is sent by the first base station to the terminal after the first base station determines, according to a terminal access indication message that is received from a second base station of the second cell and is used to indicate that the terminal accesses the second cell, that the terminal accesses the second cell, and after the first base station determines that the second base station allows addition of the second cell as a cell communicating with the terminal.

Optionally, the processing module 1402 is further configured to after reconfiguring the wireless connection according to the reconfiguration message, and before controlling the terminal to communicate with the second cell by using the reconfigured wireless connection, control the transceiver module 1401 to send a reconfiguration complete message to the first base station, so as to indicate to the first base station that the terminal has completed reconfiguration of the wireless connection according to the reconfiguration message.

Optionally, the processing module 1402 is further configured to before controlling the terminal to establish the wireless connection to the second cell, measure a wireless signal transmitted in the second cell, and determine, according to a measurement result of the measuring, that the second cell is available.

Optionally, the transceiver module 1401 is further configured to before the processing module 1402 measures the wireless signal transmitted in the second cell, receive a measurement configuration message sent by the first base station, where the measurement configuration message includes cell identity information of the second cell, and information about a decision condition used to determine whether the second cell is available.

The processing module 1402 is specifically configured to measure, according to the cell identity information of the second cell that is included in the measurement configuration message, the wireless signal transmitted in the second cell, and when the measurement result of the measuring meets the decision condition, determine that the second cell is available.

Optionally, the transceiver module 1401 is further configured to before the processing module 1402 measures the wireless signal transmitted in the second cell, receive a measurement configuration message sent by the first base station, where the measurement configuration message includes frequency information of the second cell, and information about a decision condition used to determine whether the second cell is available.

The processing module 1402 is specifically configured to measure, according to the frequency information of the second cell that is included in the measurement configuration message, the wireless signal transmitted in the second cell, and when the measurement result of the measuring meets the decision condition, determine that the second cell is available.

Optionally, the transceiver module 1401 is further configured to before the processing module 1402 measures the wireless signal transmitted in the second cell, receive a first indication message sent by the second base station or the first base station.

The processing module 1402 is further configured to determine, according to the first indication message, that the second cell may be added as a cell communicating with the terminal, where the first indication message is used to indicate that the second cell may provide communication for a same terminal together with the first cell.

Optionally, the first base station is a macro base station or a small node, or the first base station includes a first node of the first cell and a first control node configured to control the first node. The first node is configured to process transmission between the terminal and the first control node.

The second base station is a small node, a macro base station, or a Wireless Fidelity WiFi access point AP.

For another optional implementation of the terminal, refer to implementation of the terminal 201 in the second cell access solution provided in the embodiments of the present invention, and details are not repeated.

Figure 15:
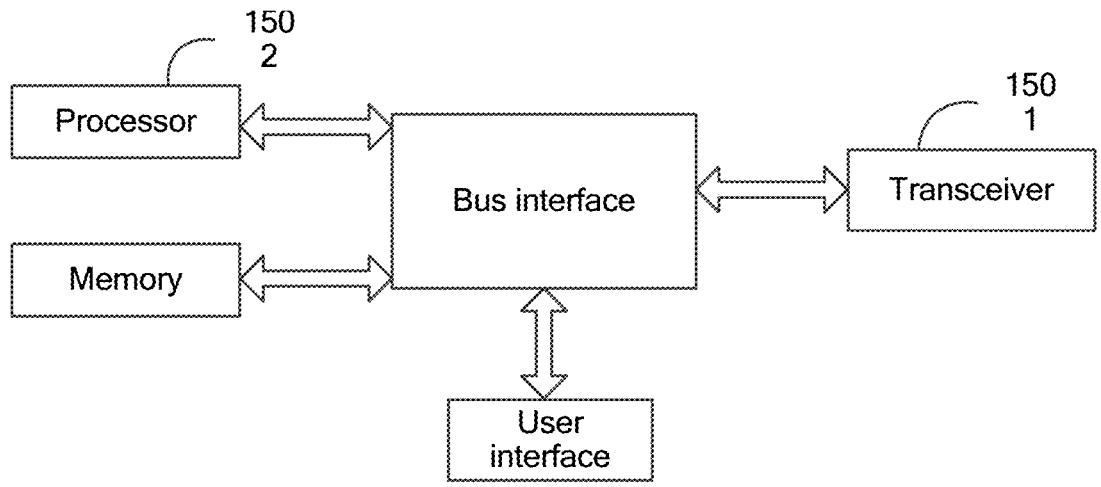
FIG. 15 is a schematic structural diagram of a fourth terminal according to an embodiment of the present invention.

FIG. 15 is a schematic structural diagram of a fourth terminal according to an embodiment of the present invention. The terminal communicates with a first cell. As shown in FIG. 15, the terminal includes: a processor 1502, configured to when the terminal needs to communicate with a second cell, initiate a connection establishment process, establish, by using the connection establishment process, a wireless connection by which the terminal communicates with the second cell, and control the terminal to access the second cell by using the established wireless connection, and a transceiver 1501, configured to receive a reconfiguration message sent by a first base station of the first cell.

The processor 1502 is further configured to after the transceiver 1501 receives the reconfiguration message, reconfigure the wireless connection according to the reconfiguration message, and control the terminal to communicate with the second cell by using the reconfigured wireless connection.

The reconfiguration message is sent by the first base station to the terminal after the first base station determines, according to a terminal access indication message that is received from a second base station of the second cell and is used to indicate that the terminal accesses the second cell, that the terminal accesses the second cell, and after the first base station determines that the second base station allows addition of the second cell as a cell communicating with the terminal.

Optionally, the terminal may be implemented by using a bus architecture shown in FIG. 15. In FIG. 15, the bus architecture may include any quantity of interconnected buses and bridges, and specifically link various circuits of one or more processors represented by the processor 1502 and a memory. The bus architecture may further link various other circuits such as a peripheral device, a voltage regulator, and a power management circuit. This is well known in the art, and therefore, is not further described in this specification. A bus interface provides an interface. The transceiver 1501 may be multiple elements, that is, may include a transmitter and a receiver, and provide units for communicating with various other apparatuses on a transmission medium. For different user equipments, a user interface may be an interface that can be externally or internally connected to a required device. The connected device includes but is not limited to a keypad, a display, a loudspeaker, a microphone, and a joystick.

Optionally, the terminal may be implemented without using a bus architecture. For example, the processor 1502 and the transceiver 1501 are directly connected to each other, and do not communicate with each other by using a bus.

For another optional implementation of the transceiver 1501, refer to the transceiver module 1401. For another optional implementation of the processor 1502, refer to the processing module 1402. For another optional implementation of the terminal, refer to implementation of the terminal 201 in the second cell access solution provided in the embodiments of the present invention, and details are not repeated.

Figure 16:
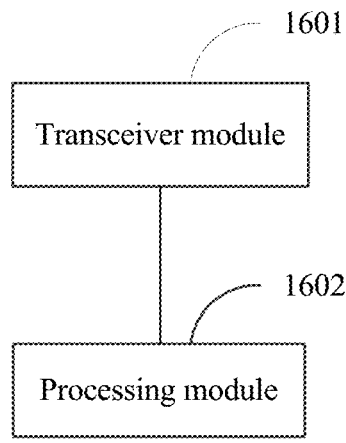
FIG. 16 is a schematic structural diagram of a third type of first base station according to an embodiment of the present invention.

FIG. 16 is a schematic structural diagram of a third type of first base station according to an embodiment of the present invention. As shown in FIG. 16, the first base station includes a transceiver module 1601, configured to receive a terminal access indication message that is sent by a second base station of a second cell and is used to indicate that a terminal communicating with a first cell of the first base station accesses the second cell, and a processing module 1602, configured to after the transceiver module 1601 receives the terminal access indication message, and if determining that the second base station allows addition of the second cell as a cell communicating with the terminal, control the transceiver module 1601 to send a reconfiguration message to the terminal, so as to instruct the terminal to reconfigure, according to the reconfiguration message, a wireless connection established when the terminal accesses the second cell, and communicate with the second cell by using the configured wireless connection.

Optionally, the terminal access indication message is further used to indicate that the second base station allows addition of the second cell as a cell communicating with the terminal.

The processing module 1602 is specifically configured to after the transceiver module 1601 receives the terminal access indication message, determine that the second base station allows addition of the second cell as a cell communicating with the terminal.

Optionally, the terminal access indication message carries a wireless connection parameter that is used to reconfigure the wireless connection.

The processing module 1602 is specifically configured to add, to the reconfiguration message, the wireless connection parameter obtained from the terminal access indication message, and send the reconfiguration message to the terminal by using the transceiver module 1601.

The reconfiguration message is specifically used to instruct the terminal to reconfigure the wireless connection according to the wireless connection parameter, and communicate with the second cell by using the configured wireless connection.

Optionally, the processing module 1602 is further configured to after the transceiver module 1601 receives the terminal access indication message, control the transceiver module 1601 to send a cell addition request message to the second base station, so as to request the second base station to add the second cell as a cell communicating with the terminal.

The processing module 1602 is specifically configured to after the transceiver module 1601 receives a cell addition request acknowledgement message sent by the second base station in response to the cell addition request message, determine that the second base station allows addition of the second cell as a cell communicating with the terminal.

Optionally, the cell addition request acknowledgement message carries a wireless connection parameter that is used to reconfigure the wireless connection.

The processing module 1602 is specifically configured to add, to the reconfiguration message, the wireless connection parameter obtained from the cell addition request acknowledgement message, and send the reconfiguration message to the terminal by using the transceiver module 1601.

The reconfiguration message is specifically used to instruct the terminal to reconfigure the wireless connection according to the wireless connection parameter, and communicate with the second cell by using the configured wireless connection.

Optionally, the transceiver module 1601 is further configured to after sending the reconfiguration message to the terminal, receive a reconfiguration complete message sent by the terminal in response to the reconfiguration message.

The processing module 1602 is further configured to determine, according to the reconfiguration complete message, that the terminal has completed reconfiguration of the wireless connection according to the reconfiguration message, and control the transceiver module 1601 to send a cell addition complete message to the second base station, so as to indicate the second base station that the terminal has completed reconfiguration of the wireless connection.

Optionally, the processing module 1602 is further configured to before the transceiver module 1601 receives the terminal access indication message, control the transceiver module 1601 to send a measurement configuration message to the terminal, where the measurement configuration message includes cell identity information of the second cell, and information about a decision condition used to determine whether the second cell is available, so as to instruct the terminal to measure, according to the cell identity information of the second cell that is included in the measurement configuration message, a wireless signal transmitted in the second cell, and when a measurement result of the measuring meets the decision condition, determine that the second cell is available.

Optionally, the processing module 1602 is further configured to before the transceiver module 1601 receives the terminal access indication message, control the transceiver module 1601 to send a measurement configuration message to the terminal, where the measurement configuration message includes frequency information of the second cell, and information about a decision condition used to determine whether the second cell is available, so as to instruct the terminal to measure, according to the frequency information of the second cell that is included in the measurement configuration message, a wireless signal transmitted in the second cell, and when a measurement result of the measuring meets the decision condition, determine that the second cell is available.

Optionally, the processing module 1602 is further configured to before controlling the transceiver module 1601 to send the measurement configuration message, control the transceiver module 1601 to send a first indication message to the terminal, where the first indication message is used to indicate that the second cell may provide communication for a same terminal together with the first cell.

Optionally, the first base station is a macro base station or a small node, or the first base station includes a first node of the first cell and a first control node configured to control the first node. The first node is configured to process transmission between the terminal and the first control node.

The second base station is a small node, a macro base station, or a Wireless Fidelity WiFi access point AP.

For another optional implementation of the first base station, refer to implementation of the first base station 202 in the second cell access solution provided in the embodiments of the present invention, and details are not repeated.

Figure 17:
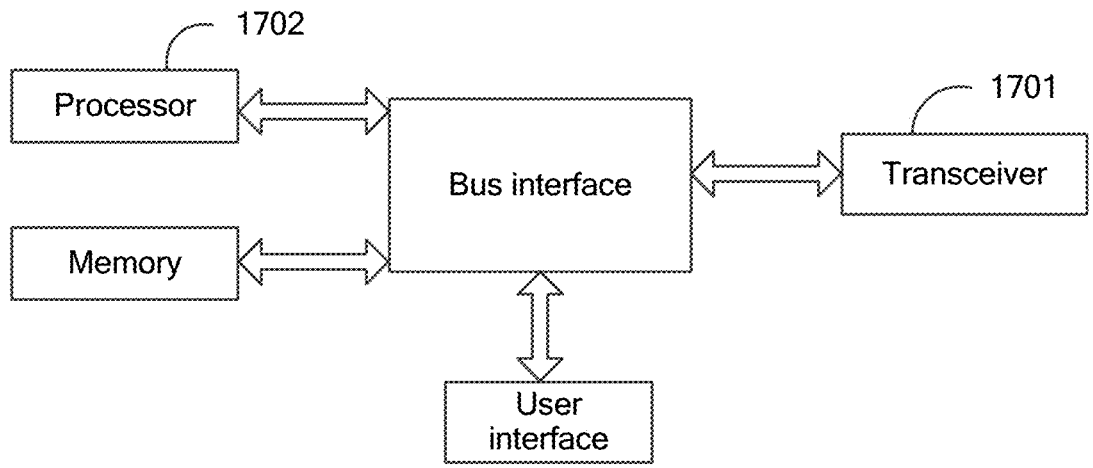
FIG. 17 is a schematic structural diagram of a fourth type of first base station according to an embodiment of the present invention.

FIG. 17 is a schematic structural diagram of a fourth type of first base station according to an embodiment of the present invention. As shown in FIG. 17, the first base station includes a transceiver 1701, configured to receive a terminal access indication message that is sent by a second base station of a second cell and is used to indicate that a terminal communicating with a first cell of the first base station accesses the second cell, and a processor 1702, configured to after the transceiver 1701 receives the terminal access indication message, and if determining that the second base station allows addition of the second cell as a cell communicating with the terminal, control the transceiver 1701 to send a reconfiguration message to the terminal, so as to instruct the terminal to reconfigure, according to the reconfiguration message, a wireless connection established when the terminal accesses the second cell, and communicate with the second cell by using the configured wireless connection.

Optionally, the terminal may be implemented by using a bus architecture shown in FIG. 17. In FIG. 17, the bus architecture may include any quantity of interconnected buses and bridges, and specifically link various circuits of one or more processors represented by the processor 1702 and a memory. The bus architecture may further link various other circuits such as a peripheral device, a voltage regulator, and a power management circuit. This is well known in the art, and therefore, is not further described in this specification. A bus interface provides an interface. The transceiver 1701 may be multiple elements, that is, may include a transmitter and a receiver, and provide units for communicating with various other apparatuses on a transmission medium. For different user equipments, a user interface may be an interface that can be externally or internally connected to a required device. The connected device includes but is not limited to a keypad, a display, a loudspeaker, a microphone, and a joystick.

Optionally, the terminal may be implemented without using a bus architecture. For example, the processor 1702 and the transceiver 1701 are directly connected to each other, and do not communicate with each other by using a bus.

For implementation of the transceiver 1701, refer to the transceiver module 1601. For implementation of the processor 1702, refer to the processing module 1602. For another optional implementation of the terminal, refer to implementation of the first base station 202 in the second cell access solution provided in the embodiments of the present invention, and details are not repeated.

Figure 18:
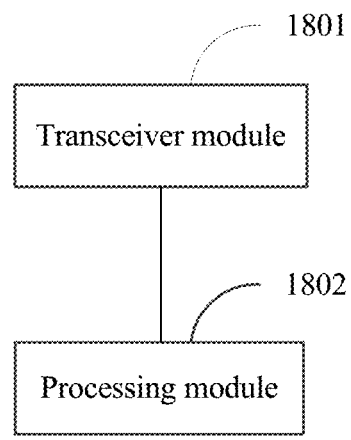
FIG. 18 is a schematic structural diagram of a first type of second base station according to an embodiment of the present invention.

FIG. 18 is a schematic structural diagram of a first type of second base station according to an embodiment of the present invention. As shown in FIG. 18, the second base station includes a processing module 1802 and a transceiver module 1801.

The processing module 1802 is configured to establish a wireless connection between a terminal and a second cell of the second base station in a connection establishment process initiated by the terminal, and allow the terminal to access the second cell by using the wireless connection.

The processing module 1802 is further configured to after the terminal accesses the second cell, control the transceiver module 1801 to send a terminal access indication message to a first base station of a first cell communicating with the terminal, so as to indicate that the second cell needs to be added, for the terminal, as a cell communicating with the terminal.

Optionally, the terminal access indication message is further used to indicate that the second base station allows addition of the second cell as a cell communicating with the terminal.

The processing module 1802 is specifically configured to add, to the terminal access indication message, a wireless connection parameter that is used to reconfigure the wireless connection, so as to instruct the first base station to instruct the terminal to reconfigure the wireless connection according to the wireless connection parameter.

Optionally, the transceiver module 1801 is further configured to after sending the terminal access indication message to the first base station, receive a cell addition complete message sent by the first base station.

The processing module 1802 is further configured to after the transceiver module 1801 receives the cell addition complete message, control the transceiver module 1801 to communicate with the terminal by using the reconfigured wireless connection.

Optionally, the transceiver module 1801 is further configured to after sending the terminal access indication message to the first base station, receive a cell addition request message sent by the first base station, where the cell addition request message is used to request the second base station to add the second cell as a cell communicating with the terminal.

The processing module 1802 is further configured to control the transceiver module 1801 to send a cell addition request acknowledgement message to the first base station in response to the cell addition request message, so as to indicate that the second base station allows addition of the second cell as a cell communicating with the terminal, where the cell addition request acknowledgement message carries a wireless connection parameter that is used to reconfigure the wireless connection, so as to instruct the first base station to instruct the terminal to reconfigure the wireless connection according to the wireless connection parameter.

Optionally, the transceiver module 1801 is further configured to after sending the cell addition request acknowledgement message to the first base station, receive a cell addition complete message sent by the first base station.

The processing module 1802 is further configured to after the transceiver module 1801 receives the cell addition complete message, control the transceiver module 1801 to communicate with the terminal by using the reconfigured wireless connection.

Optionally, the processing module 1802 is further configured to before establishing the wireless connection between the terminal and the second cell, control the transceiver module 1801 to send a first indication message to the terminal, so as to indicate that the second cell may provide communication for a same terminal together with the first cell.

The connection establishment process initiated by the terminal is initiated by the terminal after the terminal receives the first indication message and determines, according to the first indication message, that the first cell may provide communication for the terminal together with the first cell.

Optionally, the first base station is a macro base station or a small node, or the first base station includes a first node of the first cell and a first control node configured to control the first node. The first node is configured to process transmission between the terminal and the first control node.

The second base station is a small node, a macro base station, or a Wireless Fidelity WiFi access point AP.

For another optional implementation of the second base station, refer to implementation of the second base station 203 in the second cell access solution provided in the embodiments of the present invention, and details are not repeated.

Figure 19:
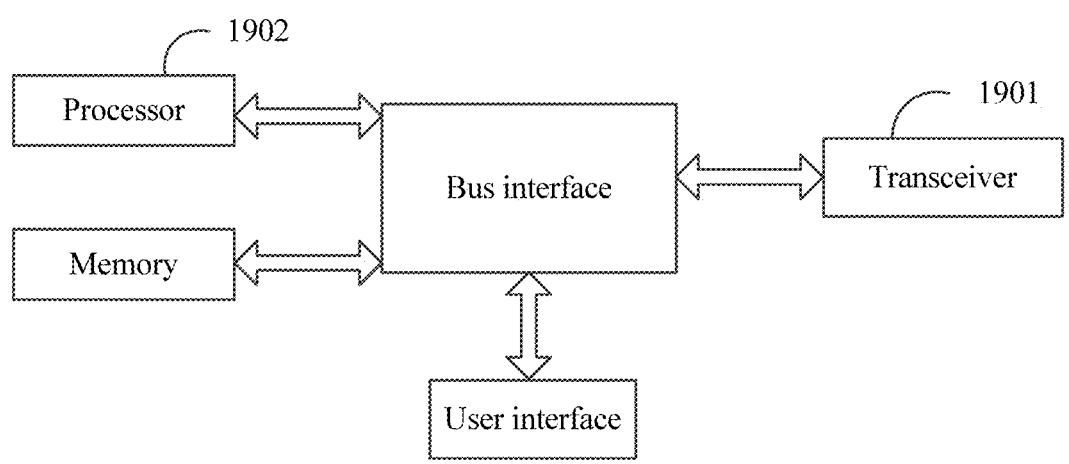
FIG. 19 is a schematic structural diagram of a second type of second base station according to an embodiment of the present invention.

FIG. 19 is a schematic structural diagram of a second type of second base station according to an embodiment of the present invention. As shown in FIG. 19, the second base station includes a processor 1902 and a transceiver 1901.

The processor 1902 is configured to establish a wireless connection between a terminal and a second cell of the second base station in a connection establishment process initiated by the terminal, and allow the terminal to access the second cell by using the wireless connection.

The processor 1902 is further configured to after the terminal accesses the second cell, control the transceiver 1901 to send a terminal access indication message to a first base station of a first cell communicating with the terminal, so as to indicate that the second cell needs to be added, for the terminal, as a cell communicating with the terminal.

Optionally, the second base station may be implemented by using a bus architecture shown in FIG. 19. In FIG. 19, the bus architecture may include any quantity of interconnected buses and bridges, and specifically link various circuits of one or more processors represented by the processor 1902 and a memory. The bus architecture may further link various other circuits such as a peripheral device, a voltage regulator, and a power management circuit. This is well known in the art, and therefore, is not further described in this specification. A bus interface provides an interface. The transceiver 1901 may be multiple elements, that is, may include a transmitter and a receiver, and provide units for communicating with various other apparatuses on a transmission medium. For different user equipments, a user interface may be an interface that can be externally or internally connected to a required device. The connected device includes but is not limited to a keypad, a display, a loudspeaker, a microphone, and a joystick.

Optionally, the second base station may be implemented without using a bus architecture. For example, the processor 1902 and the transceiver 1901 are directly connected to each other, and do not communicate with each other by using a bus.

For implementation of the transceiver 1901, refer to the transceiver module 1801. For implementation of the processor 1902, refer to the processing module 1802. For another optional implementation of the second base station, refer to implementation of the second base station 203 in the second cell access solution provided in the embodiments of the present invention, and details are not repeated.

Figure 20:
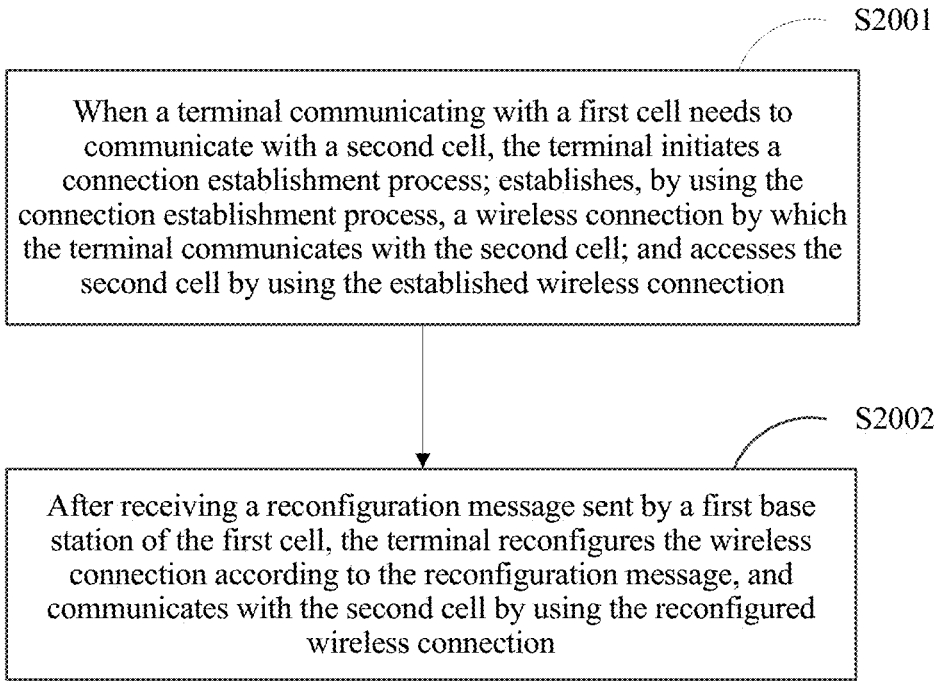
FIG. 20 is a flowchart of a third cell access method according to an embodiment of the present invention.

FIG. 20 is a flowchart of a third cell access method according to an embodiment of the present invention. As shown in FIG. 20, the method includes the following steps.

S2001. When a terminal communicating with a first cell needs to communicate with a second cell, the terminal initiates a connection establishment process, establishes, by using the connection establishment process, a wireless connection by which the terminal communicates with the second cell, and accesses the second cell by using the established wireless connection.

S2002. After receiving a reconfiguration message sent by a first base station of the first cell, the terminal reconfigures the wireless connection according to the reconfiguration message, and communicates with the second cell by using the reconfigured wireless connection.

The reconfiguration message is sent by the first base station to the terminal after the first base station determines, according to a terminal access indication message that is received from a second base station of the second cell and is used to indicate that the terminal accesses the second cell, that the terminal accesses the second cell, and after the first base station determines that the second base station allows addition of the second cell as a cell communicating with the terminal.

Optionally, after the terminal reconfigures the wireless connection according to the reconfiguration message, and before the terminal communicates with the second cell by using the reconfigured wireless connection, the method further includes: sending, by the terminal, a reconfiguration complete message to the first base station, so as to indicate to the first base station that the terminal has completed reconfiguration of the wireless connection according to the reconfiguration message.

Optionally, before the terminal establishes the wireless connection to the second cell, the method further includes measuring, by the terminal, a wireless signal transmitted in the second cell, and determining, according to a measurement result of the measuring, that the second cell is available.

Optionally, before the measuring, by the terminal, a wireless signal transmitted in the second cell, the method further includes receiving, by the terminal, a measurement configuration message sent by the first base station, where the measurement configuration message includes cell identity information of the second cell, and information about a decision condition used to determine whether the second cell is available.

The measuring, by the terminal, a wireless signal sent in the second cell, and determining, according to a measurement result of the measuring, that the second cell is available includes measuring, by the terminal according to the cell identity information of the second cell that is included in the measurement configuration message, the wireless signal transmitted in the second cell, and when the measurement result of the measuring meets the decision condition, determining that the second cell is available.

Optionally, before the measuring, by the terminal, a wireless signal transmitted in the second cell, the method further includes receiving, by the terminal, a measurement configuration message sent by the first base station, where the measurement configuration message includes frequency information of the second cell, and information about a decision condition used to determine whether the second cell is available.

The measuring, by the terminal, a wireless signal transmitted in the second cell, and determining, according to a measurement result of the measuring, that the second cell is available includes measuring, by the terminal according to the frequency information of the second cell that is included in the measurement configuration message, the wireless signal transmitted in the second cell, and when the measurement result of the measuring meets the decision condition, determining that the second cell is available.

Optionally, before the measuring, by the terminal, a wireless signal transmitted in the second cell, the method further includes: receiving, by the terminal, a first indication message sent by the second base station or the first base station, and determining, by the terminal according to the first indication message, that the second cell may be added as a cell communicating with the terminal, where the first indication message is used to indicate that the second cell may provide communication for a same terminal together with the first cell.

Optionally, the first base station is a macro base station or a small node, or the first base station includes a first node of the first cell and a first control node configured to control the first node. The first node is configured to process transmission between the terminal and the first control node.

The second base station is a small node, a macro base station, or a Wireless Fidelity WiFi access point AP.

For another optional implementation of the method, refer to processing of the terminal 201 in the second cell access solution provided in the embodiments of the present invention, and details are not repeated.

Figure 21:
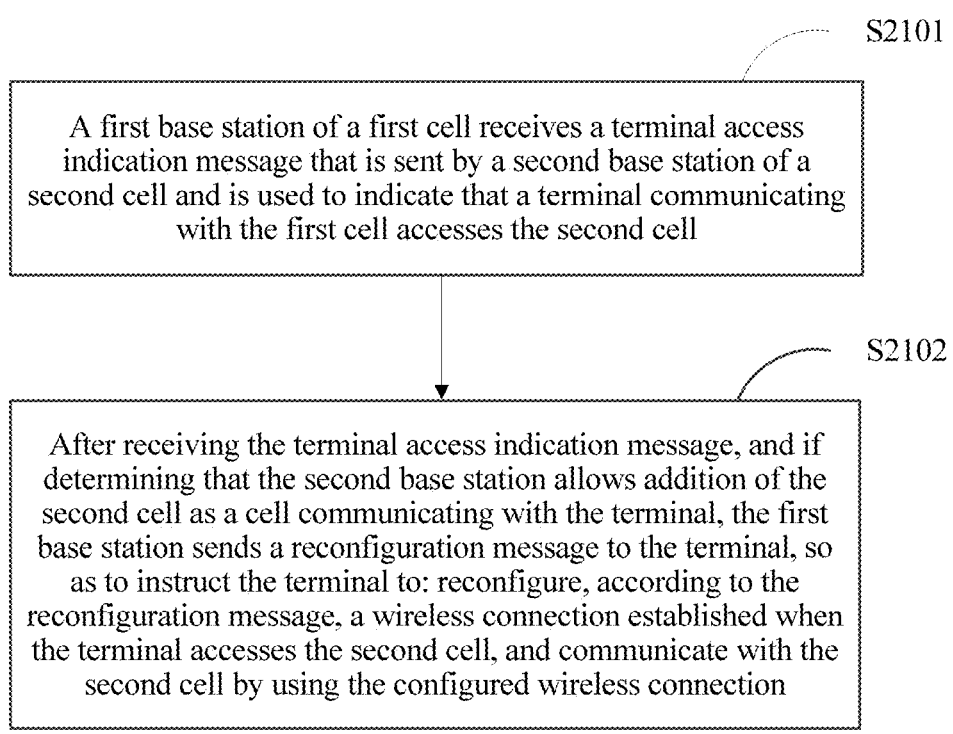
FIG. 21 is a flowchart of a fourth cell access method according to an embodiment of the present invention.

FIG. 21 is a flowchart of a fourth cell access method according to an embodiment of the present invention. As shown in FIG. 21, the method includes the following steps.

S2101. A first base station of a first cell receives a terminal access indication message that is sent by a second base station of a second cell and is used to indicate that a terminal communicating with the first cell accesses the second cell.

S2102. After receiving the terminal access indication message, and if determining that the second base station allows addition of the second cell as a cell communicating with the terminal, the first base station sends a reconfiguration message to the terminal, so as to instruct the terminal to reconfigure, according to the reconfiguration message, a wireless connection established when the terminal accesses the second cell, and communicate with the second cell by using the configured wireless connection.

Optionally, the terminal access indication message is further used to indicate that the second base station allows addition of the second cell as a cell communicating with the terminal.

The determining, by the first base station, that the second base station allows addition of the second cell as a cell communicating with the terminal includes after receiving the terminal access indication message, determining, by the first base station, that the second base station allows addition of the second cell as a cell communicating with the terminal.

Optionally, the terminal access indication message carries a wireless connection parameter that is used to reconfigure the wireless connection.

The sending, by the first base station, a reconfiguration message to the terminal includes adding, by the first base station to the reconfiguration message, the wireless connection parameter obtained from the terminal access indication message, and sending the reconfiguration message to the terminal.

The reconfiguration message is specifically used to instruct the terminal to reconfigure the wireless connection according to the wireless connection parameter, and communicate with the second cell by using the configured wireless connection.

Optionally, after the first base station receives the terminal access indication message, the method further includes sending, by the first base station, a cell addition request message to the second base station, so as to request the second base station to add the second cell as a cell communicating with the terminal.

The determining, by the first base station, that the second base station allows addition of the second cell as a cell communicating with the terminal includes after receiving a cell addition request acknowledgement message sent by the second base station in response to the cell addition request message, determining, by the first base station, that the second base station allows addition of the second cell as a cell communicating with the terminal.

Optionally, the cell addition request acknowledgement message carries a wireless connection parameter that is used to reconfigure the wireless connection.

The sending, by the first base station, a reconfiguration message to the terminal includes adding, by the first base station to the reconfiguration message, the wireless connection parameter obtained from the cell addition request acknowledgement message, and sending the reconfiguration message to the terminal.

The reconfiguration message is specifically used to instruct the terminal to reconfigure the wireless connection according to the wireless connection parameter, and communicate with the second cell by using the configured wireless connection.

Optionally, after the first base station sends the reconfiguration message to the terminal, the method further includes receiving, by the first base station, a reconfiguration complete message sent by the terminal in response to the reconfiguration message, determining, by the first base station according to the reconfiguration complete message, that the terminal has completed reconfiguration of the wireless connection according to the reconfiguration message, and sending, by the first base station, a cell addition complete message to the second base station, so as to indicate the second base station that the terminal has completed reconfiguration of the wireless connection.

Optionally, before the first base station receives the terminal access indication message, the method further includes sending, by the first base station, a measurement configuration message to the terminal, where the measurement configuration message includes cell identity information of the second cell, and information about a decision condition used to determine whether the second cell is available, so as to instruct the terminal to measure, according to the cell identity information of the second cell that is included in the measurement configuration message, a wireless signal transmitted in the second cell, and when a measurement result of the measuring meets the decision condition, determine that the second cell is available.

Optionally, before the first base station receives the terminal access indication message, the method further includes: sending, by the first base station, a measurement configuration message to the terminal, where the measurement configuration message includes frequency information of the second cell, and information about a decision condition used to determine whether the second cell is available, so as to instruct the terminal to measure, according to the frequency information of the second cell that is included in the measurement configuration message, a wireless signal transmitted in the second cell, and when a measurement result of the measuring meets the decision condition, determine that the second cell is available.

Optionally, before the first base station sends the measurement configuration message, the method further includes sending, by the first base station, a first indication message to the terminal, where the first indication message is used to indicate that the second cell may provide communication for a same terminal together with the first cell.

Optionally, the first base station is a macro base station or a small node, or the first base station includes a first node of the first cell and a first control node configured to control the first node. The first node is configured to process transmission between the terminal and the first control node.

The second base station is a small node, a macro base station, or a Wireless Fidelity WiFi access point AP.

For another optional implementation of the method, refer to processing of the first base station 202 in the second cell access solution provided in the embodiment of the present invention, and details are not repeated.

Figure 22:
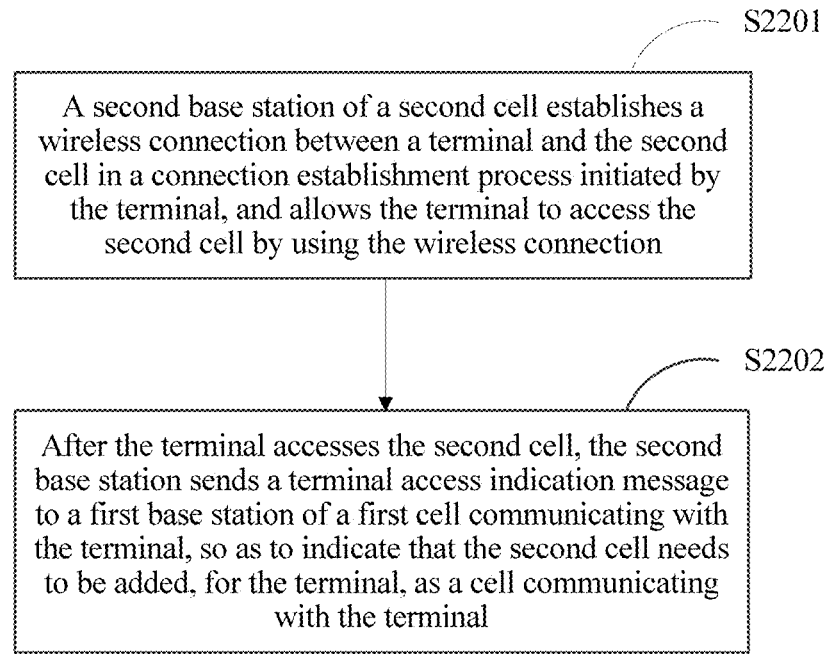
FIG. 22 is a flowchart of a fifth cell access method according to an embodiment of the present invention.

FIG. 22 is a flowchart of a fifth cell access method according to an embodiment of the present invention. As shown in FIG. 22, the method includes the following steps.

S2201. A second base station of a second cell establishes a wireless connection between a terminal and the second cell in a connection establishment process initiated by the terminal, and allows the terminal to access the second cell by using the wireless connection.

S2202. After the terminal accesses the second cell, the second base station sends a terminal access indication message to a first base station of a first cell communicating with the terminal, so as to indicate that the second cell needs to be added, for the terminal, as a cell communicating with the terminal.

Optionally, the terminal access indication message is further used to indicate that the second base station allows addition of the second cell as a cell communicating with the terminal.

The sending, by the second base station, the terminal access indication message to the first base station includes: adding, by the second base station to the terminal access indication message, a wireless connection parameter that is used to reconfigure the wireless connection, so as to instruct the first base station to instruct the terminal to reconfigure the wireless connection according to the wireless connection parameter.

Optionally, after the second base station sends the terminal access indication message to the first base station, the method further includes receiving, by the second base station, a cell addition complete message sent by the first base station, and after receiving the cell addition complete message, communicating, by the second base station, with the terminal by using the reconfigured wireless connection.

Optionally, after the second base station sends the terminal access indication message to the first base station, the method further includes receiving, by the second base station, a cell addition request message sent by the first base station, where the cell addition request message is used to request the second base station to add the second cell as a cell communicating with the terminal, and sending, by the second base station, a cell addition request acknowledgement message to the first base station in response to the cell addition request message, so as to indicate that the second base station allows addition of the second cell as a cell communicating with the terminal, where the cell addition request acknowledgement message carries a wireless connection parameter that is used to reconfigure the wireless connection, so as to instruct the first base station to instruct the terminal to reconfigure the wireless connection according to the wireless connection parameter.

Optionally, after the second base station sends the cell addition request acknowledgement message to the first base station, the method further includes receiving, by the second base station, a cell addition complete message sent by the first base station, and after receiving the cell addition complete message, communicating, by the second base station, with the terminal by using the reconfigured wireless connection.

Optionally, before the second base station establishes the wireless connection between the terminal and the second cell, the method further includes sending, by the second base station, a first indication message to the terminal, so as to indicate that the second cell may provide communication for a same terminal together with the first cell.

The connection establishment process initiated by the terminal is initiated by the terminal after the terminal receives the first indication message and determines, according to the first indication message, that the first cell may provide communication for the terminal together with the first cell.

Optionally, the first base station is a macro base station or a small node, or the first base station includes a first node of the first cell and a first control node configured to control the first node. The first node is configured to process transmission between the terminal and the first control node.

The second base station is a small node, a macro base station, or a Wireless Fidelity WiFi access point AP.

For another optional implementation of the method, refer to processing of the second base station 203 in the second cell access solution provided in the embodiments of the present invention, and details are not repeated.

Figure 23:
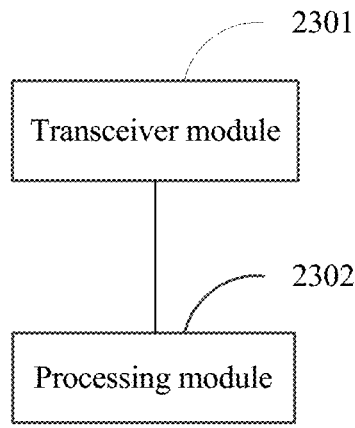
FIG. 23 is a schematic structural diagram of a fifth terminal according to an embodiment of the present invention.

FIG. 23 is a schematic structural diagram of a fifth terminal according to an embodiment of the present invention. As shown in FIG. 23, the terminal includes a processing module 2302 and a transceiver module 2301.

The processing module 2302 is configured to control the transceiver module 2301 to report an address of the terminal to a location server.

The transceiver module 2301 is configured to receive an Internet Protocol IP packet sent by an application server in an Internet according to the address of the terminal.

The application server obtains the address of the terminal from the location server, and the location server is configured to store the address of the terminal, and provide the address of the terminal for the application server.

Optionally, the processing module 2302 is specifically configured to control the transceiver module 2301 to report the address of the terminal by using control plane signaling.

Optionally, if multiple data transmission paths exist between the terminal and the application server, the processing module 2302 is specifically configured to for each of the data transmission paths, control the transceiver module 2301 to report an address of the terminal on the path by using the control plane signaling.

Optionally, the address of the terminal includes at least one of the following addresses: a public Internet Protocol IP address of the terminal, an IP address of an access gateway to which the terminal is connected, or an identity of an access gateway to which the terminal is connected.

The terminal accesses the Internet by using the access gateway to which the terminal is connected, and performs packet transmission with the application server in the Internet.

Optionally, the processing module 2302 is specifically configured to control the transceiver module 2301 to send an Internet Protocol IP packet to the location server, use a source IP address in the sent IP packet as the address of the terminal, and report the address of the terminal to the location server.

Optionally, if multiple data transmission paths exist between the terminal and the application server, the processing module 2302 is specifically configured to for each of the multiple data transmission paths, control the transceiver module 2301 to send an Internet Protocol IP packet to the location server by using the data transmission path, use a source IP address in the sent IP packet as an address of the terminal on the data transmission path, and report the address of the terminal to the location server.

Optionally, the location server is a server that is in the Internet and that is independent of the application server, or the location server is located in the application server.

Optionally, the processing module 2302 is specifically configured to control the transceiver module 2301 to periodically report the address of the terminal to the location server, and/or control the transceiver module 2301 to report the address of the terminal to the location server when a path from the terminal to the application server or the location server changes.

Optionally, the processing module 2302 is further configured to before controlling the transceiver module 2301 to report the address of the terminal to the location server, select a to-be-accessed network according to at least one of the following factors: a service type of a service to be established by the terminal, a quality of service QoS requirement of a service to be established by the terminal, or a preset network to be preferably accessed by the terminal.

The processing module 2302 is specifically configured to control the transceiver module 2301 to report, to the location server, an address of the terminal in each to-be-accessed network selected by the terminal.

For another optional implementation of the terminal, refer to implementation of the terminal in the data transmission solution provided in the embodiments of the present invention, and details are not repeated.

Figure 24:
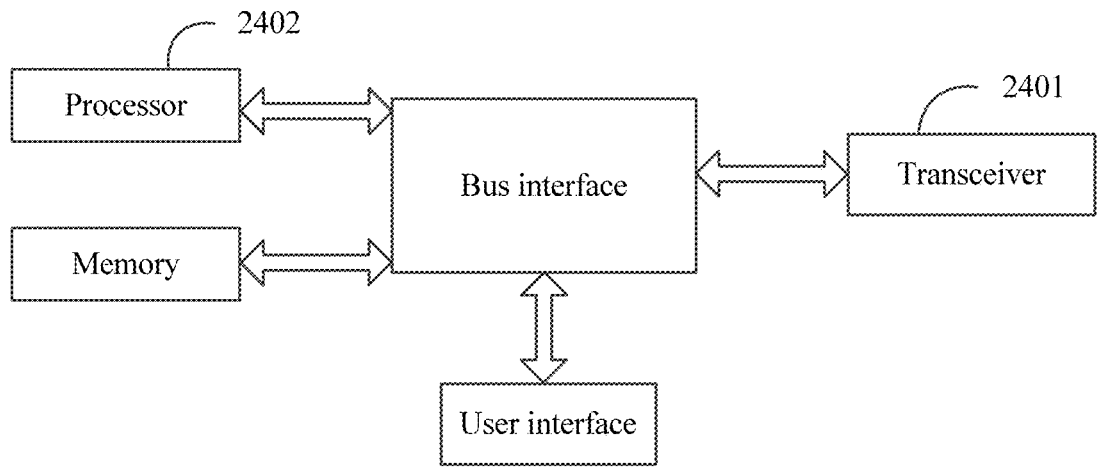
FIG. 24 is a schematic structural diagram of a sixth terminal according to an embodiment of the present invention.

FIG. 24 is a schematic structural diagram of a sixth terminal according to an embodiment of the present invention. As shown in FIG. 24, the terminal includes a processor 2402 and a transceiver 2401.

The processor 2402 is configured to control the transceiver 2401 to report an address of the terminal to a location server.

The transceiver 2401 is configured to receive an Internet Protocol IP packet sent by an application server in an Internet according to the address of the terminal.

The application server obtains the address of the terminal from the location server, and the location server is configured to store the address of the terminal, and provide the address of the terminal for the application server.

Optionally, the terminal may be implemented by using a bus architecture shown in FIG. 24. In FIG. 24, the bus architecture may include any quantity of interconnected buses and bridges, and specifically link various circuits of one or more processors represented by the processor 2402 and a memory. The bus architecture may further link various other circuits such as a peripheral device, a voltage regulator, and a power management circuit. This is well known in the art, and therefore, is not further described in this specification. A bus interface provides an interface. The transceiver 2401 may be multiple elements, that is, may include a transmitter and a receiver, and provide units for communicating with various other apparatuses on a transmission medium. For different user equipments, a user interface may be an interface that can be externally or internally connected to a required device. The connected device includes but is not limited to a keypad, a display, a loudspeaker, a microphone, and a joystick.

Optionally, the terminal may be implemented without using a bus architecture. For example, the processor 2402 and the transceiver 2401 are directly connected to each other, and do not communicate with each other by using a bus.

For another optional implementation of the processor 2402, refer to the processing module 2302. For another optional implementation of the transceiver 2401, refer to the transceiver module 2301. For another optional implementation of the terminal, refer to implementation of the terminal in the data transmission solution provided in the embodiments of the present invention, and details are not repeated.

Figure 25:
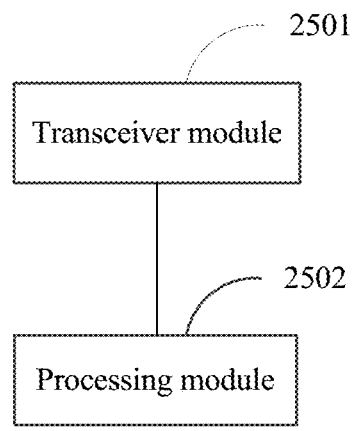
FIG. 25 is a schematic structural diagram of a first location server according to an embodiment of the present invention.

FIG. 25 is a schematic structural diagram of a first location server according to an embodiment of the present invention. As shown in FIG. 25, the location server includes a transceiver module 2501, configured to receive an address of a terminal that is reported by the terminal, and a processing module 2502, configured to notify, an application server performing data transmission with the terminal, of the address of the terminal that is received by the transceiver module 2501, so that the application server sends an Internet Protocol IP packet to the terminal according to the address of the terminal.

Optionally, the processing module 2502 is specifically configured to after receiving, by using the transceiver module 2501, a request message that is sent by the application server and is for requesting the address of the terminal, notify, the application server performing data transmission with the terminal, of the address of the terminal that is received by the transceiver module 2501.

Optionally, the transceiver module 2501 is specifically configured to receive the address of the terminal that is reported by the terminal by using control plane signaling.

Optionally, the transceiver module 2501 is specifically configured to receive an address that is of the terminal on each of multiple data transmission paths existing between the terminal and the application server and that is reported by the terminal for the path by using the control plane signaling.

Optionally, the address of the terminal includes at least one of the following addresses: a public Internet Protocol IP address of the terminal, an IP address of an access gateway to which the terminal is connected, or an identity of an access gateway to which the terminal is connected.

The terminal accesses an Internet by using the access gateway to which the terminal is connected, and performs packet transmission with the application server in the Internet.

Optionally, the transceiver module 2501 is specifically configured to receive an IP packet sent by the terminal, and use a source IP address in the received IP packet as the address of the terminal.

Optionally, the transceiver module 2501 is specifically configured to receive an IP packet sent by the terminal by using each of multiple data transmission paths existing between the terminal and the application server, and use a source IP address in the received IP packet as an address of the terminal on the data transmission path.

Optionally, the location server is a server that is in the Internet and that is independent of the application server, or the location server is located in the application server.

Optionally, the transceiver module 2501 is specifically configured to receive the address of the terminal that is periodically reported by the terminal, and/or receive the address of the terminal that is reported by the terminal when a path from the terminal to the application server or the location server changes.

For another optional implementation of the location server, refer to the location server in the data transmission solution provided in the embodiments of the present invention, and details are not repeated.

Figure 26:
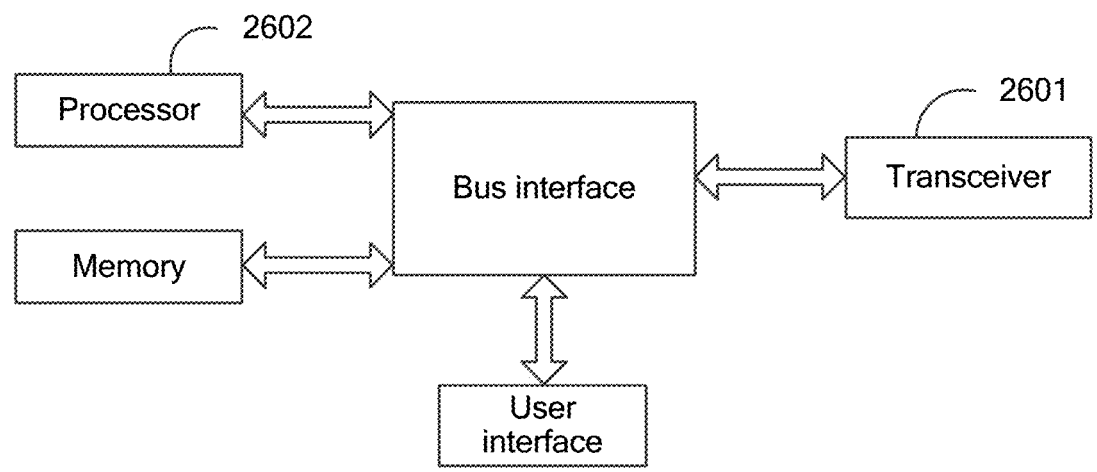
FIG. 26 is a schematic structural diagram of a second location server according to an embodiment of the present invention.

FIG. 26 is a schematic structural diagram of a second location server according to an embodiment of the present invention. As shown in FIG. 26, the location server includes a transceiver 2601, configured to receive an address of a terminal that is reported by the terminal, and a processor 2602, configured to notify, an application server performing data transmission with the terminal, of the address of the terminal that is received by the transceiver 2601, so that the application server sends an Internet Protocol IP packet to the terminal according to the address of the terminal.

Optionally, the location server may be implemented by using a bus architecture shown in FIG. 26. In FIG. 26, the bus architecture may include any quantity of interconnected buses and bridges, and specifically link various circuits of one or more processors represented by the processor 2602 and a memory. The bus architecture may further link various other circuits such as a peripheral device, a voltage regulator, and a power management circuit. This is well known in the art, and therefore, is not further described in this specification. A bus interface provides an interface. The transceiver 2601 may be multiple elements, that is, may include a transmitter and a receiver, and provide units for communicating with various other apparatuses on a transmission medium. For different user equipments, a user interface may be an interface that can be externally or internally connected to a required device. The connected device includes but is not limited to a keypad, a display, a loudspeaker, a microphone, and a joystick.

Optionally, the location server may be implemented without using a bus architecture. For example, the processor 2602 and the transceiver 2601 are directly connected to each other, and do not communicate with each other by using a bus.

For another optional implementation of the transceiver 2601, refer to the transceiver module 2501. For another optional implementation of the processor 2602, refer to the processing module 2502. For another optional implementation of the location server, refer to the location server in the data transmission solution provided in the embodiments of the present invention, and details are not repeated.

Figure 27:
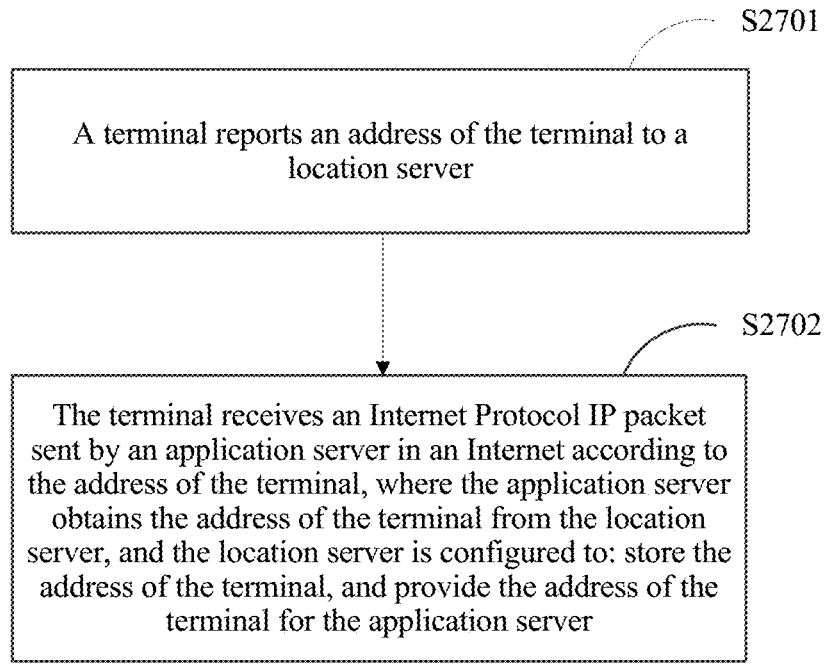
FIG. 27 is a flowchart of a first data transmission method according to an embodiment of the present invention.

FIG. 27 is a flowchart of a first data transmission method according to an embodiment of the present invention. As shown in FIG. 27, the method includes the following steps.

S2701. A terminal reports an address of the terminal to a location server.

S2702. The terminal receives an Internet Protocol IP packet sent by an application server in an Internet according to the address of the terminal, where the application server obtains the address of the terminal from the location server, and the location server is configured to store the address of the terminal, and provide the address of the terminal for the application server.

Optionally, the reporting, by a terminal, an address of the terminal to a location server includes reporting, by the terminal, the address of the terminal by using control plane signaling.

Optionally, if multiple data transmission paths exist between the terminal and the application server, the reporting, by the terminal, the address of the terminal by using control plane signaling includes for each of the data transmission paths, reporting, by the terminal, an address of the terminal on the path by using the control plane signaling.

Optionally, the address of the terminal includes at least one of the following addresses: a public Internet Protocol IP address of the terminal, an IP address of an access gateway to which the terminal is connected, or an identity of an access gateway to which the terminal is connected.

The terminal accesses the Internet by using the access gateway to which the terminal is connected, and performs packet transmission with the application server in the Internet.

Optionally, the reporting, by a terminal, an address of the terminal to a location server includes sending, by the terminal, an Internet Protocol IP packet to the location server, using a source IP address in the sent IP packet as the address of the terminal, and reporting the address of the terminal to the location server.

Optionally, if multiple data transmission paths exist between the terminal and the application server, the reporting, by a terminal, an address of the terminal to a location server includes for each of the multiple data transmission paths, sending, by the terminal, an Internet Protocol IP packet to the location server by using the data transmission path, using a source IP address in the sent IP packet as an address of the terminal on the data transmission path, and reporting the address of the terminal to the location server.

Optionally, the location server is a server that is in the Internet and that is independent of the application server, or the location server is located in the application server.

Optionally, the reporting, by a terminal, an address of the terminal to a location server includes: periodically reporting, by the terminal, the address of the terminal to the location server, and/or reporting, by the terminal, the address of the terminal to the location server when a path from the terminal to the application server or the location server changes.

Optionally, before the reporting, by a terminal, an address of the terminal to a location server, the method further includes: selecting, by the terminal, a to-be-accessed network according to at least one of the following factors a service type of a service to be established by the terminal, a quality of service QoS requirement of a service to be established by the terminal, or a preset network to be preferably accessed by the terminal.

The reporting, by a terminal, an address of the terminal to a location server includes reporting, by the terminal to the location server, an address of the terminal in each to-be-accessed network selected by the terminal.

For another optional implementation of the method, refer to processing of the terminal in the data transmission solution provided in the embodiments of the present invention, and details are not repeated.

Figure 28:
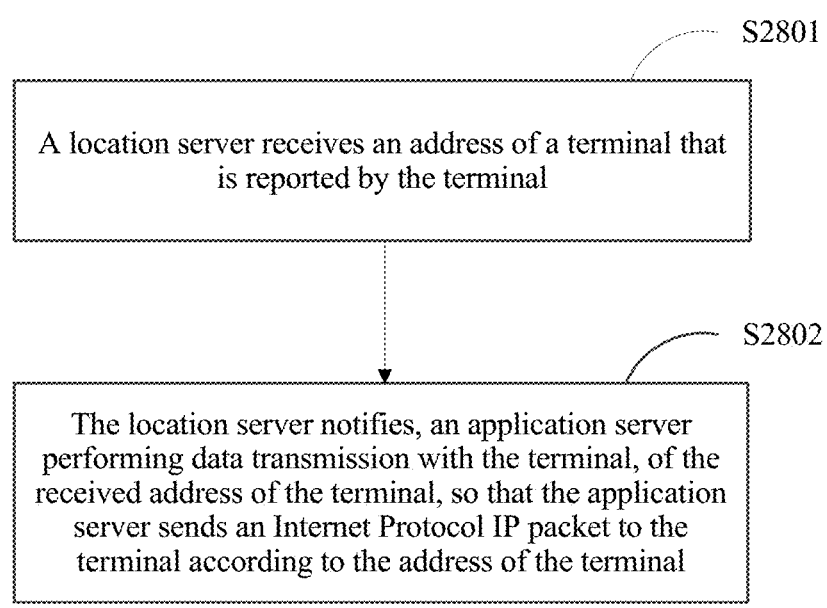
FIG. 28 is a flowchart of a second data transmission method according to an embodiment of the present invention.

FIG. 28 is a flowchart of a second data transmission method according to an embodiment of the present invention. As shown in FIG. 28, the method includes the following steps.

S2801. A location server receives an address of a terminal that is reported by the terminal.

S2802. The location server notifies, an application server performing data transmission with the terminal, of the received address of the terminal, so that the application server sends an Internet Protocol IP packet to the terminal according to the address of the terminal.

Optionally, the notifying, by the location server, an application server performing data transmission with the terminal, of the received address of the terminal includes after receiving a request message that is sent by the application server and is for requesting the address of the terminal, notifying, by the location server, the application server performing data transmission with the terminal, of the received address of the terminal.

Optionally, the receiving, by a location server, an address of a terminal that is reported by the terminal includes receiving, by the location server, the address of the terminal that is reported by the terminal by using control plane signaling.

Optionally, the receiving, by the location server, the address of the terminal that is reported by the terminal by using control plane signaling includes receiving, by the location server, an address that is of the terminal on each of multiple data transmission paths existing between the terminal and the application server and that is reported by the terminal for the path by using the control plane signaling.

Optionally, the address of the terminal includes at least one of the following addresses: a public Internet Protocol IP address of the terminal, an IP address of an access gateway to which the terminal is connected, or an identity of an access gateway to which the terminal is connected.

The terminal accesses an Internet by using the access gateway to which the terminal is connected, and performs packet transmission with the application server in the Internet.

Optionally, the receiving, by a location server, an address of a terminal that is reported by the terminal includes receiving, by the location server, an IP packet sent by the terminal, and using a source IP address in the received IP packet as the address of the terminal.

Optionally, the receiving, by the location server, an IP packet sent by the terminal, and using a source IP address in the received IP packet as the address of the terminal includes receiving, by the location server, an IP packet sent by the terminal by using each of multiple data transmission paths existing between the terminal and the application server, and using a source IP address in the received IP packet as an address of the terminal on the data transmission path.

Optionally, the location server is a server that is in the Internet and that is independent of the application server, or the location server is located in the application server.

Optionally, the receiving, by a location server, an address of a terminal that is reported by the terminal includes receiving, by the location server, the address of the terminal that is periodically reported by the terminal, and/or receiving, by the location server, the address of the terminal that is reported by the terminal when a path from the terminal to the application server or the location server changes.

For another optional implementation of the method, refer to processing of the location server in the data transmission solution provided in the embodiments of the present invention, and details are not repeated.

In conclusion, in the embodiments of the present invention, a terminal autonomously selects a to-be-accessed second cell, and actively requests a first base station to add a second cell. Compared with a solution that is in a current cell handover procedure and in which a terminal sends a measurement report and a base station performs handover decision, in the foregoing solution provided in the embodiments of the present invention, partial processing is performed by the terminal, so that processing of a network device such as a base station can be reduced, and implementation complexity of the network device can be reduced.

Further, a terminal may first access a second cell, and a second base station of the second cell notifies a first base station of the access of the terminal. In this optional solution, the terminal can also autonomously select a to-be-accessed second cell.

Still further, a terminal reports an address of the terminal to a location server. The location server sends the received address of the terminal to an application server performing data transmission with the terminal, or an application server obtains the address of the terminal from the location server. The application server sends an IP packet to the terminal according to the obtained address of the terminal. The application server obtains the address of the terminal from the location server, so that the application server can send an IP packet to the terminal according to the obtained address of the terminal.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, or an optical memory) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. An apparatus, comprising:
    an interface circuit;
    a processor; and
    a non-transitory computer readable medium having a program stored thereon for execution by the processor, the program having instructions to:
        communicate with a first cell of a first base station;
        establish a wireless connection with a second cell of a second base station;
        access the second cell via the wireless connection;
        receive a reconfiguration message from the first base station, wherein the reconfiguration message is sent by the first base station to the apparatus in response to the first base station determining that the second base station allows the second cell to be added as a cell communicating with the apparatus;
        receive, before a wireless signal transmitted in the second cell is measured, a measurement configuration message from the first base station, wherein the measurement configuration message comprises cell identity information of the second cell and information about a decision condition used to determine whether the second cell is available; and
        reconfigure the wireless connection according to the reconfiguration message.

2. The apparatus according to claim 1, wherein the program further includes instructions to send, after performing the instruction to reconfigure the wireless connection, a reconfiguration complete message to the first base station, wherein the reconfiguration complete message indicates that the apparatus has completed reconfiguration of the wireless connection according to the reconfiguration message.

3. The apparatus according to claim 1, wherein the program further includes instructions to:
    measure a wireless signal transmitted in the second cell before establishing the wireless connection to the second cell; and
    determine, according to a measurement result of the measuring, that the second cell is available.

4. The apparatus according to claim 3,
    wherein the instructions to measure the wireless signal transmitted in the second cell include instructions to measure the wireless signal transmitted in the second cell according to the cell identity information of the measurement configuration message; and
    wherein the instructions to determine that the second cell is available include instructions to determine that the second cell is available in response to the measurement result of the wireless signal transmitted in the second cell meeting the decision condition.

5. The apparatus according to claim 3, wherein the measurement configuration message further includes frequency information of the second cell;
    wherein the instructions to measure the wireless signal transmitted in the second cell include instructions to measure the wireless signal transmitted in the second cell according to the frequency information of the measurement configuration message; and
    wherein the instructions to determine that the second cell is available include instructions to determine that the second cell is available in response to a measurement result of the wireless signal transmitted in the second cell meeting the decision condition.

6. The apparatus according to claim 3, wherein the program further includes instructions to:
    receive, before the wireless signal transmitted in the second cell is measured, a first indication message sent by one of the first base station or the second base station; and determine, according to the first indication message, that the second cell is permitted to be added as a cell communicating with the apparatus, wherein the first indication message indicates that the second cell is to provide communication for a same terminal together with the first cell.

7. The apparatus according to claim 1, wherein the first base station comprises at least one of an evolved NodeB (eNodeB), a NodeB, a base transceiver station (BTS), an access point (AP), or an access controller (AC).

8. A method, comprising:
communicating, by a terminal with a first cell of a first base station;
establishing, by the terminal, a wireless connection with a second cell of a second base station;
accessing, by the terminal, the second cell via the wireless connection;
receiving, by the terminal, a reconfiguration message from a first base station of the first cell, wherein the reconfiguration message is sent by the first base station to the terminal in response to the first base station determining that the second base station allows the second cell to be added as a cell communicating with the terminal;
receiving, before a wireless signal transmitted in the second cell is measured, a measurement configuration message from the first base station, wherein the measurement configuration message comprises cell identity information of the second cell and information about a decision condition used to determine whether the second cell is available; and
reconfiguring the wireless connection according to the reconfiguration message.

9. The method according to claim 8, further comprising, sending, by the terminal, after reconfiguring the wireless connection according to the reconfiguration message, a reconfiguration complete message to the first base station, the reconfiguration complete message indicating that the terminal has completed reconfiguration of the wireless connection according to the reconfiguration message.

10. The method according to claim 8, further comprising:
measuring, by the terminal, a wireless signal transmitted in the second cell before establishing the wireless connection to the second cell; and
determining, according to a measurement result of the measuring the wireless signal, that the second cell is available.

11. The method according to claim 10, wherein:
measuring the wireless signal transmitted in the second cell comprises measuring the wireless signal transmitted in the second cell according to the cell identity information of the measurement configuration message; and
the determining that the second cell is available comprises determining that the second cell is available in response to the measurement result of the wireless signal transmitted in the second cell meeting the decision condition.

12. The method according to claim 10, wherein the measurement configuration message further includes frequency information of the second cell;
wherein the measuring the wireless signal transmitted in the second cell comprises measuring the wireless signal transmitted in the second cell according to the frequency information of the measurement configuration message; and wherein determining that the second cell is available comprises determining that the second cell is available in response to a measurement result of the wireless signal transmitted in the second cell meeting the decision condition.

13. The method according to claim 10, further comprising:
receiving, by the terminal, before the wireless signal transmitted in the second cell is measured, a first indication message sent by one of the first base station or the second base station; and
determining, according to the first indication message, that the second cell is permitted to be added as a cell communicating with the terminal, wherein the first indication message indicates that the second cell is to provide communication for a same terminal together with the first cell.

14. The method according to claim 8, wherein the base station comprises at least one of an evolved NodeB (eNodeB), a NodeB, a base transceiver station (BTS), an access point (AP), or an access controller (AC).

15. An apparatus, comprising:
a processor; and
a non-transitory computer readable medium having a program stored thereon for execution by the processor, the program having instructions for:
communicating, as a first base station, with a terminal in a first cell;
receiving, from a second base station of a second cell, a terminal access indication message indicating that the terminal accesses the second cell;
receiving, from the second base station, an acknowledgement message indicating that the second base station the second cell to be added as a cell communicating with the terminal;
sending, to the terminal, before a wireless signal transmitted in the second cell is measured by the terminal, a measurement configuration message from the first base station, wherein the measurement configuration message comprises cell identity information of the second cell and information about a decision condition used to determine whether the second cell is available; and
sending, to the terminal, a reconfiguration message causing the terminal to reconfigure a wireless connection according to the reconfiguration message and communicate with the second cell on the reconfigured wireless connection.

16. The apparatus according to claim 15, wherein the program further includes instructions to receive, from the terminal, a reconfiguration complete message indicating that the terminal has completed reconfiguration of the wireless connection according to the reconfiguration message.

17. The apparatus according to claim 15, wherein the measurement configuration message further causes the terminal to measure a wireless signal transmitted in the second cell before establishing the wireless connection to the second cell, and to determine, according to a measurement result of the measuring, that the second cell is available.

18. The apparatus according to claim 17,
wherein sending the measurement configuration message causes the terminal to measure the wireless signal transmitted in the second cell according to the cell identity information of the measurement configuration message and causes the terminal to determine that the second cell is available according to the measurement result of the wireless signal transmitted in the second cell having met the decision condition.

19. The apparatus according to claim 17, wherein the measurement configuration message comprises frequency information of the second cell; and wherein sending the measurement configuration message causes the terminal to measure the wireless signal transmitted in the second cell according to the frequency information of the measurement configuration message and causes the terminal to determine that the second cell is available according to a measurement result of the wireless signal transmitted in the second cell having met the decision condition.

20. The apparatus according to claim 17, wherein the program further includes instructions to:

send, to the terminal, before the wireless signal transmitted in the second cell is measured, a first indication message, the first indication message causing the terminal to determine, according to the first indication message, that the second cell is permitted to be added as a cell communicating with the terminal, wherein the first indication message indicates that the second cell is to provide communication for a same terminal together with the first cell.

* * * * *